(12) United States Patent
Lee et al.

(10) Patent No.: US 12,224,127 B2
(45) Date of Patent: Feb. 11, 2025

(54) MULTILAYER ELECTRONIC COMPONENT

(71) Applicant: SAMSUNG ELECTRO-MECHANICS CO., LTD., Suwon-si (KR)

(72) Inventors: Chung Yeol Lee, Suwon-si (KR); Yoo Jeong Lee, Suwon-si (KR); Hyung Jong Choi, Suwon-si (KR); Kwang Yeun Won, Suwon-si (KR); So Jung An, Suwon-si (KR); Woo Kyung Sung, Suwon-si (KR); Kang Ha Lee, Suwon-si (KR); Myung Jun Park, Suwon-si (KR); Jong Ho Lee, Suwon-si (KR); Jun Hyeong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/973,132

(22) Filed: Oct. 25, 2022

(65) Prior Publication Data

US 2023/0215643 A1 Jul. 6, 2023

(30) Foreign Application Priority Data

Dec. 31, 2021 (KR) .......................... 10-2021-0193708

(51) Int. Cl.
*H01G 4/232* (2006.01)
*H01G 4/012* (2006.01)
*H01G 4/30* (2006.01)

(52) U.S. Cl.
CPC ........... *H01G 4/2325* (2013.01); *H01G 4/012* (2013.01); *H01G 4/30* (2013.01)

(58) Field of Classification Search
CPC ........ H01G 4/2325; H01G 4/30; H01G 2/065; H01G 4/008; H01G 4/012; H01G 4/12; H01G 4/232; H01G 4/224
See application file for complete search history.

(56) References Cited

U.S. PATENT DOCUMENTS 9,978,523 B1 * 5/2018 Park .................. H01G 4/224
10,056,193 B1 * 8/2018 Son .................... H01G 4/232
(Continued)

FOREIGN PATENT DOCUMENTS

| JP | H07-240302 A | 9/1995 |
|---|---|---|
| JP | 2016-178219 A | 10/2016 |
| KR | 10-2010-0032341 A | 3/2010 |

*Primary Examiner* — Michael P McFadden
(74) *Attorney, Agent, or Firm* — Morgan, Lewis & Bockius LLP

(57) ABSTRACT

An electronic component includes a body including a dielectric layer and internal electrodes, and including first to sixth surfaces; a first external electrode including a first connection portion on the third surface and a first band portion on the first surface; a second external electrode including a second connection portion on the fourth surface and a second band portion on the first surface; an insulating layer on the second surface and the first and second connection portions; and a plating layer on the first and second band portions. The plating layer extends onto the first and second connection portions and is in contact with the insulating layer. A thickness of an end of the insulating layer decreases toward the plating layer. An end of the plating layer includes a first region between the insulating layer and the first or second connection portion and a second region covering the insulating layer.

34 Claims, 22 Drawing Sheets

(56) References Cited

U.S. PATENT DOCUMENTS

| | | | |
|---|---|---|---|
| 2010/0067170 A1 | 3/2010 | Koga | |
| 2013/0020913 A1* | 1/2013 | Shirakawa | H01G 4/232 |
| | | | 336/200 |
| 2013/0057112 A1* | 3/2013 | Shirakawa | H01G 4/12 |
| | | | 336/200 |
| 2015/0084481 A1* | 3/2015 | Mori | H01G 4/252 |
| | | | 29/829 |
| 2015/0084487 A1* | 3/2015 | Mori | H01G 4/248 |
| | | | 336/200 |
| 2015/0223340 A1* | 8/2015 | Jung | H01G 4/008 |
| | | | 156/89.12 |
| 2015/0287532 A1* | 10/2015 | Abe | H05K 3/3436 |
| | | | 427/79 |
| 2016/0276104 A1* | 9/2016 | Nishisaka | H01G 4/2325 |
| 2017/0250028 A1* | 8/2017 | Makino | H01G 4/248 |
| 2017/0256359 A1* | 9/2017 | Masunari | H01G 4/005 |
| 2018/0144868 A1* | 5/2018 | Park | H05K 1/181 |
| 2019/0096583 A1* | 3/2019 | Sasaki | H01G 4/232 |
| 2019/0103224 A1* | 4/2019 | Han | H01G 4/2325 |
| 2019/0131076 A1* | 5/2019 | Fukumura | H01G 4/232 |
| 2019/0371528 A1* | 12/2019 | Takashima | H01G 4/232 |
| 2020/0365326 A1* | 11/2020 | Masunari | H01G 2/065 |
| 2021/0272756 A1* | 9/2021 | Chikuma | H01G 4/248 |
| 2022/0285101 A1* | 9/2022 | Miyauchi | H01G 4/30 |

* cited by examiner

MULTILAYER ELECTRONIC COMPONENT

CROSS-REFERENCE TO RELATED APPLICATION(S)

This application claims benefit of priority to Korean Patent Application No. 10-2021-0193708 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type capacitor which may be mounted on a printed circuit board of various types of electronic product such as an imaging device as a liquid crystal display (LCD) and a plasma display panel (PDP), a computer, and the like, smartphones and mobile phones and may serve to charge or discharge electricity.

Such a multilayer ceramic capacitor may be used as a component of various electronic devices since a multilayer ceramic capacitor may have a relatively small size and high capacitance and may be easily mounted.

Recently, with the miniaturization and multifunctionalization of electronic products, demand for high integration density and high capacitance of a multilayer ceramic capacitor has increased, such that a space between the multilayer ceramic capacitors may be reduced.

Also, as a multilayer ceramic capacitor may be used in automobiles or infotainment systems, the demand for high reliability, high strength properties and miniaturization has increased.

Accordingly, in related art, in a multilayer electronic component mounted by solder, to prevent cracks in a body caused by tensile stress due to thermal reduction of a solder fillet, a glass layer directly disposed on a sintered layer on each end surface and forming a portion of the surface of an external electrode may be disposed, and a plating layer may be disposed on the surface of the external electrode not covered with the glass layer.

To reduce a size of a multilayer ceramic capacitor and to increase capacitance of a multilayer ceramic capacitor, it may be necessary to increase the number of stacks by reducing a thickness of an internal electrode and it may be necessary to increase an effective volume fraction required for implementing capacitance by reducing the volume of a portion not affecting formation of capacitance.

Also, to mount a relatively greater number of components within a limited region of a substrate, it may be necessary to reduce a mounting space.

Further, as a size of a multilayer ceramic capacitor has been reduced and capacitance of the multilayer ceramic capacitor has increased, a thickness of the margin may decrease, such that external moisture or a plating solution may be easily permeated therethrough, which may deteriorate reliability. Accordingly, a method for protecting a multilayer ceramic capacitor from permeation of external moisture or a plating solution may be necessary.

SUMMARY

An aspect of the present disclosure is to protect a multilayer electronic component from stress caused by thermal reduction of a solder fillet.

An aspect of the present disclosure is to provide a multilayer electronic component having a reduced size and high capacitance.

An aspect of the present disclosure is to provide a multilayer electronic component having a reduced mounting volume.

An aspect of the present disclosure is to protect a multilayer electronic component from permeation of external moisture and a plating solution.

According to an aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction; a first external electrode including a first connection portion disposed on the third surface and a first band portion extending from the first connection portion to a portion of the first surface; a second external electrode including a second connection portion disposed on the fourth surface and a second band portion extending from the second connection portion to a portion of the first surface; an insulating layer disposed on the second surface and extending to a portion on the first and second connection portions; and a plating layer disposed on the first and second band portions. The plating layer extends to a portion on the first and second connection portions and is in contact with the insulating layer. A thickness of the insulating layer decreases toward an end in a region in which the plating layer is in contact with the insulating layer. An end of the plating layer includes a first region extending to a region between the insulating layer and the first or second connection portion and a second region extending to cover the insulating layer.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction; a first external electrode including a first connection portion disposed on the third surface and a first band portion extending from the first connection portion to a portion of the first surface; a second external electrode including a second connection portion disposed on the fourth surface and a second band portion extending from the second connection portion to a portion of the first surface; an insulating layer disposed on the second surface and the first and second connection portions, and extending to a portion of the first and second band portions; and a plating layer disposed on the first and second band portions above and in contact with the insulating layer. A thickness of the insulating layer decreases toward an end in a region in which the insulating layer is contact with the plating layer. An end of the plating layer includes a third region extending to a region between the insulating layer and the first or second band portion and a fourth region extending to cover the insulating layer.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction; a first external electrode including a first connection portion disposed on the third surface, a first band portion extending from the first connection portion to a portion of the first surface, and a third band portion extending from the first connection portion to a portion of the second surface; a second external electrode including a second connection portion disposed on the fourth surface, a second band portion extending from the second connection portion to a portion of the first surface, and a fourth band portion extending from the second connection portion to a portion of the second surface; an insulating layer disposed on the first and second connection portions and covering the second surface and the third and fourth band portions; and a plating layer disposed on the first and second band portions. The plating layer extends to a portion on the first and second connection portions and is in contact with the insulating layer, and a thickness of the plating layer decrease toward an end in a region in which the plating layer is in contact with the insulating layer. An end of the plating layer includes a first region extending to a region between the insulating layer and the first or second connection portion and a second region extending to cover the insulating layer.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction; a first external electrode including a first connection portion disposed on the third surface, a first band portion extending from the first connection portion to a portion of the first surface, and a corner portion extending from the first connection portion to a corner connecting the second surface to the third surface; a second external electrode including a second connection portion disposed on the fourth surface, a second band portion extending from the second connection portion to a portion of the first surface, and a second corner portion extending from the second connection portion to a corner connecting the second surface to the fourth surface; an insulating layer disposed on the first and second connection portions and covering the second surface and the first and second corner portions; and a plating layer disposed on the first and second band portions. B3≤G1 and B4≤G2 are satisfied, in which B3 is an average distance in the second direction from an extension line of the third surface to an end of the first corner portion, B4 is an average distance in the second direction from an extension line of the fourth surface to an end of the second corner portion, G1 is an average size of a region in which the third surface and the second internal electrode are spaced apart from each other, taken in the second direction, and G2 is an average size of a region in which the fourth surface and the first internal electrode are spaced apart from each other, taken in the second direction. The plating layer extends to a portion on the first or second connection portion and is in contact with the insulating layer. A thickness of the insulating layer decreases toward an end in a region in which the plating layer is in contact with the insulating layer. An end of the plating layer includes a first region extending to a region between the insulating layer and the first or second connection portion and a second region extending to cover the insulating layer.

According to another aspect of the present disclosure, a multilayer electronic component includes a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction; a first external electrode including a first connection electrode disposed on the third surface and a first band electrode disposed on the first surface and connected to the first connection electrode; a second external electrode including a second connection electrode disposed on the fourth surface and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode. An end of the first plating layer includes a 1-1 region extending to a region between the first insulating layer and the first connection electrode and a 1-2 region extending to cover the first insulating layer. An end of the second plating layer includes a region 2-1 extending to a region between the second insulating layer and the second connection electrode, and a 2-2 region extending to cover the second insulating layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
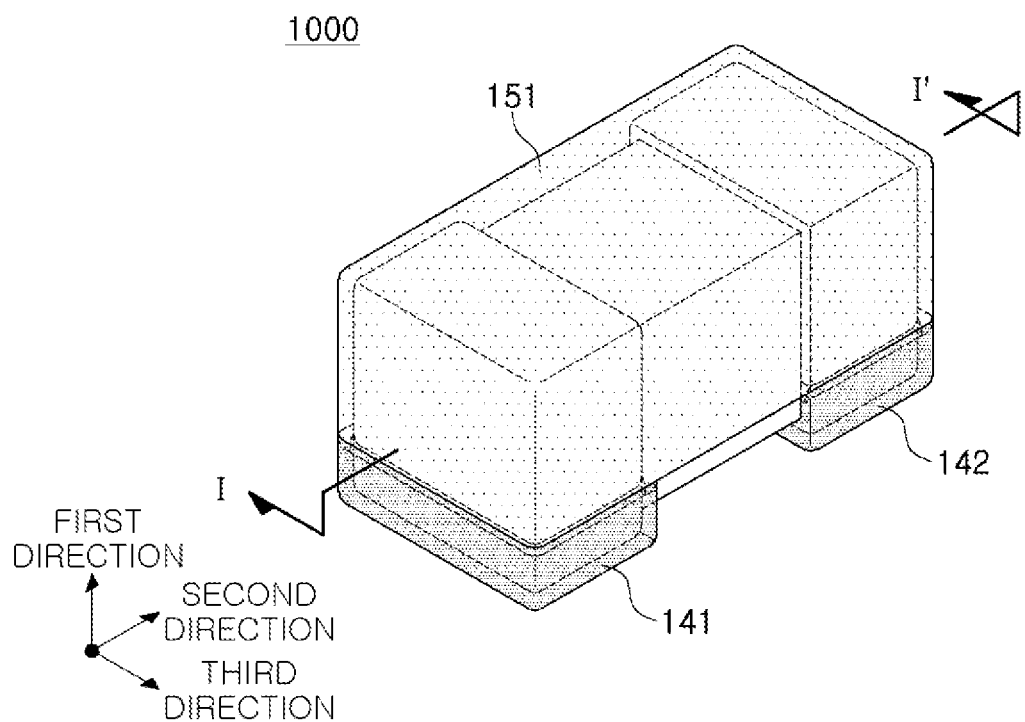
FIG. 1 is a perspective diagram illustrating a multilayer electronic component according to an example embodiment of the present disclosure.

Hereinafter, embodiments of the present disclosure will be described as below with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by the same reference numerals. Also, redundant descriptions and detailed descriptions of known functions and elements that may unnecessarily make the gist of the present disclosure obscure will not be provided. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

The term "an exemplary embodiment" used herein does not refer to the same exemplary embodiment, and is provided to emphasize a particular feature different from that of another exemplary embodiment. However, exemplary embodiments provided herein may be implemented by being combined in whole or in part one with one another. For example, one element described in a particular exemplary embodiment may be understood as a description related to another exemplary embodiment even if it is not described in another exemplary embodiment, unless an opposite or contradictory description is provided therein.

In the drawings, a first direction may be defined as a laminating direction or a thickness (T) direction, a second direction may be defined as a length (L) direction, and a third direction may be defined as a width (W) direction.

FIG. 1 is a perspective diagram illustrating a multilayer electronic component according to an example embodiment.

Figure 2:
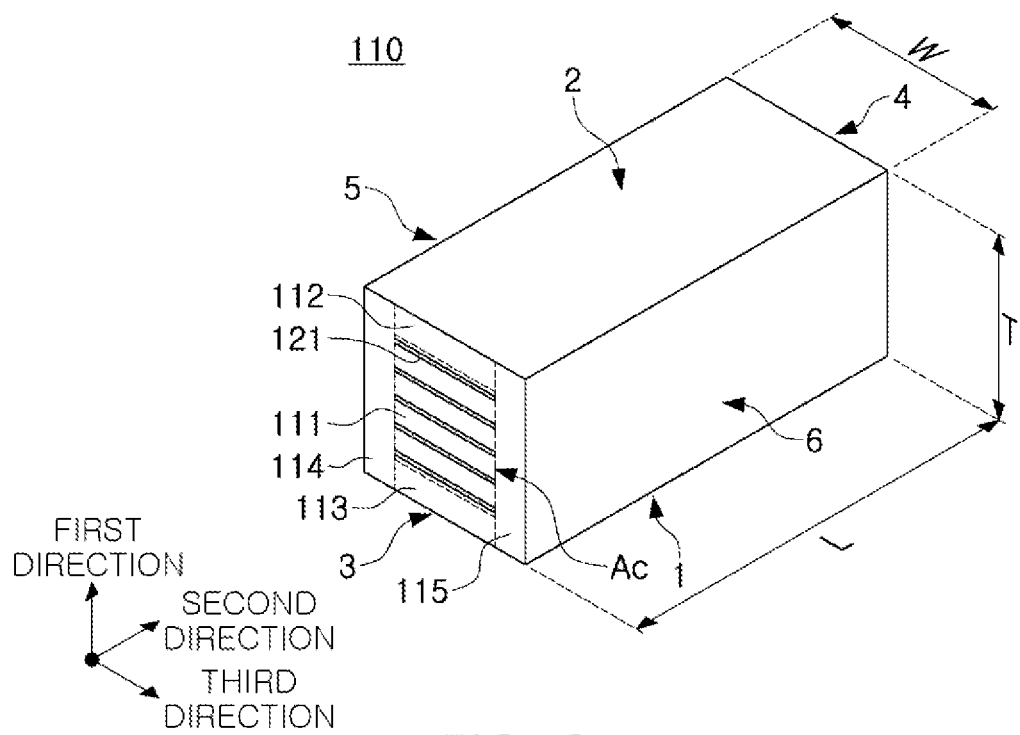
FIG. 2 is a perspective diagram illustrating a body of the multilayer electronic component in FIG. 1.

FIG. 2 is a perspective diagram illustrating a body of the multilayer electronic component in FIG. 1.

Figure 3:
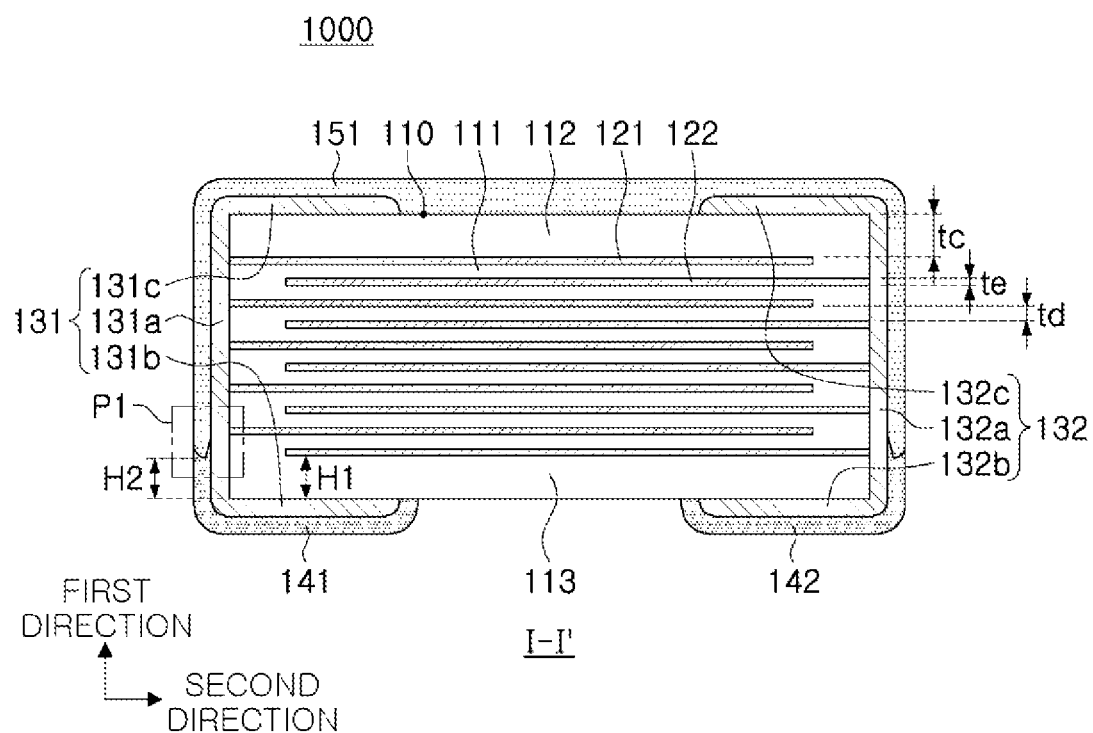
FIG. 3 is a cross-sectional diagram taken along line I-I' in FIG. 1.

FIG. 3 is a cross-sectional diagram taken along line I-I' in FIG. 1.

Figure 4:
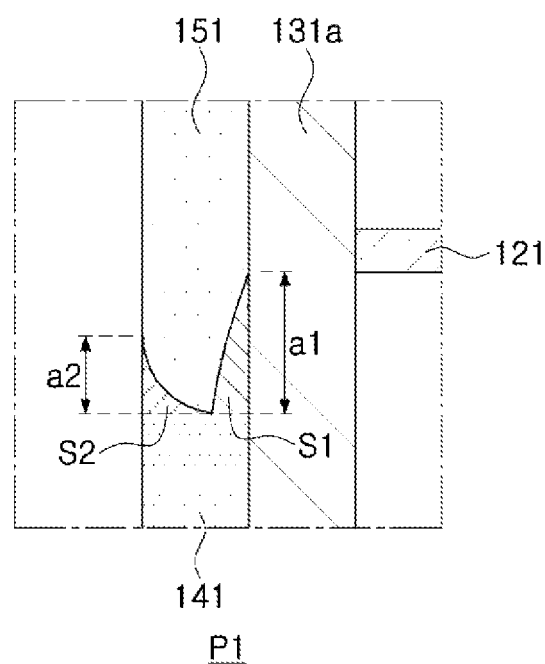
FIG. 4 is an enlarged diagram illustrating region P1 in FIG. 3.

FIG. 4 is an enlarged diagram illustrating region P1 in FIG. 3.

Figure 5:
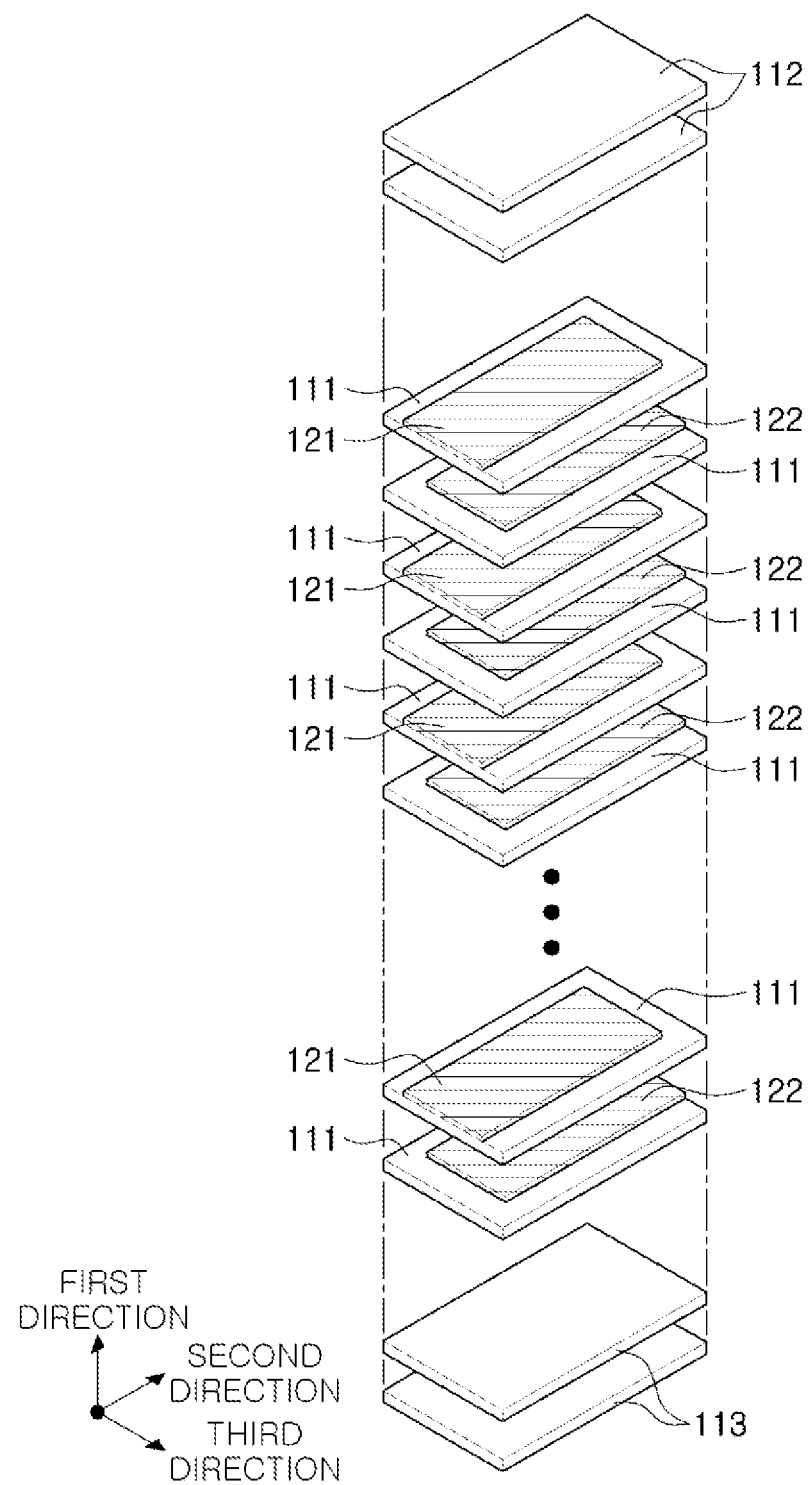
FIG. 5 is an exploded perspective diagram illustrating the body in FIG. 2.

FIG. 5 is an exploded perspective diagram illustrating the body in FIG. 2.

Figure 6:
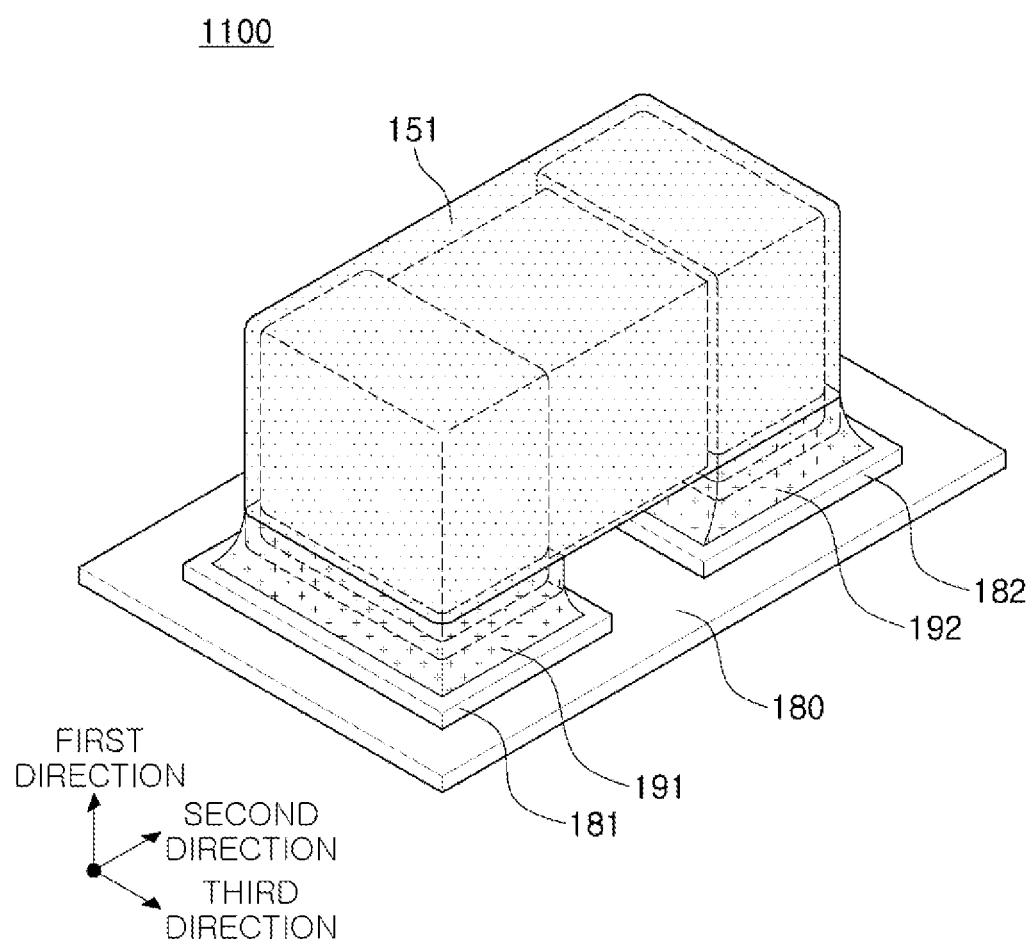
FIG. 6 is a perspective diagram illustrating a substrate on which a multilayer electronic component is mounted.

FIG. 6 is a perspective diagram illustrating a substrate on which a multilayer electronic component is mounted.

Hereinafter, a multilayer electronic component 1000 in an example embodiment will be described with reference to FIGS. 1 to 6.

The multilayer electronic component 1000 in an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

Referring to FIGS. 2 and 3, in the body 110, the dielectric layer 111 and the internal electrodes 121 and 122 may be alternately laminated.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

In an example embodiment, the body 110 may have a first 1-3 corner connecting the first surface to the third surface, a 1-4 corner connecting the first surface to the fourth surface, a 2-3 corner connecting the second surface to the third surface and a 2-4 corner connecting the second surface to the fourth surface. The 1-3 corner and the 2-3 corner may have a form reduced in a direction of a center of the body taken in the first direction toward the third surface, and the 1-4 corner and corner 2-4 may have a form reduced in a direction of a center of the body taken in the first direction toward the fourth face.

As a margin region in which the internal electrodes 121 and 122 are not disposed may overlap the dielectric layer 111, a step difference may be formed due to the thickness of the internal electrodes 121 and 122, and accordingly, the corner connecting the first surface to the third to fifth surfaces and/or the corner connecting the second surface to the third to the fifth surfaces may have a form reduced in a direction of a center of the body taken in the first direction with respect to the first surface or the second surface. Alternatively, a corner connecting the first surface 1 to the third to sixth surfaces 3, 4, 5, and 6 and/or a corner connecting the second surface 2 to the third to sixth surfaces 3, 4, 5, and 6 may have a form reduced in a direction of a center of the body taken in the first direction with respect to the first surface or the second surface. Alternatively, as the corners connecting the surfaces of the body 110 are rounded by performing a separate process to prevent chipping defects, or the like, the corners connecting the first and third to sixth surfaces and/or the corner connecting the second surface to the third to sixth surfaces may have a rounded shape.

The corner may include a first 1-3 corner connecting the first surface to the third surface, a 1-4 corner connecting the first surface to the fourth surface, a 2-3 corner connecting the second surface to the third surface and a 2-4 corner connecting the second surface to the fourth surface. Also, the corners may include a 1-5 corner connecting the first surface to the fifth surface, a 1-6 corner connecting the first surface to the sixth surfaces, a 2-5 corner connecting the second surface to the fifth surface, and a 2-6 corner connecting the second surface to the sixth surface. The first to sixth surfaces of the body 110 may be almost flat surfaces, and non-flat regions may be configured as corners. Hereinafter, an extension line of each surface may refer to a line extended with respect to a flat portion of each surface.

In this case, the region disposed on the corner of the body 110 in the external electrodes 131 and 132 may be a corner portion, the region disposed on the third and fourth surfaces of the body 110 may be a connection portion, and the region disposed on the first and second surfaces of the body may be a band portion.

To prevent a step difference caused by the internal electrodes 121 and 122, after lamination, when the internal electrodes are cut to be exposed to the fifth and sixth surfaces 5 and 6 of the body, a single dielectric layer or two or more dielectric layers may be laminated on both side surfaces of the capacitance formation portion Ac in the third direction (width direction) to form margin portions 114 and 115, the portion connecting the first surface to the fifth and sixth surfaces and the portion connecting the second surface to the fifth and sixth surfaces may not have a reduced form.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate material, a lead composite perovskite material, or a strontium titanate material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The average thickness td of the dielectric layer 111 may not need to be limited to any particular example.

However, generally, when the dielectric layer has a thickness of less than 0.6 μm, which is relatively thin, in particular, when the thickness of the dielectric layer is 0.35 μm or less, reliability may decrease.

In an example embodiment, by disposing an insulating layer on the connection portion of the external electrode, and disposing the plating layer on the band portion of the external electrode, permeation of external moisture and the plating solution may be prevented, such that reliability may improve. Accordingly, excellent reliability may be ensured even when the average thickness of the dielectric layer 111 is 0.35 μm or less.

Accordingly, when the average thickness of the dielectric layer 111 is 0.35 μm or less, the effect of improving reliability in the example embodiment may improve.

The average thickness td of the dielectric layer 111 may refer to an average thickness of the dielectric layer 111 disposed between the first and second internal electrodes 121 and 122.

The average thickness of the dielectric layer 111 may be measured by scanning a cross-sectional surface of the body 110 taken in the length and thickness direction (L-T) using a scanning electron microscope (SEM) at 10,000× magnification. More specifically, an average value may be measured by measuring thicknesses of 30 points of the dielectric layer, spaced apart by an equal distance, on the scanned image in the length direction. The 30 points spaced apart by an equal distance may be designated in the capacitance formation portion Ac. Also, when the measuring of the average value is extended to 10 dielectric layers and measuring an average value thereof, the average thickness of the dielectric layers may be further generalized.

The body 110 may include the capacitance formation portion Ac disposed in the body 110 and including the first internal electrode 121 and the second internal electrode 122 opposing each other with the dielectric layer 111 interposed therebetween, and cover portions 112 and 113 formed on upper and lower portions of the capacitance formation portion Ac in the first direction.

Also, the capacitance formation portion Ac may contribute to the formation of capacitance of the capacitor, and may be formed by alternately laminating the plurality of first and second internal electrodes 121 and 122 with the dielectric layer 111 interposed therebetween.

The cover portions 112 and 113 may include an upper cover portion 112 disposed on the capacitance formation portion Ac in the first direction and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in the thickness direction, respectively, and may prevent damages to the internal electrodes caused by physical or chemical stress.

The upper cover portion 112 and the lower cover portion 113 may not include an internal electrode, and may include the same material as that of the dielectric layer 111.

That is, the upper cover portion 112 and the lower cover portion 113 may include a ceramic material, such as, for example, a barium titanate ($BaTiO_3$) ceramic material.

The average thickness of the cover portions 112 and 113 may not need to be limited to any particular example. However, to easily implement miniaturization and high capacitance of the multilayer electronic component, the average thickness tc of the cover portions 112 and 113 may be 15 μm or less. Also, in an example embodiment, by disposing the insulating layer on the connection portion of the external electrode and the plating layer on the band portion of the external electrode, permeation of external moisture and a plating solution may be prevented such that reliability may improve. Accordingly, excellent reliability may be ensured even when the average thickness tc of the cover portions 112 and 113 is 15 μm or less.

The average thickness tc of the cover portions 112 and 113 may refer to a size in the first direction, and may be an average value of thicknesses of five points of the cover portions 112 and 113, spaced apart by an equal distance, in the first direction above or below the capacitance formation portion Ac.

Also, margin portions 114 and 115 may be disposed on a side surface of the capacitance formation portion Ac.

The margin portions 114 and 115 may include the first margin 114 disposed on the fifth surface 5 of the body 110 and the second margin 115 disposed on the sixth surface 6 of the body 110. That is, the margin portions 114 and 115 may be disposed on both end surfaces of the ceramic body 110 in the width direction.

The margin portions 114 and 115 may refer to a region of a boundary surface between both ends of the first and second internal electrodes 121 and 122 and the body on the cross-section of the body 110 taken in the width-thickness (W-T) direction.

The margin portions 114 and 115 may prevent damage to the internal electrodes caused by physical or chemical stress.

The margin portions 114 and 115 may be formed by forming internal electrodes by applying a conductive paste on a ceramic green sheet other than the region in which the margin portion is formed.

Also, to prevent the step difference due to the internal electrodes 121 and 122, after lamination, the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (width direction), thereby forming the margin portions 114 and 115.

The width of the margin portion 114 and 115 may not need to be limited to any particular example. However, an average width of the margin portions 114 and 115 may be 15 μm or less to easily obtain miniaturization and high capacitance of the multilayer electronic component. Also, in an example embodiment, by disposing the insulating layer on the connection portion of the external electrode and disposing the plating layer on the band portion of the external electrode, permeation of external moisture and a plating solution may be prevented such that reliability may improve. Accordingly, excellent reliability may be ensured even when the average width of the margin portions 114 and 115 is 15 μm or less.

The average width of the margin portions 114 and 115 may refer to the average size of the margin portions 114 and 115 in the third direction, and may be an average value of thicknesses of five points of the margin portions 114 and 115, spaced apart by an equal distance, in the third direction on the side surface of the capacitance formation portion Ac.

The internal electrodes 121 and 122 may be alternately laminated with the dielectric layer 111.

The internal electrodes 121 and 122 may include first and second internal electrodes 121 and 122. The first and second internal electrodes 121 and 122 may be alternately disposed to oppose each other with the dielectric layer 111 included in the body 110 interposed therebetween, and may be exposed to (or extend from or be in contact with) the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body may be connected to the first internal electrode 121, and the second external electrode 132 may be disposed on the fourth surface 4 of the body and may be connected to the second internal electrode 122.

That is, the first internal electrode 121 may not be connected to the second external electrode 132, but may be connected to the first external electrode 131, and the second internal electrode 122 may not be connected to the first external electrode 131 and may be connected to the second external electrode 132. Accordingly, the first internal electrode 121 may be spaced apart from the fourth surface 4 by a predetermined distance, and the second internal electrode 122 may be spaced apart from the third surface 3 by a predetermined distance.

In this case, the first and second internal electrodes 121 and 122 may be electrically separated from each other by the dielectric layer 111 disposed therebetween.

The body 110 may be formed by alternately laminating a ceramic green sheet on which the first internal electrode 121 is printed and a ceramic green sheet on which the second internal electrode 122 is printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), or tungsten (W), titanium (Ti), and alloys thereof.

Also, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof. As the method of printing the conductive paste for internal electrodes, a screen printing method or a gravure printing method may be used, but an example embodiment thereof is not limited thereto.

The average thickness to of the internal electrodes 121 and 122 may not need to be limited to any particular example.

However, generally, when the internal electrode is formed to have a thickness of less than 0.6 which is relatively thin, in particular, when the thickness of the internal electrode is 0.35 μm or less, reliability may be deteriorated.

In an example embodiment, by disposing an insulating layer on the connection portion of the external electrode, and disposing the plating layer on the band portion of the external electrode, permeation of external moisture and a plating solution may be prevented such that reliability may improve. Accordingly, excellent reliability may be secured even when the average thickness of the internal electrodes 121 and 122 is 0.35 or less.

Accordingly, when the thickness of the internal electrodes 121 and 122 is 0.35 or less on average, the effect in the example embodiment may improve, and miniaturization and high capacitance of the ceramic electronic component may be easily obtained.

The average thickness to of the internal electrodes 121 and 122 may refer to the average thickness of the internal electrodes 121 and 122.

The average thickness of the internal electrodes 121 and 122 may be measured by scanning a cross-sectional surface of the body 110 taken in the length and thickness direction (L-T) using a scanning electron microscope (SEM) at 10,000 magnification. More specifically, an average value may be measured by measuring thicknesses of 30 points of the dielectric layer, spaced apart by an equal distance, from the scanned image in the length direction. The 30 points spaced apart by an equal distance may be designated in the capacitance formation portion Ac. Also, when the measuring of the average value is extended to 10 dielectric layers and an average value thereof is measured, the average thickness of the dielectric layers may be further generalized.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

The external electrodes 131 and 132 may include the first external electrode 131 including a first connection portion 131a disposed on the third surface 3 and a first band portion 131b extending from the first connection portion 131a to a portion of the first surface 1, and the second external electrode 132 including a second connection portion 132a disposed on the fourth surface 4, and a second band portion 132b extending from the second connection portion 132a to a portion of the first surface 1. The first connection portion 131a may be connected to the first internal electrode 121 on the third surface 3, and the second connection portion 132a may be connected to the second internal electrode 122 on the fourth surface 4.

Also, the first external electrode 131 may include a third band portion 131c extending from the first connection portion 131a to a portion of the second surface 2, and the second external electrode 132 may include a fourth band portion 132c extending from the connection portion 132a to a portion of the second surface 2. Further, the first external electrode 131 may include a first side band portion extending from the first connection portion 131a to portions of the fifth and sixth surfaces 5 and 6, and the second external electrode 132 may include a second side band portion extending from the second connection portion 132a to portions of the fifth and sixth surfaces 5 and 6.

However, the third band portion, the fourth band portion, the first side band portion and the second side band portion may not be provided in the example embodiment. The first and second external electrodes 131 and 132 may not be disposed on the second surface 2 or may not be disposed on the fifth and sixth surfaces 5 and 6. As the first and second external electrodes 131 and 132 are not disposed on the second surface 2, the first and second external electrodes 131 and 132 may be disposed below an extension line of the second surface of the body. Also, the first and second connection portions 131a and 132a may be spaced apart from the fifth and sixth surfaces 5 and 6, and the first and second connection portions 131a and 132a may be spaced apart from the second surface 2. Also, the first and second band portions 131b and 132b may also be spaced apart from the fifth and sixth surfaces 5 and 6.

When the first and second external electrodes 131 and 132 include the third and fourth band portions 131c and 132c, an insulating layer 151 may be formed on the third and fourth band portions 131c and 132c in the example embodiment, but an example embodiment thereof is not limited thereto. A plating layer 141/142 may be disposed on the third and fourth band portions 131c and 132c to improve mounting convenience. Also, the first and second external electrodes 131 and 132 may include the third and fourth band portions 131c and 132c and may not include the side band portions, and in this case, the first and second connection portions 131a and 132a and the first to fourth band portions 131a, 132b, 131c, and 132c may be spaced apart from the fifth and sixth surfaces.

In the example embodiment, the ceramic electronic component 100 may have two external electrodes 131 and 132. However, the number of the external electrodes 131 and 132 and the shape thereof may vary depending on the shapes of the internal electrodes 121 and 122 or other purposes.

The external electrodes 131 and 132 may be formed using any material having electrical conductivity, such as metal, and a specific material may be determined in consideration of electrical properties and structural stability, and may have a multilayer structure.

The external electrodes 131 and 132 may be a fired electrode including a conductive metal and glass, or a resin-based electrode including a conductive metal and a resin.

Also, the external electrodes 131 and 132 may have a shape in which a plastic electrode and a resin-based electrode are formed in order on a body. Also, the external electrodes 131 and 132 may be formed by transferring a sheet including a conductive metal onto the body or by transferring a sheet including a conductive metal to the fired electrode.

As the conductive metal included in the external electrodes 131 and 132, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 131 and 132 may include at least one of Ni and a Ni alloy, and accordingly, connectivity with the internal electrodes 121 and 122 including Ni may improve.

The insulating layer 151 may be disposed on the first and second connection portions 131a and 132a.

Since the first and second connection portions 131a and 132a are connected to the internal electrodes 121 and 122, the first and second connection portions 131a and 132a may become paths through which a plating solution may permeate in a plating process or moisture may permeate during actual use. In the example embodiment, since the insulating layer 151 is disposed on the connection portions 131a and 132a, permeation of external moisture or a plating solution may be prevented.

The insulating layer 151 may be in contact with the first and second plating layers 141 and 142. In this case, the insulating layer 151 may be in contact with and may partially cover ends of the first and second plating layers 141 and 142, or the first and second plating layers 141 and 142 be in contact with and may partially cover ends of the insulating layer 151.

The insulating layer 151 may be disposed on the first and second connection portions 131a and 132a, and may be disposed to cover the second surface 2 and the third and fourth band portions 131c and 132c. In this case, the insulating layer 151 may cover the third and fourth band portions 131c and 132c, and regions in which the third and fourth band portions 131c and 132c are not disposed on the second surface 2. Accordingly, the insulating layer 151 may cover the region in which the ends of the third and fourth band portions 131c and 132c are in contact with the body 110 and may block the moisture permeation path, thereby improving moisture resistance reliability.

The insulating layer 151 may be disposed on the second surface and may extend to the first and second connection portions 131a and 132a. Also, when the external electrodes 131 and 132 are not disposed on the second surface 2, the insulating layer 151 may be disposed to entirely cover the second surface 2. The insulating layer 151 may not necessarily be disposed on the second surface 2, and the insulating layer 151 may not be disposed on a portion or an entirety of the second surface 2, and also, the insulating layer 151 may be divided into two portions and the two portions may be disposed on the first and second connection portions 131a and 132a, respectively. When the insulating layer 151 is not disposed on an entirety of the second surface 2, the insulating layer 151 may be disposed below an extension line of the second surface 2. Also, the insulating layer may not be disposed on the second surface 2, and the insulating layer 151 may extend from the first and second connection portions 131a and 132a to the fifth and sixth surfaces 5 and 6 and may form an insulating layer.

Further, the insulating layer 151 may be disposed to cover portions of the first and second side band portions, the fifth surface 5, and the sixth surface 6. In this case, portions of the fifth and sixth surfaces 5 and 6 not covered by the insulating layer 151 may be exposed.

Also, the insulating layer 151 may be disposed to cover the first and second side band portions and the fifth and sixth surfaces 5 and 6, and in this case, the fifth and sixth surfaces 5 and 6 may not be exposed, such that moisture resistance reliability may improve. The connection portions 131a and 132a may not also be directly exposed, thereby improving reliability of the multilayer electronic component 1000. In greater detail, the insulating layer 151 may cover both the first and second side band portions, and may cover entire regions of the fifth and sixth surfaces 5 and 6 other than the region in which the first and second side band portions are formed.

The insulating layer 151 may prevent the plating layers 141 and 142 from being formed on the external electrodes 131 and 132 on which the insulating layer 151 is disposed, and may improve sealing properties, such that permeation of moisture or a plating solution may be reduced.

The multilayer electronic component 1000 in an example embodiment may include an insulating layer 151 disposed on the second surface 2 and extending to a portion on the first and second connection portions 131a and 132a.

The insulating layer 151 may be disposed on the second surface 2, may extend to the first connection portion 131a, the second connection portion 132a, a portion of the fifth surface 5 and a portion of the sixth surface 6 and may be in contact with the plating layers 141 and 142. Accordingly, the insulating layer 151 may simultaneously cover a portion of the first and second external electrodes 131 and 132 and a portion of the body 110 and may protect the multilayer electronic component 1000 from plating solution, moisture, and external impacts.

Also, as the entire surface of the first and second external electrodes 131 and 132 and the body 110 may not be covered and only a portion thereof may be covered, the plating layers 141 and 142 may be on the first and second external electrodes 131 and 132, such that the component may be mounted on the substrate 180.

That is, the multilayer electronic component 1000 in an example embodiment may include plating layers 141 and 142 disposed on the first and second band portions 131b and 132b.

The insulating layer 151 may include, but is not limited to, a glass material having excellent plating solution resistance, such as, for example, a glass material including Si, and may be formed of a material having sufficient strength which may protect the multilayer electronic component 1000 from tensile stress caused by thermal reduction. Also, the insulating layer 151 may include a single component or a plurality of components, and more preferably, to improve bonding strength with the body 100 or the external electrodes 131 and 132, the insulating layer 151 may include one or more selected from $TiO_2$, $BaTiO_3$, $Al_2O_3$, $SiO_2$, and BaO as an additive.

A method of forming the insulating layer 151 may vary depending on components and purposes. For example, a coating film is formed using an insulating paste using a squeegee, the external electrodes 131 and 132 may be disposed on the body 110, each cross-section may be immersed in sequence, and drying may be performed under a temperature of 150° C. Also, sol-gel processing, chemical vapor deposition (CVD), atomic layer deposition (ALD), or the like, may be used, but an example embodiment thereof is not limited thereto, and other methods for forming a thin and uniform insulating layer may be used.

In an example embodiment, the insulating layer 151 may be disposed to be in direct contact with the first and second external electrodes 131 and 132, and the first and second external electrodes 131 and 132 may include a conductive metal and glass. Accordingly, since the plating layers 141 and 142 may not be disposed in the region in which the insulating layer 151 is disposed among the external surfaces of the first and second external electrodes 131 and 132, erosion of the external electrodes caused by the plating solution may be effectively prevented.

In this case, the first plating layer 141 may be disposed to cover an end disposed on the first external electrode 131 of the insulating layer 151, and the second plating layer 142 may be disposed to an end disposed on the external electrode 132. By forming the insulating layer 151 before forming the plating layers 141 and 142 on the external electrodes 131 and 132, permeation of the plating solution during the process of forming the plating layer may be reliably prevented. As the insulating layer is formed before the plating layer, the plating layers 141 and 142 may cover ends of the insulating layer 151.

In an example embodiment, the insulating layer 151 may be disposed to be in direct contact with the first and second external electrodes 131 and 132, and the first and second external electrodes 131 and 132 may include a conductive metal and resin. Accordingly, since the plating layers 141 and 142 may not be disposed in the region in which the insulating layer 151 is disposed among the external surfaces of the first and second external electrodes 131 and 132, erosion of the external electrodes caused by the plating solution may be effectively prevented.

In this case, the first plating layer 141 may be disposed to cover the end disposed on the first external electrode 131 of the insulating layer 151, and the second plating layer 142 may be disposed to cover the end disposed on the external electrode 132 of the insulating layer 151. By forming the insulating layer 151 before forming the plating layers 141 and 142 on the external electrodes 131 and 132, permeation of the plating solution during the process of forming the plating layer may be reliably prevented.

The first and second plating layers 141 and 142 may be disposed on the first and second band portions 131b and 132b, respectively. The plating layers 141 and 142 may improve mounting properties, and as the plating layers 141 and 142 are disposed on the band portions 131b and 132b, the mounting space may be reduced, and also, permeation of the plating solution into an internal electrode may be reduced, such that reliability may improve. One ends of the first and second plating layers 141 and 142 may be in contact with the first surface, and the other end may be in contact with the insulating layer 151.

The type of the plating layers 141 and 142 is not limited to any particular example, and may be a plating layer including at least one of Cu, Ni, Sn, Ag, Au, Pd, and alloys thereof, and may include a plurality of layers.

As a more specific example of the plating layers 141 and 142, the plating layers 141 and 142 may be a Ni plating layer or a Sn plating layer, and a Ni plating layer and a Sn plating layer may be formed in sequence on the first and second band portions 131b and 132b.

A method of forming the plating layers 141 and 142 is not limited to any particular example. However, to improve adhesion properties, the plating layers 141 and 142 may be formed after the insulating layer 151 is formed. The plating layers 141 and 142 may be formed by one of a wet plating method, an electroplating method, and an electroless plating method, but an example embodiment thereof is not limited thereto. The plating layer may be formed by another method for forming a high-purity and uniform plating layer.

In an example embodiment, the plating layers 141 and 142 may extend to a portion on the first and second connection portions 131a and 132a. That is, the plating layers 141 and 142 may be disposed on the first and second band portions 131b and 132b and may extend to a portion on the first and second connection portions 131a and 132a and may be in contact with the insulating layer 151.

In related art, to prevent cracks in the multilayer electronic component due to thermal reduction of a solder fillet, a glass layer directly provided on one main surface of the body, and directly provided on a sintered layer on each cross-sectional side to be extended in a direction orthogonal to the side surface, and a metal layer provided to cover a sintered layer other than the portion covered by the glass layer for mounting by solder fillet and included in another portion of the surface of the external electrode.

The glass layer in the related art may be a glass material having excellent resistance against a plating solution, and may include 20 mol % or more and 65 mol % or less of Si. In the related art, when a mole fraction of Si is less than 20 mol %, and when resistance against the plating solution is insufficient and 65 mol % is exceeded, a glass softening point may increase and wettability with respect to the sintered body layer may degrade, such that the glass layer may be easily peeled.

Generally, a glass layer formed of a glass material including Si may be formed of a material having insulation regardless of a content of Si, such that adhesion with a plating layer formed of a metal component or an external electrode may be weakened, which may be problematic. Accordingly, delamination may occur in the multilayer electronic component from residual stress or external impact generated during the manufacturing process, and resistance to external impacts of the entire multilayer electronic component may be lowered.

In particular, since the structure disclosed in the related art has a structure in which the glass layer and the metal layer are simply connected to each other with the same thickness or substantially the same thickness, the above-described issues may occur, which may cause degradation of bonding strength when amounting the electronic component on a substrate through solder.

Hereinafter, correlation between the plating layers 141 and 142, the insulating layer 151, and the first and second connection portions 131a and 132a according to the multilayer electronic component 1000 in an example embodiment will be described with reference to the first connection portion 131a, and when the components are described with reference to the second connection portion 132a, overlapping descriptions will not be provided.

Referring to FIG. 4, the insulating layer 151 in an example embodiment may be disposed such that a thickness thereof may gradually decrease toward ends. The insulating layer 151 may be disposed such that a distance between both ends thereof taken in the length direction may decrease toward ends. Accordingly, a gap may be disposed between the insulating layer 151 and the first connection portion 131a.

The plating layer 141 may include an end in contact with the insulating layer 151, and may be divided into two regions.

An end of the plating layer 141 may include a first region S1 extending to a region between the insulating layer 151 and the first connection portion 131a, and a second region S2 extending to cover the insulating layer 151. The first region S1 may be an end region of the plating layer extending to a region between the insulating layer 151 and the first connection portion 131a. Accordingly, the first region S1 and the second region S2 may be connected to each other.

In the first region S1, the plating layer 151 may be in direct contact with the first connection portion 131a, such that the first region S1 may contribute to improving adhesion force.

The second region S2 may be a region of an end of the plating layer which may extend to cover the insulating layer 151. That is, the second region S2 may physically connect the insulating layer 151 to the plating layer 141.

As the end of the plating layer 151 includes the first region S1, the contact area between the plating layer 151 and the first connection portion 131a may improve, such that the adhesion force between the plating layer 151 and the first connection portion 131a may improve.

Also, by configuring the end of the plating layer to include the second region S2, an anchoring effect may occur between the insulating layer 151 and the insulating layer 141 such that physical bonding force may improve. More preferably, by disposing the insulating layer 151 between the first region S1 and the second region S2, the anchoring effect may improve.

In the multilayer electronic component 1000 in an example embodiment, in the region in which the plating layers 141 and 142 and the insulating layer 151 are in contact with each other, the thickness of the insulating layer 151 may decrease toward the end, and the ends of the plating layers may include the first region extending to a region between the insulating layer 151 and the first and second connection portions 131a and 132a and the second region extending to cover the insulating layer 151, such that, even when the insulating layer 151 is formed of a material having an insulating component, physical bonding force between the plating layer 141, the insulating layer 151, and the first connection portion 131a may improve, and overall strength of the multilayer electronic component 1000 may improve. Accordingly, external impact of the multilayer electronic component 1000 resistance against may improve, and even when being mounted on a substrate using solder, degradation of cohesion strength may be prevented.

In an example embodiment, when a1 is defined as a maximum length of the first region S1 in the first direction and a2 is defined as maximum length of the second region S2 in the first direction, a1>a2 may be satisfied. When a2 is larger than a1, the area in which the plating layer 141 is in contact with the insulating layer 151 may be larger than the area in which the plating layer 141 and the first connection portion 131a are in contact with each other, such that adhesion force between the plating layer 141, the insulating layer 151, and the connection portions 131a may not be sufficient. In an example embodiment, by satisfying a1>a2, the length or area in which the plating layer 141 is in contact with the first connection portion 131a may be increased, and the contact area between the plating layer 141 and the insulating layer 151 may be reduced, such that physical bonding force may improve. Accordingly, overall strength of the multilayer electronic component 1000 may improve.

Here, a1 may be the maximum length in the first direction of the first region S1, may refer to a distance from the end of the insulating layer 151 to the point at which the gap between the insulating layer 151 and the connection portions 131a and 132a starts. Also, a2 may be a maximum length of the second region S2 in the first direction, and may refer to a distance from the end of the insulating layer to an end of the second region covering the end of the insulating layer 151.

Each of a1 and a2 may be an average value of values measured in ten cross sections taken in the first direction-the second direction, obtained by cutting with an equal distance therebetween in the third direction.

A method of allowing the end of the plating layer to include the first region S1 and the second region S2 may be varied. For example, when the insulating layer 151 is formed by a dipping method, the first region S1 and the second region S2 may be formed by controlling the shape of a plastic carrier plate or rubber zig fixing the upper portion of the multilayer electronic component.

Specifically, the end of the plastic carrier or rubber zig may be manufactured to have a shape corresponding to the first region S1 and the second region S2, and the multilayer electronic component may be fixed and immersed in the insulating paste. In this case, since the insulating layer is formed on a portion not occupied by the plastic carrier or the rubber zig, the insulating layer may not be formed in the region corresponding to the first region S1 and the second region S2.

The multilayer electronic component may be immersed in the insulating paste and may be dried at a temperature of about 150° C. The multilayer electronic component may be separated from the plastic carrier or rubber zig, and the plating layer may be formed to a portion in which the insulation layer is not formed.

In this case, since the plating solution permeates into the region in which the end of the plastic carrier or rubber zig has been disposed, the end of the plating layer may form the first region S1 and the second region S2.

In this case, the thickness of the plating layer may be adjusted by changing the amount of plating solution or plating conditions, and also, the maximum length a1 of the first region in the first direction and the maximum length a2 of the second region may be adjusted by adjusting the shape of the end of the plastic carrier or rubber zig.

The order of forming the insulating layer 151 and the plating layer 141 is not limited to any particular example, and the plating layer 151 may be formed on the connection portions 131a and 132a or the band portions 131b and 132b of the external electrodes 131 and 132 in which the insulating layer 151 is not disposed after the insulating layer 151 is formed, such that the gap between the plating layers 141 and 142 and the insulating layer 151 may be significantly reduced.

Referring to FIG. 3, in the multilayer electronic component 1000 according to an example embodiment, when an average distance in the first direction from the first surface 1 to an internal electrode disposed most adjacent to the first surface 1 among the internal electrodes 121 and 122 is defined as H1, and an average distance in the first direction from an extension line of the first surface 1 to ends of the plating layers 141 and 142 disposed on the first and second connection portions 131a and 132a is defined as H2, H1>H2 (or H1≥H2) may be satisfied. Accordingly, permeation of the plating solution into the internal electrode during the plating process may be prevented, thereby improving reliability.

The size of the multilayer electronic component 1000 may not need to be limited to any particular example.

However, to obtain both miniaturization and high capacitance, it may be necessary to increase the number of laminated layers by reducing the thicknesses of the dielectric layer and the internal electrode. Accordingly, effect of improving reliability and capacitance per unit volume in the example embodiment may be significant in a multilayer electronic component having a size of 1005 (length×width to be 1.0 mm×0.5 mm) or less.

Accordingly, when manufacturing errors, external electrode sizes, or the like are considered, when the length of the ceramic electronic component 100 is 1.1 mm or less and the width is 0.55 mm or less, the effect of improving reliability in the example embodiment may improve. Here, the length of the multilayer electronic component 1000 may refer to a size of the multilayer electronic component 1000 in the second direction, and the width of the multilayer electronic component 1000 may refer to a size of the multilayer electronic component 1000 in the third direction.

Hereinafter, a multilayer electronic component 1001 according to another example embodiment will be described, and the description overlapping with the descriptions of the electronic component 1000 in the aforementioned example embodiment will not be provided.

Figure 7:
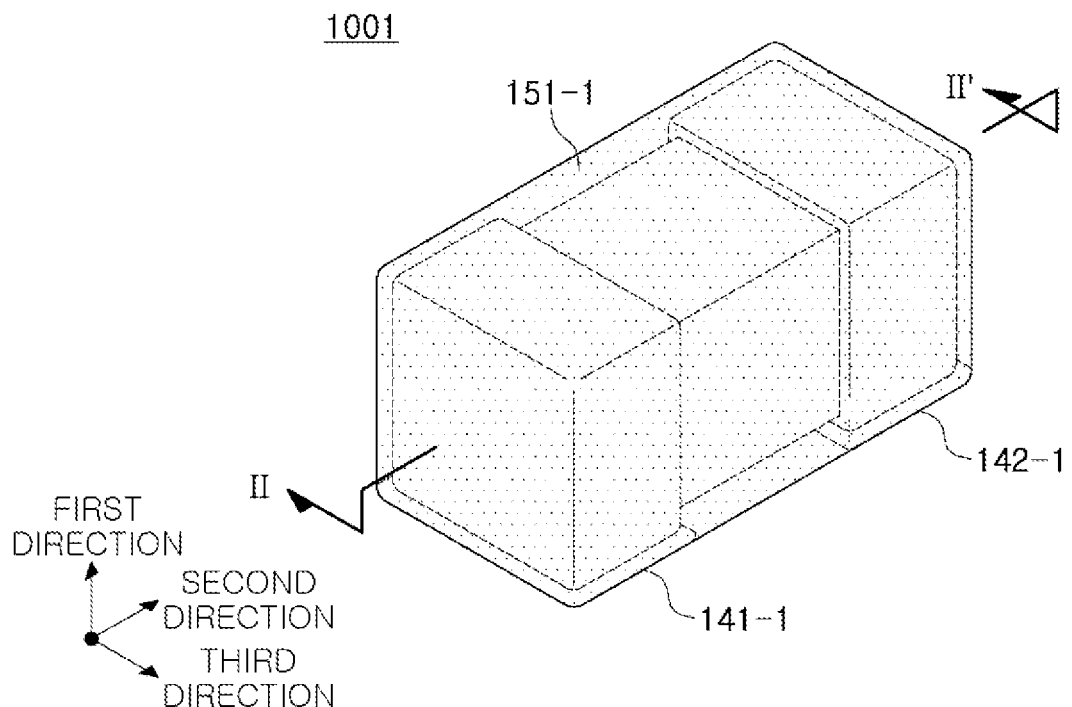
FIG. 7 is a perspective diagram illustrating a multilayer electronic component according to an example embodiment of the present disclosure.
Figure 8:
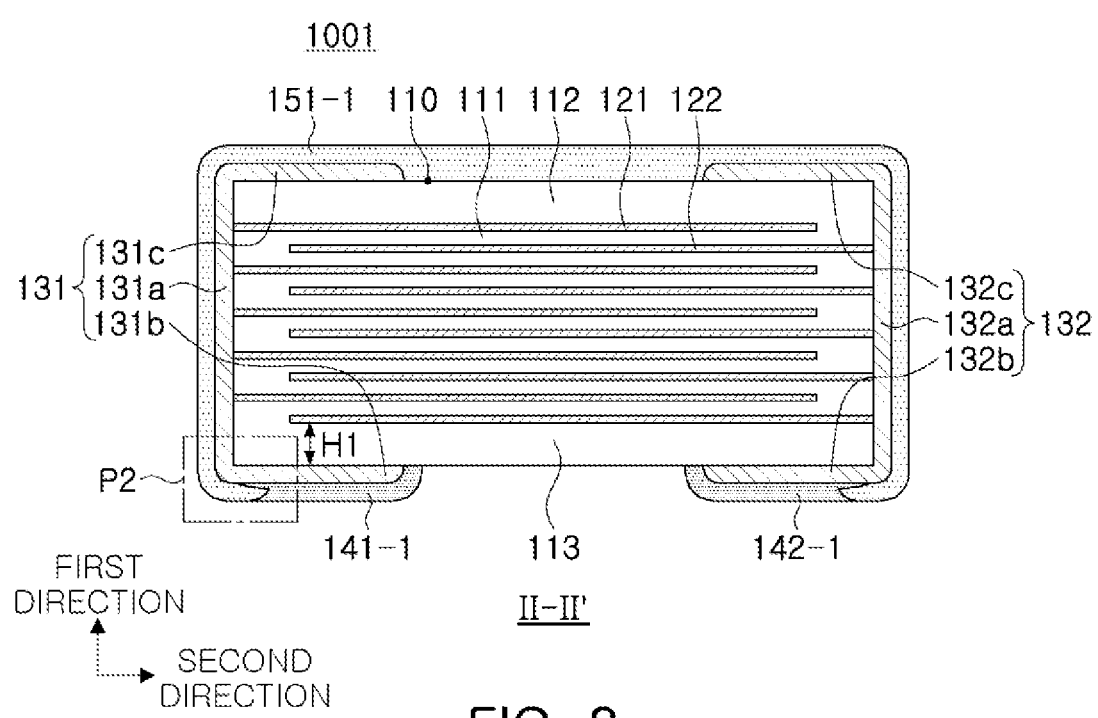
FIG. 8 is a cross-sectional diagram taken along line II-II' in FIG. 7.
Figure 9:
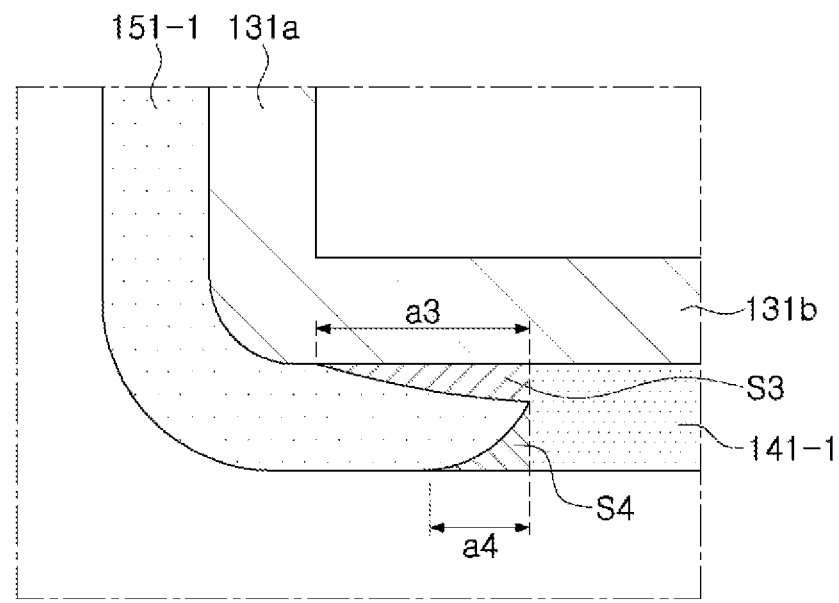
FIG. 9 is an enlarged diagram illustrating region P2 in FIG. 8.

FIG. 7 is a perspective diagram illustrating a multilayer electronic component according to an example embodiment.
FIG. 8 is a cross-sectional diagram taken along line II-II' in FIG. 7.
FIG. 9 is an enlarged diagram illustrating region P2 in FIG. 8.

Referring to FIGS. 7 to 9, the multilayer electronic component 1001 according to another example embodiment may include an insulating layer 151-1 disposed on the second surface 2 and the first and second connection portions 131a and 132a and extending to a portion on the first and second band portions 131b and 132b, and plating layers 141-1 and 142-1 disposed on the first and second band portions 131b and 132b and in contact with the insulating layer 151-1. Also, in the region in which the insulating layer and the plating layer are in contact with the insulating layer, the thickness of the insulating layer 151-1 may gradually decrease toward the end, and the end of the plating layer may include a third region S3 extending to a region between the insulating layer 151-1 and the first and second band portions 131b and 132b and a fourth region S4 extending to cover the insulating layer 151-1. Accordingly, the height of the solder may be reduced during mounting and the mounting space may be reduced.

Referring to FIG. 9, the insulating layer 151-1 of the multilayer electronic component 1001 according to another example embodiment may be disposed to have a thickness decreasing toward the ends on the first and second band portions 131b and 132b. Preferably, the insulating layer 151-1 may be disposed such that the distance between both ends in the length direction may gradually decrease toward the end. Accordingly, a gap may be disposed between the insulating layer 151-1 and the first and second band portions 131b and 132b.

Hereinafter, the first band portion 131b will be described, and when the second band portion 132b is described, overlapping descriptions will not be provided.

The plating layer 141-1 may include an end in contact with the insulating layer 151-1, and may be divided into two regions.

An end of the plating layer 141-1 may include a third region S3 extending to a region between the insulating layer 151-1 and the first band portion 131b, and may include a fourth region S4 extending to cover the insulating layer 151-1. The third region S3 may be an end region of the plating layer extending to a region between the insulating layer 151-1 and the first band portion 131b. Accordingly, the third region S3 and the fourth region S4 may be connected to each other.

In the third region, the plating layer 151-1 may be in direct contact with the first band portion 131b, and accordingly, the third region S3 may greatly contribute to improvement of adhesion force.

The fourth region S4 may be an end region of the plating layer which may extend to cover the insulating layer 151-1. That is, the fourth region S4 may physically connect the insulating layer 151-1 to the plating layer 141-1.

By making the end of the plating layer 151-1 to include the third region S3, the contact area between the plating layer 151-1 and the first band portion 131b may improve, such that adhesion force between the plating layer 151-1 and the first band portions 131b may improve.

Also, by configuring the end of the plating layer to include the fourth region S2, an anchoring effect may occur between the insulating layer 151-1 and the insulating layer 141-1, thereby improving physical bonding force. More preferably, since the insulating layer 151-1 is disposed between the third region S3 and the fourth region S4, the anchoring effect may improve.

According to the multilayer electronic component 1001 in another example embodiment, in the region in which the plating layers 141-1 and 142-1 and the insulating layer 151-1 are in contact with the insulating layer 151-1, the thickness of the insulating layer 151-1 may decrease toward the ends, and the ends of the plating layers 141 and 142 may include the third region extending to a region between the first and second band portions 131b and 132b and the fourth region extending to cover the insulating layer 151, such that physical bonding force between the plating layer 141, the insulating layer 151, and the connection portions 131b and 132b may improve, and overall strength of the multilayer electronic component 1001 may improve.

In an example embodiment, when a3 is defined as a maximum length of the third region S3 in the second direction and a4 is defined as a maximum length of the fourth region S4 in the second direction, a3>a4 may be satisfied. When a4 is larger than a3, since the contact area between the plating layer 141-1 and the insulating layer 15-1 is larger than the contact area between the plating layer 141-1 and the first band portion 131b, such that adhesion force between the insulating layer 151-1 and the first connection portion 131b may not be sufficient. In an example embodiment, by satisfying a3>a4, the length or area in which the plating layer 141-1 is in contact with the first connection portion 131b may increase, and the area in which the plating layer 141-1 is in contact with the insulating layer 151-1 may be reduced, such that physical bonding force may improve. Accordingly, overall strength of the multilayer electronic component 1001 may improve.

Here, a3 may be the maximum length of the third region S3 in the second direction, and may indicate a distance from the end of the insulating layer 151-1 to a point at which the gap between the insulating layer 151-1 and the band portions 131b and 132b starts. Also, a4 may be the maximum length of the fourth region S4 in the second direction, and may indicate a distance from the end of the insulating layer 151-1 to an end of the fourth region covering the end of the insulating layer 151-1.

Here, a3 and a4 may be an average value of values measured in ten cross sections taken in the first direction-the second direction, obtained by cutting with an equal distance therebetween in the third direction.

Referring to FIG. 8, in the multilayer electronic component 1001 according to an example embodiment, an average distance in the first direction from the first surface 1 to an internal electrode disposed most adjacent to the first surface 1 among the internal electrodes 121 and 122 may be defined as H1.

In an example embodiment, when the size of the body 110 in the second direction is defined as L, the size from an extension line of the third surface to an end of the first band portion 131b in the second direction is defined as B1, and the size from an extension line of the fourth surface to the end of the second band portion 132b is defined as B2, $0.2 \leq B1/L \leq 0.4$ and $0.2 \leq B2/L \leq 0.4$ may be satisfied.

When B1/L and B2/L are less than 0.2, it may be difficult to secure sufficient cohesion strength. When B2/L is greater than 0.4, a leakage current may be generated between the first band portion 131b and the second band portion 132b under a high-voltage current, and the first band portion 131b and the second band portion 132b may be electrically connected to each other due to plating spread.

When the internal electrodes 121 and 122 are laminated in the first direction, the multilayer electronic component 1000 may be horizontally mounted on the substrate 180 such that the internal electrodes 121 and 122 may be parallel to the mounting surface. However, an example embodiment thereof is not limited to the horizontal mounting, and when the internal electrodes 121 and 122 are laminated in the third direction, the multilayer electronic component may be vertically mounted on the substrate such that the internal electrodes 121 and 122 may be disposed to be perpendicular to the mounting surface.

Hereinafter, a multilayer electronic component according to another example embodiment will be described, and descriptions overlapping the descriptions of the multilayer electronic component according to the aforementioned example embodiment 1000 or another example embodiment 1001 will not be provided.

Figure 10:
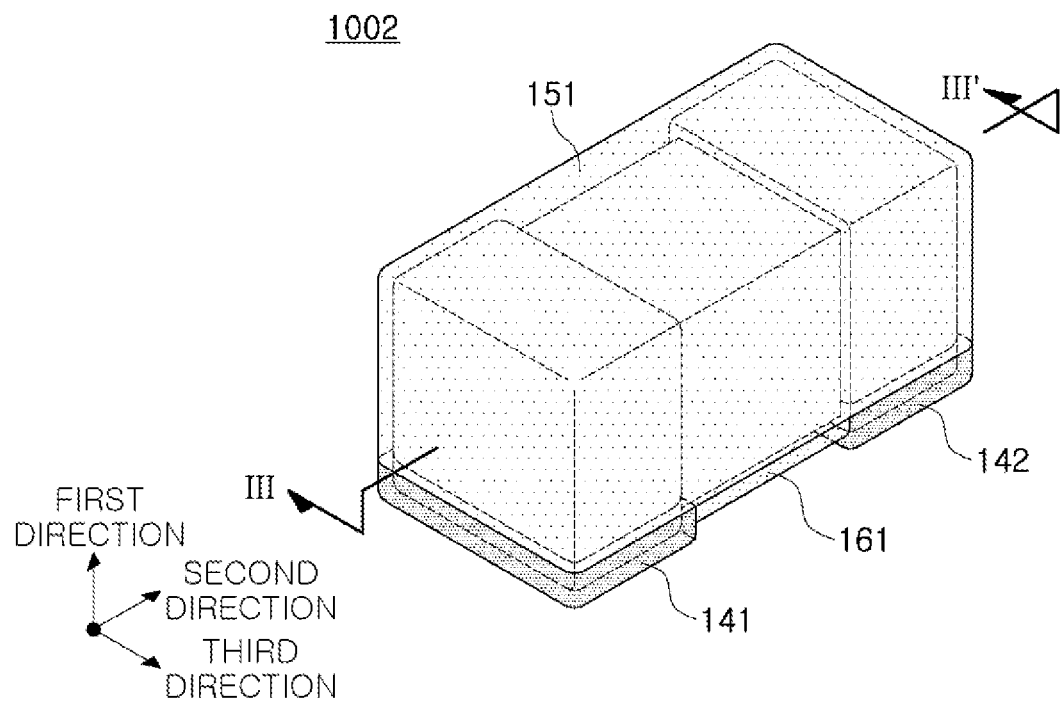
FIG. 10 is a perspective diagram illustrating a multilayer electronic component according to an example embodiment of the present disclosure.
Figure 11:
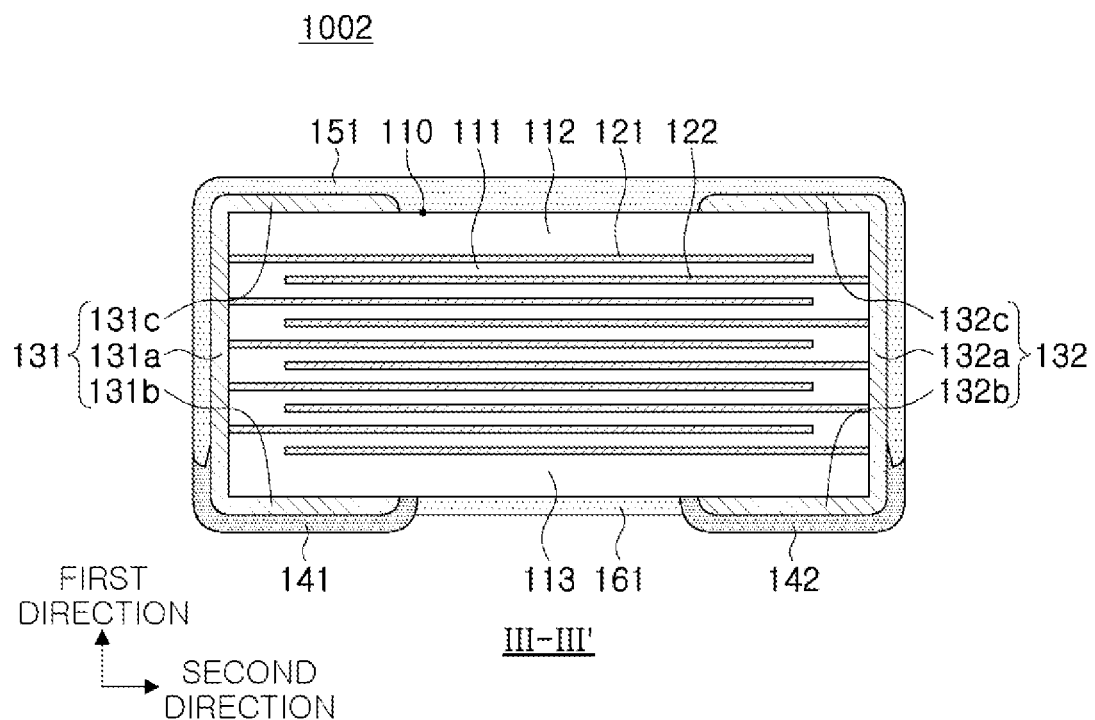
FIG. 11 is a cross-sectional diagram taken along line in FIG. 10.

FIG. 10 is a perspective diagram illustrating a multilayer electronic component 1002 according to an example embodiment. FIG. 11 is a cross-sectional diagram taken along line in FIG. 10.

Referring to FIGS. 10 and 11, the multilayer electronic component 1002 in an example embodiment may include an additional insulating layer 161 disposed on the first surface 1 and disposed between a first band portion 131b and a second band portion 132b. Accordingly, a leakage current which may occur between the first band portion 131b and the second band portion 132b under a high voltage current may be prevented.

The type of the additional insulating layer 161 may not need to be limited to any particular example. For example, the additional insulating layer 161 may include the same component as that of the insulating layer 151. The additional insulating layer 161 and the insulating layer 151 may not need to be formed of the same material, and may be formed of different materials. For example, the additional insulating layer 161 may include one or more thermosetting resins selected from an epoxy resin, an acrylic resin, and the like. Also, the additional insulating layer 161 may include one or more selected from $TiO_2$, $BaTiO_3$, $Al_2O_3$, $SiO_2$, BaO, or the like, as an additive in addition to polymer resin. Accordingly, bonding force with the body or the external electrode may improve.

Figure 12:
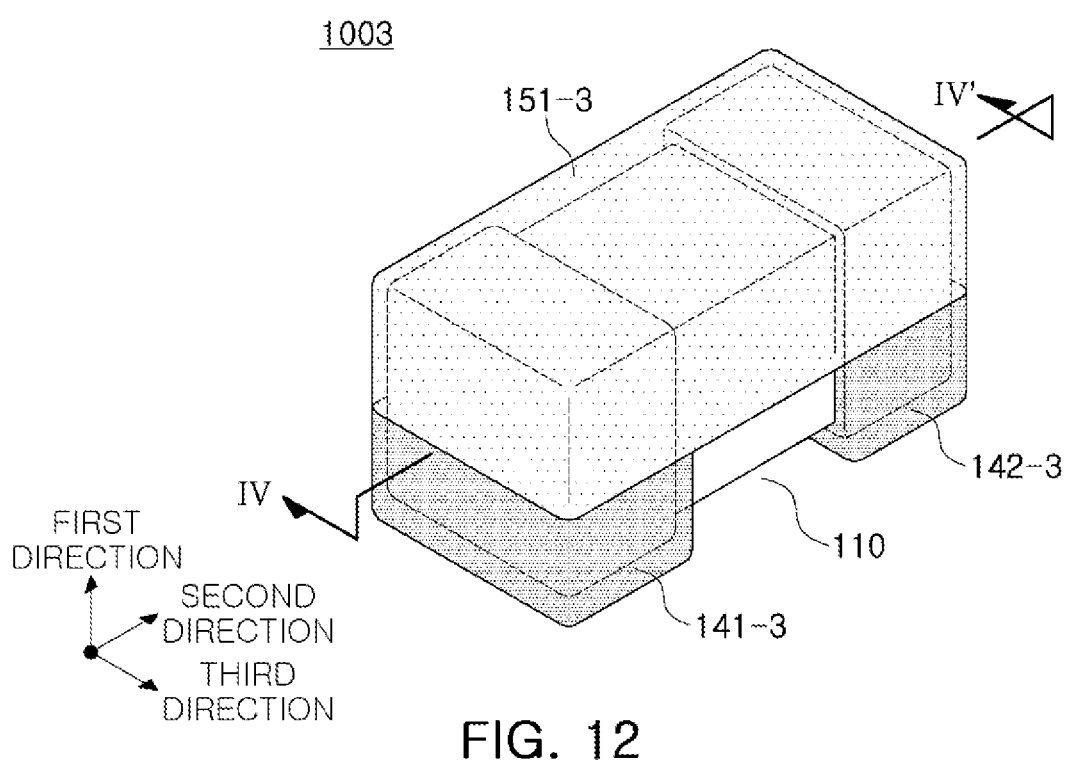
FIG. 12 is a perspective diagram illustrating a multilayer electronic component according to an example embodiment of the present disclosure.
Figure 13:
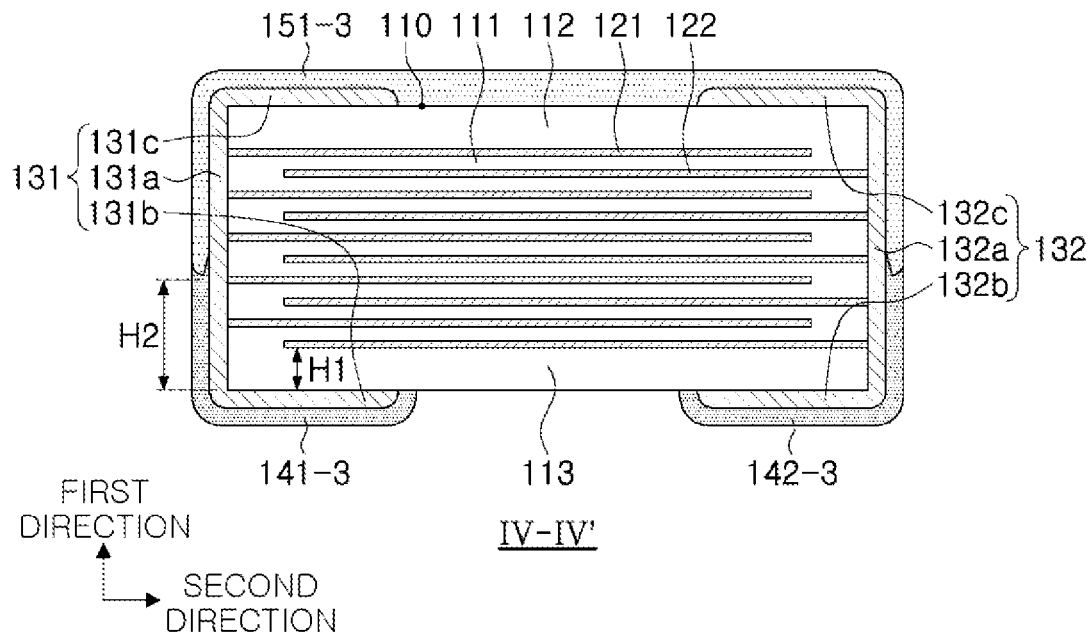
FIG. 13 is a cross-sectional diagram taken along line IV-IV' in FIG. 12.

FIG. 12 is a perspective diagram illustrating a multilayer electronic component 1003 according to an example embodiment. FIG. 13 is a cross-sectional diagram taken along line IV-IV' in FIG. 12.

Referring to FIGS. 12 and 13, in the multilayer electronic component 1003 according to an example embodiment, when an average distance in the first direction from the first surface 1 to an internal electrode disposed most adjacent to the first surface 1 among the internal electrodes 121 and 122 is defined as H1, and an average distance in the first direction from an extension line of the first surface 1 to ends of the plating layers 141-3 and 142-3 disposed on the first and second connection portions 131a and 132a is defined as H2, H1<H2 may be satisfied. Accordingly, the region in contact with solder during mounting may increase, such that cohesion strength may improve.

More preferably, when an average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

H1, H2, and T may be average values of values measured at five points spaced apart by an equal distance in the third direction on a cross-section (L-T cross-section) obtained by cutting the body 110 in the first and second directions. H1 may be an average value of values measured at the point at which the internal electrode disposed most adjacent to the first surface 1 is connected to the external electrode in each cross-section, H2 is an average value of values measured with reference to an end of the plating layer in contact with the external electrode in each cross-section, and the extension lines of the first surface which may be a reference of when H1 and H2 are measured may be the same. Also, T may be an average value obtained by measuring maximum sizes of the body 110 in the first direction in each cross-section.

Figure 14:
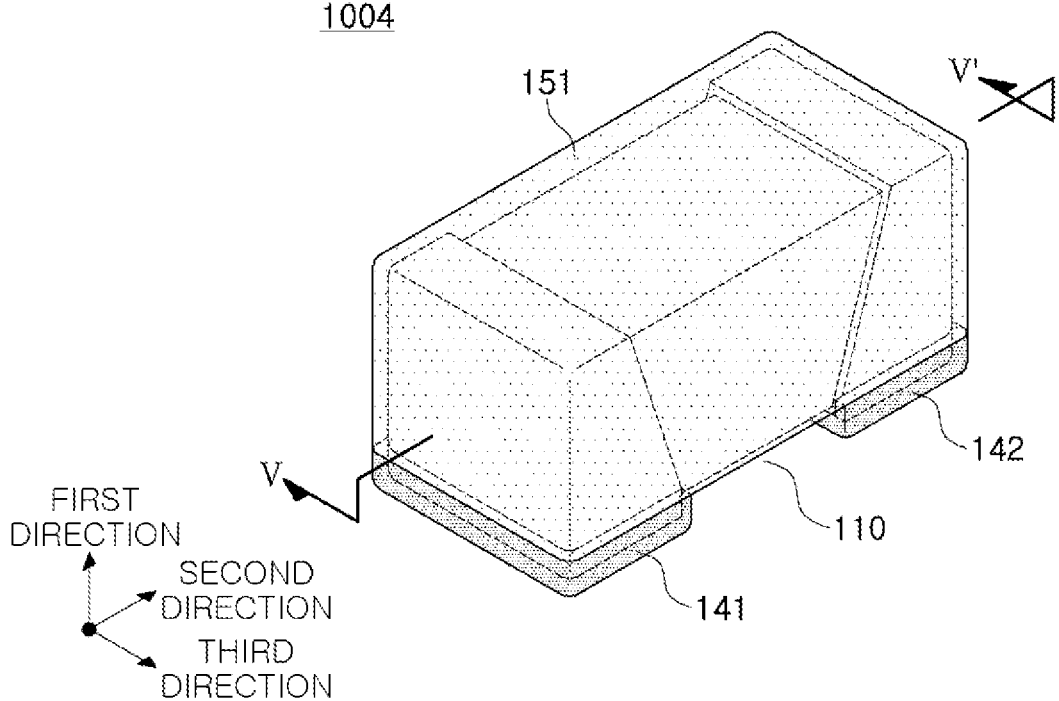
FIG. 14 is a perspective diagram illustrating a multilayer electronic component according to an example embodiment of the present disclosure.
Figure 15:
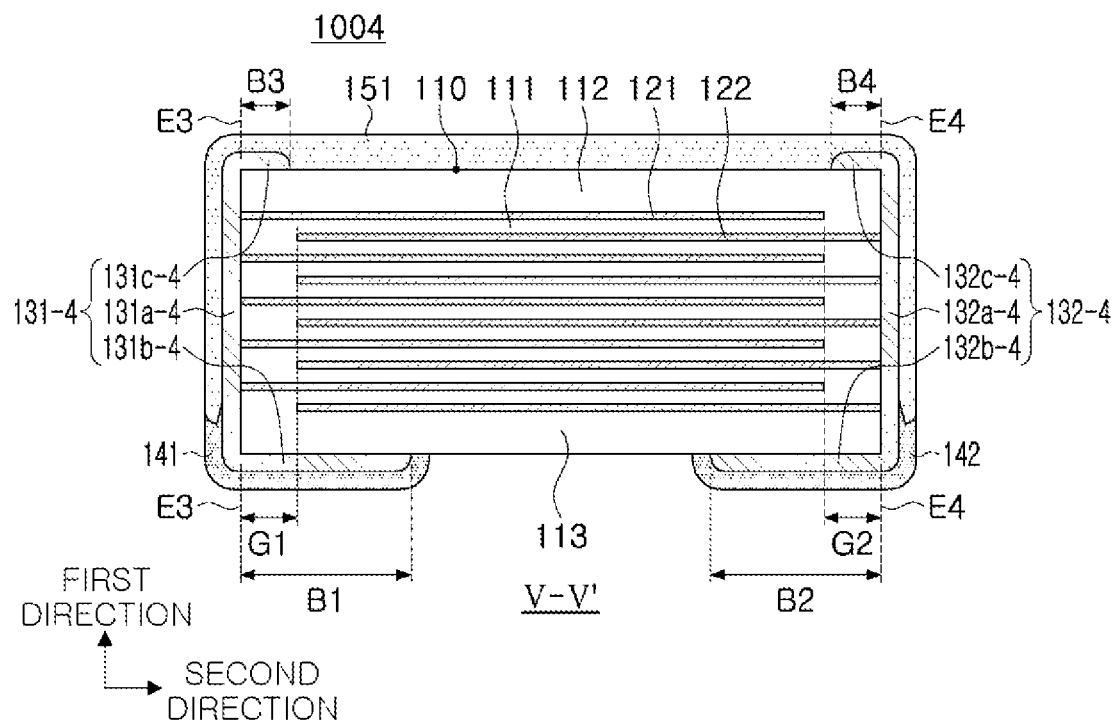
FIG. 15 is a cross-sectional diagram taken along line V-V' in FIG. 14.

FIG. 14 is a perspective diagram illustrating a multilayer electronic component 1004 according to an example embodiment. FIG. 15 is a cross-sectional diagram taken along line V-V' in FIG. 14. Referring to FIGS. 14 and 15, in the multilayer electronic component 1004 in an example embodiment, an average length B1 of the first band portion 131b-4 may be greater than an average length B3 of the third band portion 131c-4, and an average length of the second band portion 132b-4 may be greater than an average length B4 of the fourth band portion 132c-4. Accordingly, the region in contact with the solder during mounting may increase, such that cohesion strength may improve.

In greater detail, the average distance in the second direction from an extension line of the third surface 3 to an end of the first band portion 131b-4 is defined as B1, an average distance in the second direction from an extension line of the fourth surface 4 to an end of the second band portion 132b-4 is defined as B2, an average distance in the second direction from an extension line of the third surface 3 to an end of the third band portion 131c-4 is defined as B3, and an average distance in the second direction from an extension line of the fourth surface 4 to an end of the fourth band portion 132c-4 is defined as B4. B3<B1 and B4<B2 may be may be satisfied.

In this case, when an average size of the body 110 in the second direction is defined as L, $0.2 \leq B1/L \leq 0.4$ and $0.2 \leq B2/L \leq 0.4$ may be satisfied.

B1, B2, B3, B4 and L may be average values of values measured at five points spaced apart by an equal distance in the third direction on a cross-section (L-T cross-section) obtained by cutting the body 110 in the first and second directions.

Also, the first external electrode 131-4 may include a first side band portion extending from the first connection portion 131a-4 to portions of the fifth and sixth surfaces 5 and 6, and the second external electrode 132-4 may include a second side band portion extending from the second connection portion 132a-4 to portions of the fifth and sixth surfaces 5 and 6. In this case, the sizes of the first and second side band portions in the second direction may gradually increase toward the first surface. That is, the first and second side band portions may be disposed in a tapered shape or a trapezoidal shape.

Further, when an average distance in the second direction from an extension line of the third surface 3 to an end of the third band portion 131c-4 is defined as B3, an average distance in the second direction from an extension line of the fourth surface 4 to an end of the fourth band portion 132c-4 is defined as B4, an average size of a region, taken in the second direction, in which the third surface 3 and the second internal electrode 122 are spaced apart from each other is defined as G1, and an average size of a region, taken in the second direction, in which the fourth surface 4 and the second internal electrode 122 are spaced apart from each other is defined as G2, B3≤G1 and B4≤G2 may be satisfied. Accordingly, the volume occupied by the external electrode may be reduced, such that capacitance per unit volume of the multilayer electronic component 1004 may be increased.

As for G1 and G2, an average value of sizes in the second direction, spaced apart from the third surface, measured with respect to arbitrary five second internal electrodes disposed in a central portion taken in the first direction on a cross-section obtained by cutting the body in the first and second directions in a center taken in the third direction may be G1, and an average values of sizes in the second direction, spaced apart from the fourth surface, measured with respect to arbitrary five second internal electrodes disposed in a central portion taken in the first direction in a central portion taken in the first direction may be G2.

Further, G1 and G2 may be obtained from the cross section (L-T cross-section) obtained by cutting the body 110 in the first and second directions at five points disposed with an equal distance in the third direction, and the average values thereof may be G1 and G2.

However, an example embodiment thereof is not limited to B3≤G1 and B4≤G2, and the example in which B3≥G1 and B4≥G2 are satisfied may be included as an example embodiment. Accordingly, in an example embodiment, when an average distance in the second direction from an extension line of the third surface 3 to an end of the third band portion 131c-4 is defined as B3, an average distance in the second direction from an extension line of the fourth surface 4 to an end of the fourth band portion 132c-4 is defined as B4, an average size of the region in which the third surface 3 and the second internal electrode 122 are spaced apart from each other, taken in the second direction, is defined as G1, and an average size of the region in which the fourth surface 4 and the first internal electrode 121 are spaced apart from each other, taken in the second direction, is defined as G2, B3≥G1 and B4≥G2 may be satisfied.

In an example embodiment, when an average distance in the second direction from an extension line of the third surface 3 to an end of the first band portion 131b-4 is defined as B1, and an average distance in the second direction from an extension line of the fourth surface 4 to an end of the second band portion 132b-4 is defined as B2, B1≥G1 and B2≥G2 may be satisfied. Cohesion strength of the multilayer electronic component 1004 with the substrate 180 may improve.

Figure 16:
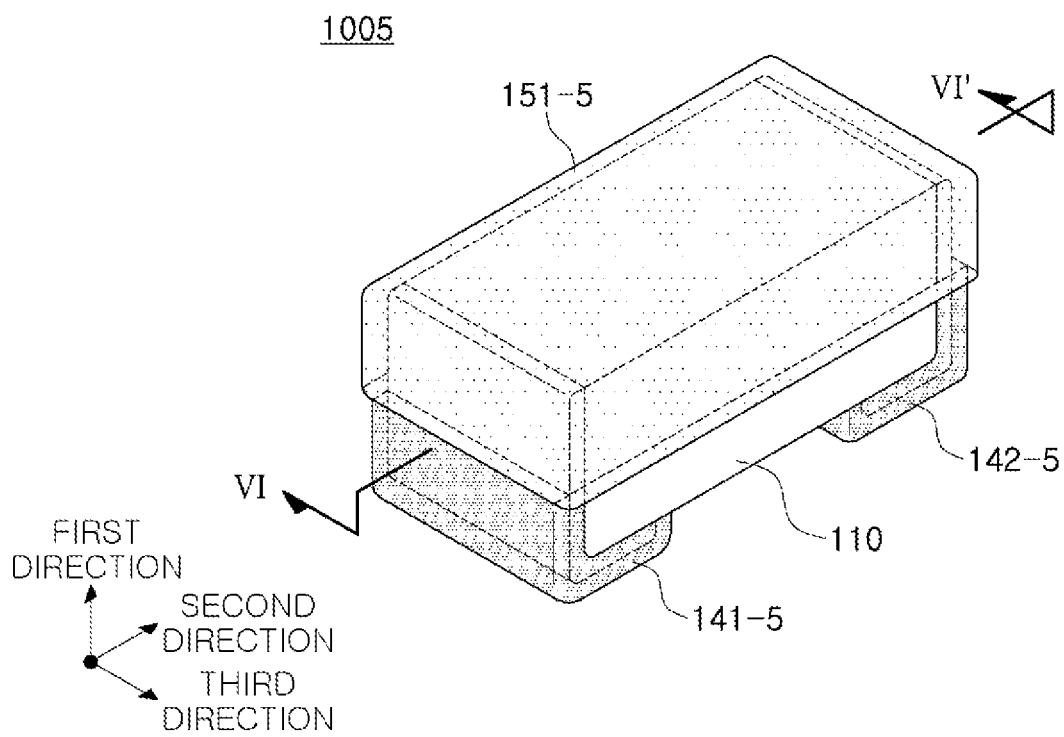
FIG. 16 is a perspective diagram illustrating a multilayer electronic component according to an example embodiment of the present disclosure.
Figure 17:
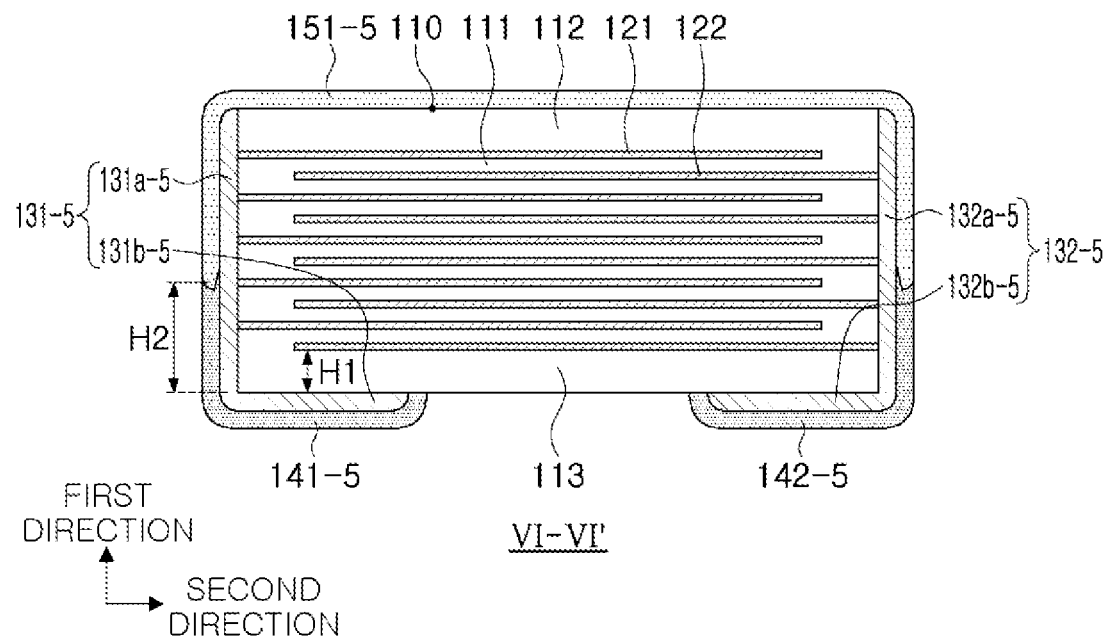
FIG. 17 is a cross-sectional diagram taken along line VI-VI' in FIG. 16.

FIG. 16 is a perspective diagram illustrating a multilayer electronic component 1005 according to an example embodiment. FIG. 17 is a cross-sectional diagram taken along line VI-VI' in FIG. 16. Referring to FIGS. 16 and 17, the first and second external electrodes 131-5 and 132-5 of the multilayer electronic component 1005 in an example embodiment may not be disposed on the second surface 2, and may be disposed on the third, fourth, and first surfaces 3, 4, and 1 and may have an L-shape. That is, the first and second external electrodes 131-5 and 132-5 may be disposed below an extension line of the second surface.

The first external electrode 131-5 may include a first connection portion 131a-5 disposed on the third surface 3, and a first band portion 131b-5 extending from the first connection portion 131a-5 to a portion of the first surface 1. The second external electrodes 131-5 and 132-5 may include a second connection portion 132a-5 disposed on the fourth surface 4, and a second band portion 132b-5 extending from the second connection portion 132a-5 to a portion of the first surface 1. The external electrodes 131-5 and 132-5 may not be disposed on the second surface 2, such that the insulating layer 151-5 may be disposed to cover the entire second surface 2. Accordingly, the volume occupied by the external electrodes 131-5 and 132-5 may be reduced, such that capacitance per unit volume of the multilayer electronic component 1005 may improve. However, an example embodiment thereof is not limited to the example in which the insulating layer 151-5 cover an entirety of the second surface 2, and the insulating layer may not cover a portion or an entirety of the second surface 2, and may be separated therefrom and may cover the first and second connection portions 131a-5 and 132a-5.

Also, the insulating layer 151-5 may be disposed to cover portions of the fifth and sixth surfaces 5 and 6, thereby improving reliability. In this case, portions of the fifth and sixth surfaces not covered by the insulating layer 151-5 may be exposed.

Further, the insulating layer 151-5 may be disposed to cover an entirety of the fifth and sixth surfaces 5 and 6, and in this case, the fifth and sixth surfaces 5 and 6 may not be exposed, such that moisture resistance reliability may improve.

A first plating layer 141-5 may be disposed on the first band portion 131b-5, a second plating layer 142-5 may be disposed on the second band portion 132b-5, and the first and second plating layers 141-5 and 142-5 may extend to a portion on the first and second connection portions 132a-5 and 132b-5.

In this case, the external electrodes 131-5 and 132-5 may not be disposed on the fifth and sixth surfaces 5 and 6 as well. That is, the external electrodes 131-5 and 132-5 may be disposed only on the third, fourth, and first surfaces 3, 4, and 1.

An average distance in the first direction from the first surface 1 to an internal electrode disposed most adjacent to the first surface 1 among the first and second internal electrodes 121 and 122 is defined as H1, and an average distance in the first direction from an extension line of the first surface 1 to ends of the plating layers 141-5 and 142-5 disposed on the first and second connection portions 131a-5 and 132a-5 is defined as H2. H1<H2 may be satisfied. Accordingly, the region in contact with solder during mounting may increase such that cohesion strength may improve, and the area in which the external electrodes 131-5 and 132-5 and the plating layers 141-5 and 142-5 are in contact with each other may increase such that an increase in equivalent series resistance (ESR) may be prevented.

More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may decrease.

Also, the first and second plating layers 141-5 and 142-5 may be disposed to cover a portion of the insulating layer 151-1 on the third and fourth surfaces. That is, the plating layers 141-5 and 142-5 may be disposed to cover ends of the insulating layer 151-5 on the third and fourth surfaces. Accordingly, bonding force between the insulating layer 151-5 and the plating layers 141-5 and 142-5 may be strengthened such that reliability of the multilayer electronic component 1005 may improve.

Also, the insulating layer 151-5 may be disposed to cover a portion of the first and second plating layers 141-5 and 142-5 on the third and fourth surfaces 3 and 4. That is, the insulating layer 151-5 may be disposed to cover ends of the plating layers 141-5 and 142-5 on the third and fourth surfaces 3 and 4. Accordingly, bonding force between the insulating layer 151-5 and the plating layers 141-5 and 142-5 may be strengthened such that reliability of the multilayer electronic component 1005 may improve.

Figure 18:
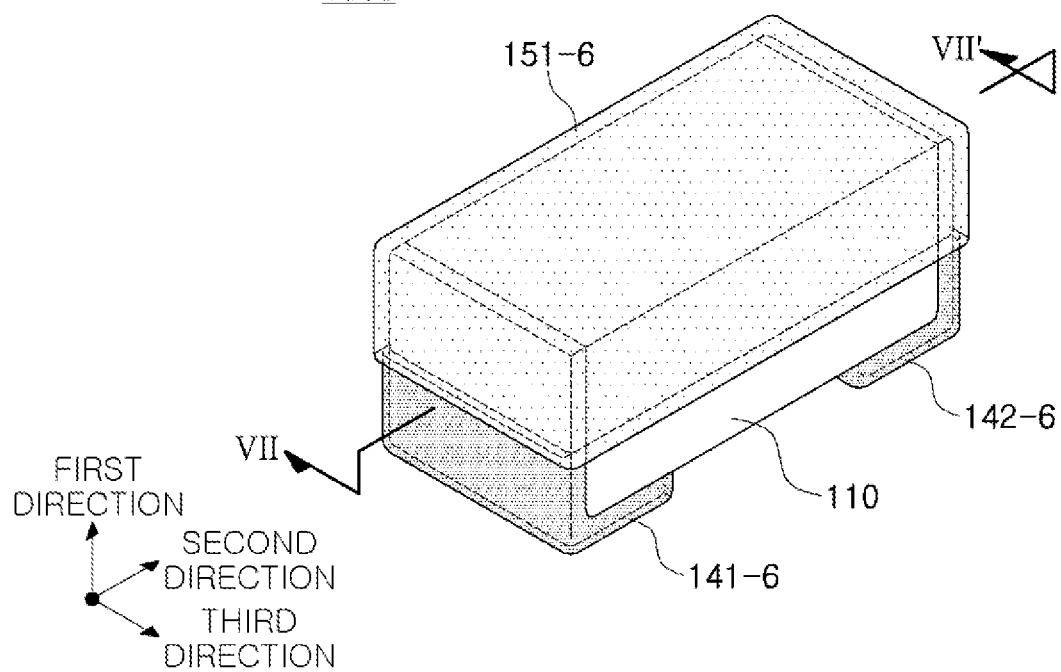
FIG. 18 is a perspective diagram illustrating a multilayer electronic component according to an example embodiment of the present disclosure.
Figure 19:
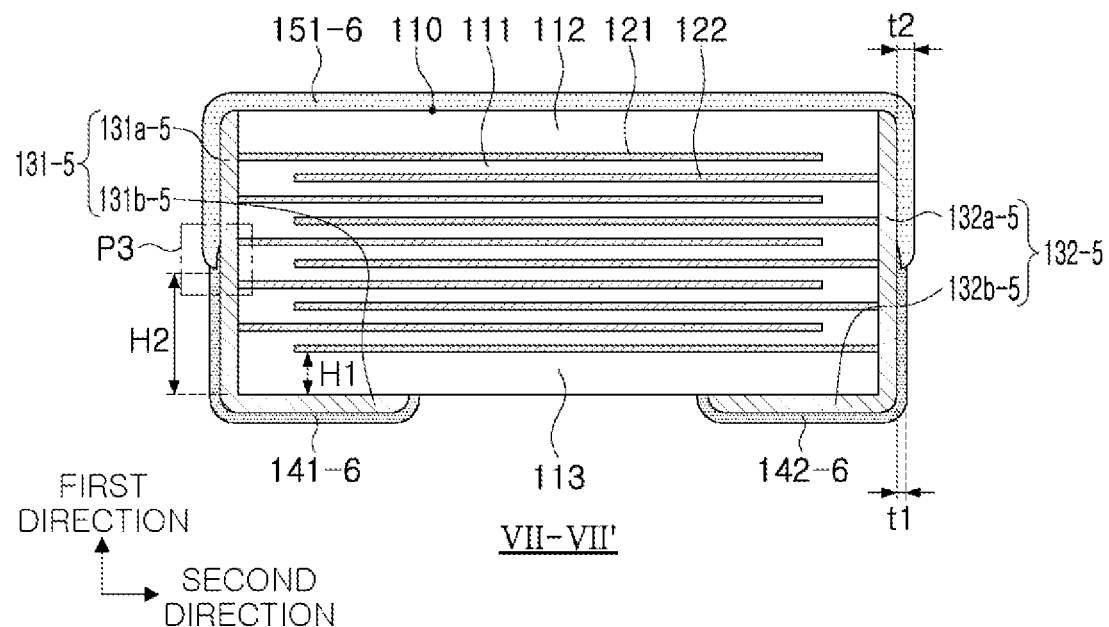
FIG. 19 is a cross-sectional diagram taken along line VII-VII' in FIG. 18.

FIG. 18 is a perspective diagram illustrating a multilayer electronic component according to an example embodiment. FIG. 19 is a cross-sectional diagram taken along line VII-VII' in FIG. 18.

Referring to FIGS. 18 and 19, an average thickness t1 of the first and second plating layers 141-6 and 142-6 of the multilayer electronic component 1006 in an example embodiment may be less than an average thickness t2 of the insulating layer 151-6.

By reducing the thickness t1 of the first and second plating layers 141-6 and 142-6 to be less than the thickness t2 of the insulating layer 151-6, the area in which the first and second plating layers 141-6 and 142-6 are in contact with the insulating layer 151-6 may be reduced, and accordingly, overall bonding force of the multilayer electronic component 1006 may improve.

The thickness t1 of the first and second plating layers 141-6 and 142-6 may be an average value of thicknesses of 10 points of the first and second connection portions 131a-5 and 132a-5 or the first and second band portions 131b-5 and 132b-5, spaced apart by an equal distance in the first direction, and the thickness t2 of the insulating layer 151-6 may be an average value of thicknesses of 10 points of the first and second connection portions 131a-5 and 132a-5, spaced apart by an equal distance in the first direction.

Figure 20:
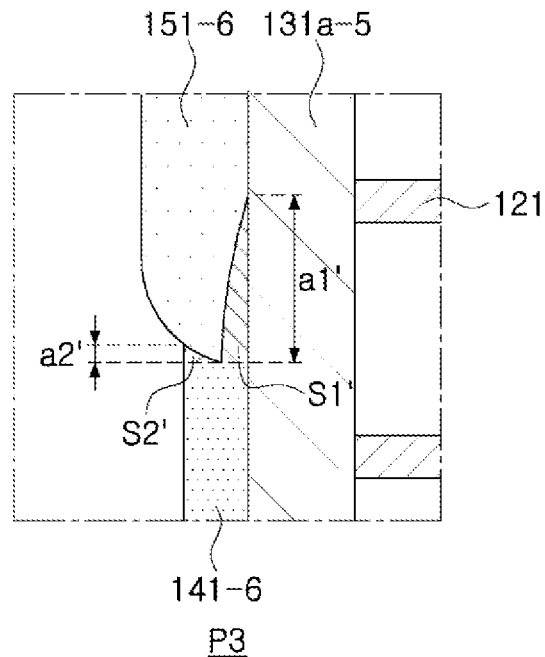
FIG. 20 is an enlarged diagram illustrating region P3 in FIG. 19.

FIG. 20 is an enlarged diagram illustrating region P3 in FIG. 19.

Referring to FIG. 20, the plating layers 141-6 and 142-6 of the multilayer electronic component 1006 may extend to a portion on the first and second connection portions 131a-5 and 132a-5 and may be in contact with the plating layer 141-6 and 142-6, a thickness of the insulating layer 151-6 may decrease toward an end in the region in which the plating layers 141-6 and 142-6 and the insulating layer 151-6 are in contact with each other, and the ends of the plating layers 141-6 and 142-6 may include a first region S1' extending to a region between the insulating layer 151-6 and the first and second connection portions 131a-5 and 132a-5 and a second region S2' extending to cover the first region S1' and the insulating layer 151-6.

Accordingly, the area in which the plating layers 141-6 and 142-6 and the insulating layer 151-6 are in direct contact with each other may be reduced, and the area in which the plating layers 141-6 and 142-6 and the connection portions 131a-5 and 132a-5 are in contact with each other may increase, such that overall bonding force of the multilayer electronic component 1006 may improve.

In an example embodiment, when a maximum length of the first region S1' in the first direction is defined as a1' and a maximum length of the second region S2' in the first direction is defined as a2', a1 '>a2' may be satisfied. When a2' is greater than a1', the area in which the plating layer 141-6 is in contact with the insulating layer 151-6 may be larger than the area in which the plating layer 141-6 is in contact with the connection portions 131a-5 and 132a-5, adhesion force between the plating layer 141-6, the insulating layer 151-6 and the connection portions 131a-5 and 132a-5 may not be sufficient. In an example embodiment, by satisfying a1 '>a2', the length or area in which the plating layer 141-6 is in contact with the connection portions 131a-5 and 132a-5 may increase, and the area in which the plating layer 141-6 and the insulating layer 151-6 are in contact with each other may be reduced, such that physical bonding force may improve. Accordingly, overall strength of the multilayer electronic component 1006 may improve.

Figure 21:
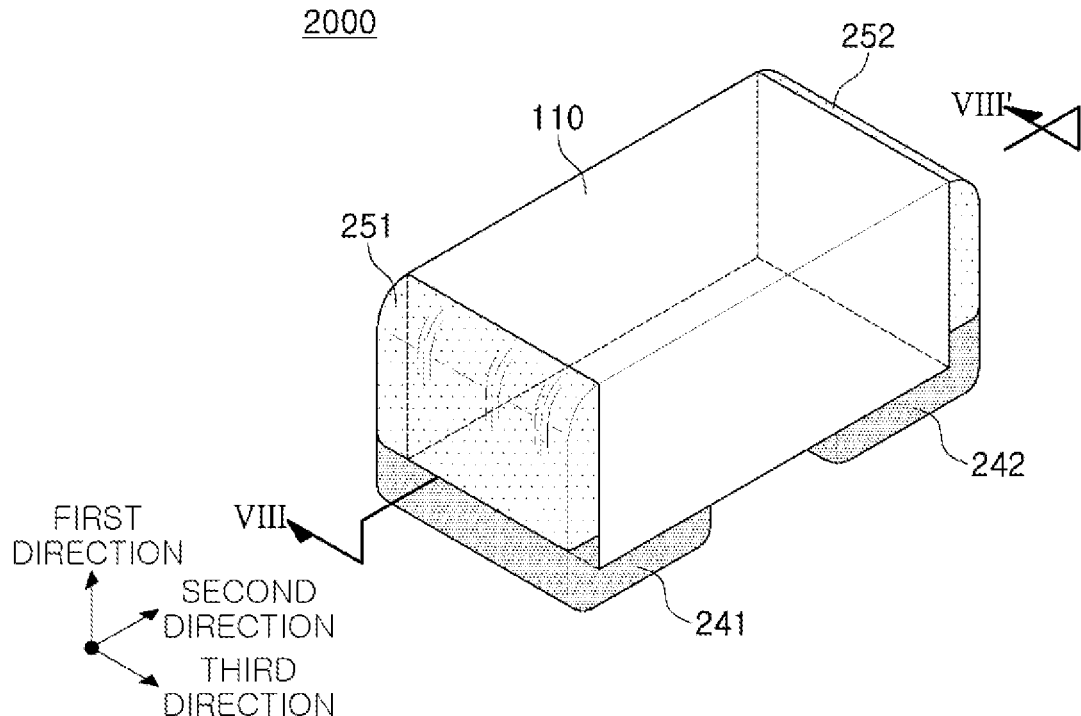
FIG. 21 is a perspective diagram illustrating a multilayer electronic component according to an example embodiment of the present disclosure.
Figure 22:
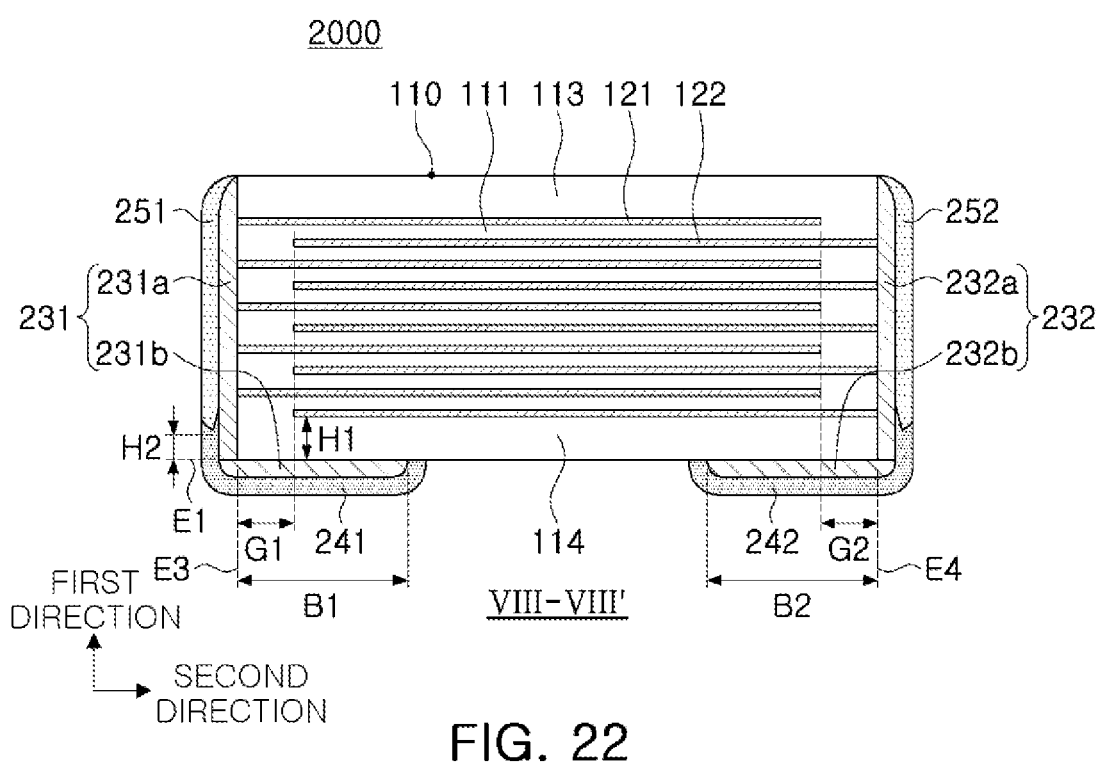
FIG. 22 is a cross-sectional diagram taken along line VIII-VIII' in FIG. 21.

FIG. 21 is a perspective diagram illustrating a multilayer electronic component according to an example embodiment. FIG. 22 is a cross-sectional diagram taken along line VIII-VIII' in FIG. 21.

Referring to FIGS. 21 and 22, the multilayer electronic component 2000 in an example embodiment may include a dielectric layer 111, and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 231 including a first connection electrode 231a disposed on the third surface and a first band electrode 231b disposed on the first surface and connected to the first connection electrode 231a; a second external electrode 232 including a second connection electrode 232a disposed on the fourth surface and a second band electrode 232b disposed on the first surface and connected to the second connection electrode 232a; a first insulating layer 251 disposed on the first connection electrode 231a; a second insulating layer 252 disposed on the second connection electrode 232a; a first plating layer 241 disposed on the first band electrode 231b; and a second plating layer 242 disposed on the second band electrode 232b. The first plating layer 241 may extend to a portion on the first connection electrode 231a and may be in contact with the first insulating layer 251, and the second plating layer 242 may extend to a portion on the second connection electrode 232a and may be in contact with the second insulating layer 252. The thickness of the first and second insulating layers 251 and 252 may decrease toward the end in the region in which the first and second plating layers 241 and 242 are in contact with the first and second insulating layers 251 and 252, and ends of the plating layers 241 and 242 may include a first region extending to a region between the insulating layers 251 and 252 and the first and second connection electrodes 231a and 232a and a second region extending to cover the insulating layers 251 and 252.

The first connection electrode 231a may be disposed on the third surface 3 and may be connected to the first internal electrode 121, and the second connection electrode 231b may be disposed on the fourth surface 4 and may be connected to the second internal electrode 122. Also, a first insulating layer 251 may be disposed on the first connection electrode 231a, and a second insulating layer 252 may be disposed on the second connection electrode 232a.

Generally, when an external electrode is formed, a method of dipping the exposed surface of the internal electrode of the body into paste including a conductive metal may be mainly used. However, a thickness of the external electrode formed by the dipping method may be excessively increased in a central portion thereof in the thickness direction. Also, in addition to the thickness imbalance of the external electrode by using the dipping method, since the internal electrode is exposed to the third and fourth surfaces, to prevent permeation of moisture and plating solution through the external electrode, the thickness of the external electrode disposed on the third and fourth surfaces may be equal to or greater than a predetermined thickness.

Differently from the above example, in the example embodiment, since the insulating layers 251 and 252 are disposed on the connection electrodes 231a and 232a, even when a thickness of the connection electrodes 231a and 232a on the third and fourth surfaces is reduced, sufficient reliability may be secured.

The first and second connection electrodes 231a and 232a may have a shape corresponding to the third and fourth surfaces 3 and 4, respectively, and the surface of the first and second connection electrodes 231a and 232a facing the body 110 may have the same area as the third and fourth surfaces 3 and 4 of the body 110. The first and second connection electrodes 231a and 232a may be disposed within a range not deviating from the third and fourth surfaces 3 and 4, respectively. The connection electrodes 231a and 232a may be disposed to not extend to the first, second, fifth, and sixth surfaces 1, 2, 5, and 6 of the body 110. Specifically, in an example embodiment, the first and second connection electrodes 231a and 232a may be spaced apart from the fifth and sixth surfaces, and accordingly, sufficient connectivity between the internal electrodes 121 and 122 and the external electrodes 231 and 232 may be secured, and the volume occupied by the external electrode may be reduced, such that per unit volume of the multilayer electronic component 2000 may increase.

In this regard, the first and second connection electrodes 231a and 232a may be spaced apart from the second surface 2. That is, since the external electrodes 231 and 232 are not disposed on the second surface, the volume occupied by the external electrodes 231 and 232 may be further reduced such that capacitance per unit volume of the multilayer electronic component 2000 may increase.

The connection electrodes 231a and 232a may extend to a corner of the body 110 and may include a corner portion disposed on the corner. That is, in an example embodiment, the first connection electrode may include a corner portion (not illustrated) extending to the 1-3 corner and the 2-3 corner, and the second connection electrode may include a corner portion (not illustrated) extending to the 1-4 corner and the 2-4 corner.

The thickness of the connection electrodes 231a and 232a is not limited to any particular example, and may be, for example, 2 to 7 μm. Here, the thickness of the connection electrodes 231a and 232a may indicate the maximum thickness, and may indicate the size of the connection electrodes 231a and 232a in the second direction.

In an example embodiment, the first and second connection electrodes 231a and 232a may include a metal and glass the same as those included in the internal electrodes 121 and 122. As the first and second connection electrodes 231a and 232a include the same metal as the metal included in the internal electrodes 121 and 122, electrical connectivity with the internal electrodes 121 and 122 may improve, and as the first and second connection electrodes 231a and 232a include glass, bonding strength with the body 110 and/or the insulating layers 251 and 252 may improve. In this case, the same metal as the metal included in the internal electrodes 121 and 122 may be Ni.

The first and second insulating layers 251 and 252 may be disposed on the first and second connection electrodes 231a and 232a and may prevent a plating layer from being formed on the first and second connection electrodes 231a and 232a. Also, the first and second insulating layers 251 and 252 may improve sealing properties, thereby reducing permeation of moisture or a plating solution.

The first and second insulating layers 251 and 252 may include a silicone-based resin. Accordingly, moisture resistance reliability may improve, and cracks caused by thermal reduction, radiation cracks caused by metal diffusion, and the like, may be prevented.

The first and second insulating layers 251 and 252 may be disposed on the first and second connection electrodes 231a and 232a, respectively, and may prevent a plating layer from being formed on the first and second connection electrodes 231a and 232a. Also, the first and second insulating layers 251 and 252 may improve sealing properties, thereby reducing permeation of moisture or a plating solution.

The insulating layers 251 and 252 may include a glass material having excellent resistance against a plating solution, such as, for example, a glass material including Si, but an example embodiment thereof is not limited thereto. The insulating layers 251 and 252 may be formed of a material having sufficient strength to protect the multilayer electronic component 2000 from tensile stress caused by thermal reduction. Also, the insulating layers 251 and 252 may include a single component or a plurality of components, and may include one or more selected from $TiO_2$, $BaTiO_3$, $Al_2O_3$, $SiO_2$, and BaO as an additive to improve bonding force with the body 100 or the external electrodes 231 and 232.

A method of forming the insulating layers 251 and 252 is not limited to any particular example, and for example, a sol-gel processing, a chemical vapor deposition (CVD), an atomic layer deposition, or the like may be used, but an example embodiment thereof is not limited thereto. Other methods of forming an insulating layer having a thin and uniform thickness may be used.

The thickness of the insulating layers 251 and 252 is not limited to any particular example, and may be, for example, 3 to 15 Here, the thickness of the insulating layers 251 and 252 may indicate a maximum thickness, and may indicate a size of the insulating layers 251 and 252 in the second direction.

The first and second band electrodes 231b and 232b may be disposed on the first surface 1 of the body 110. The first and second band electrodes 231b and 232b may be electrically connected to the first and second internal electrodes 121 and 122 by being in contact with the first and second connection electrodes 231a and 232a, respectively.

A thickness of the external electrode formed by a general dipping method may be formed to be relatively great on the third and fourth surfaces and may partially extend to the first, second, fifth and sixth surfaces, such that it may be difficult to secure a high effective volume ratio.

In an example embodiment, the first and second connection electrodes 231a and 232a may be disposed on the surface on which the internal electrode is exposed, and the first and second band 231b and 232b may be disposed on the surface of the substrate, such that a high effective volume ratio may be secured.

When the internal electrodes 121 and 122 are laminated in the first direction, the multilayer electronic component 2000 may be horizontally mounted on a substrate such that the internal electrodes 121 and 122 may be parallel to the mounting surface. However, an example embodiment thereof is not limited to the horizontal mounting, and when the internal electrodes 121 and 122 are laminated in the third direction, the multilayer electronic component may be vertically mounted on the substrate such that the internal electrodes 121 and 122 may be perpendicular to the mounting surface.

The first and second band electrodes 231b and 232b may be formed of any material having electrical conductivity, such as metal, and a specific material may be determined in consideration of electrical properties and structural stability. For example, the first and second band electrodes 231b and 232b may be fired electrodes including conductive metal and glass, and may be formed by applying paste including conductive metal and glass to the first surface of the body, but an example embodiment thereof is not limited thereto, and the first and second band electrodes 231b and 232b may be plating layers formed by plating a conductive metal on the first surface 1 of the body.

A material having excellent electrical conductivity may be used as the conductive metal included in the first and second band electrodes 231b and 232b, and the material is not limited to any particular example. For example, the conductive metal may be one or more of nickel (Ni), copper (Cu), and alloys thereof, and may include the same metal as the metal included in the internal electrodes 121 and 122.

Meanwhile, in an example embodiment, to secure sealing properties and high strength, the first external electrode 231 may include a third band electrode (not illustrated) disposed on the second surface 2 and connected to the first connection electrode 231a, and the second external electrode 232 may include a fourth band electrode (not illustrated) disposed on the second surface 2 and connected to the second connection electrode 232a.

In an example embodiment, the distance from an extension line E3 of the third surface 3 to an end of the first band electrode 231b is defined as B1, the distance from an extension line E4 of the fourth surface 4 to an end of the second band electrode 232b is defined as B2, a distance from an extension line E3 of the third surface 3 to an end of the third band electrode (not illustrated) is defined as B3, a distance from an extension line E4 of the fourth surface 4 to an end of the fourth band electrode (not illustrated) is defined as B4, an average size of the region in which the third surface 3 and the second internal electrode 122 are spaced apart from each other, taken in the second direction, is defined as G1, and an average size of the region in which the fourth surface 4 and the first internal electrode 121 are spaced apart from each other, taken in the second direction, is defined as G2, B1>G1, B3≤G1, B2>G2 and B4≤G2 may be satisfied. Accordingly, the volume occupied by the external electrode may be reduced, such that capacitance per unit volume of the multilayer electronic component 2000 may increase and the area in contact with solder during mounting may increase, thereby improving cohesion strength.

However, an example embodiment thereof is not limited to B1>G1, B3≤G1, B2>G2 and B4≤G2, and the example in which B1>G1, B3>G1, B2>G2 and B4>G2 are satisfied may be included in the example embodiment. Accordingly, in an example embodiment, the distance B1 from an extension line E3 of the third surface 3 to an end of the first band electrode 231b is defined as B1, the distance from the extension line E4 of the fourth surface 4 to the end of the second band electrode 232b is defined as B2, the distance from the extension line E3 of the third surface 3 to the end of the third band electrode (not shown) is defined as B3, the distance from the extension line E4 of the fourth surface 4 to the end of the fourth band electrode (not shown) is defined as B4, and the average size of the region in which the third surface 3 and the second internal electrode 122 are spaced apart from each other, taken in the second direction, is defined as G1, and the average size of the region in which the fourth surface 4 and the first internal electrode 121 are spaced apart from each other, taken in the second direction, is defined as G2, B1>G1, B3>G1, B2>G2 and B4>G2 may be satisfied.

The first and second plating layers 241 and 242 may be disposed on the first and second band electrodes 231b and 232b. The first and second plating layers 241 and 242 may improve mounting properties. The types of the first and second plating layers 241 and 242 are not limited to any particular example, and may be a plating layer including at least one of Ni, Sn, Pd, and alloys thereof, and may include a plurality of layers.

For example, the first and second plating layers 241 and 242 may be a Ni plating layer or a Sn plating layer, and the Ni plating layer and the Sn plating layer may be formed in order on the first and second band electrodes 231b and 232b.

In an example embodiment, an end of the first plating layer 241 may include a 1-1 region extending to a region between the first insulating layer 251 and the first connection electrode 231a and a 1-2 region extending to cover the first insulating layer 251. An end of the second plating layer 242 may include a 2-1 region extending to a region between the insulating layer 252 and the second connection electrode 232a and a 2-2 region extending to cover the second insulating layer 252. Accordingly, even when the first and second insulating layers 251 and 252 are formed of a material having an insulating component, physical bonding force of the plating layers 241 and 242, the insulating layers 251 and 252 and the connection electrodes 231a and 232a may improve such that overall strength of the multilayer electronic component 2000 and resistance to external impacts may improve, and when mounted on a substrate, a decrease in cohesion strength may be prevented.

In an example embodiment, when a maximum length of the 1-1 region and the 2-1 region in the first direction is defined as a1, and a maximum length of the 2-1 region and the 2-2 region is defined as a2, a1>a2 may be satisfied. When a2 is greater than a1, the area in which the plating layers 241 and 242 are in contact with the insulating layers 251 and 252 may be larger than the area in which the plating layer is in contact with the connection electrode, such that adhesion force may not be sufficient. In an example embodiment, by satisfying a1>a2, the length or area in which the plating layer is in contact with the connection electrode may increase and the contact area between the plating layer and the insulating layer may be reduced, thereby improving physical bonding force. Accordingly, overall strength of the multilayer electronic component 2000 may improve.

In an example embodiment, the first and second plating layers 241 and 242 may extend to partially cover the first and second connection electrodes 231a and 232a, respectively.

When an average distance in the first direction from the first surface 1 to the internal electrode disposed most adjacent to the first surface 1 among the first and second internal electrodes 121 and 122 is defined as H1, and an average distance in the first direction from an extension line of the first surface 1 to an ends of the first and second plating layers 241 and 242 disposed on the first and second connection electrodes 231a and 232a is defined as H2, H1>H2 (or H1>H2) may be satisfied. Accordingly, permeation of the plating solution into the internal electrode during the plating process may be prevented, thereby improving reliability.

In an example embodiment, the first plating layer 241 may be disposed to cover the end disposed on the first external electrode 231 of the first insulating layer 251, and the second plating layer 242 may be disposed to cover an end of the second insulating layer 252 disposed on the second external electrode 232. Accordingly, bonding force between the insulating layers 251 and 252 and the plating layers 241 and 242 may be strengthened, thereby improving reliability of the multilayer electronic component 2000. Also, by first forming the first and second insulating layers 251 and 252 before forming the plating layers 241 and 242 on the external electrodes 231 and 232, permeation of the plating solution in the process of forming the plating layer may be reliably prevented. As the insulating layer is formed before the plating layer is formed, the plating layers 241 and 242 may have a shape covering ends of the insulating layers 251 and 252.

In an example embodiment, the first insulating layer 251 may be disposed to cover an end disposed on the first external electrode 231 of the first plating layer 241, and the second insulating layer 252 may be disposed to cover an end disposed on the second external electrode 232 of the second plating layer 242. Accordingly, the bonding force between the insulating layer 351 and the plating layers 241 and 242 may be strengthened, thereby improving reliability of the multilayer electronic component 2000.

Figure 23:
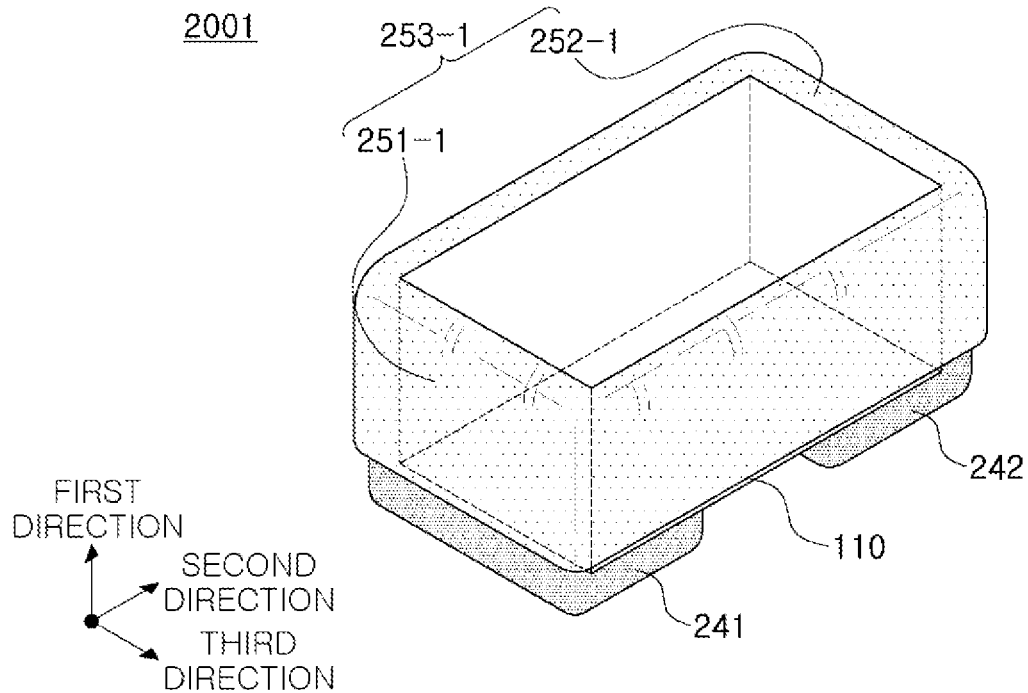
FIG. 23 is a diagram illustrating a modified example of the example in FIG. 21.

FIG. 23 is a diagram illustrating a modified example 2001 of the example in FIG. 21. Referring to FIG. 23, in the modified example 2001 of the multilayer electronic component 2000, the first and second insulating layers 251-1 and 252-1 may extend to the fifth and sixth surfaces 5 and 6 and may be connected to each other such that the insulating layers 251-1 and 252-1 may be connected as an integrated insulating layer 253-1. In this case, the connected first and second insulating layers 253-1 may be disposed to cover portions of the fifth and sixth surfaces.

Figure 24:
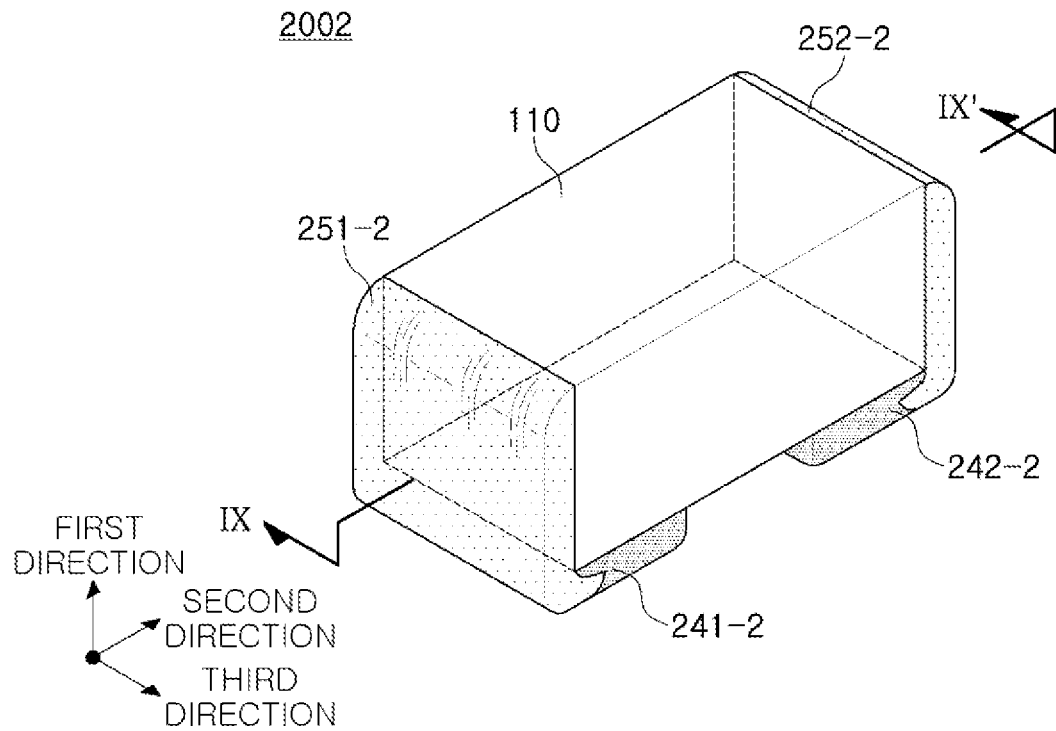
FIG. 24 is a perspective diagram illustrating a multilayer electronic component according to an example embodiment of the present disclosure.
Figure 25:
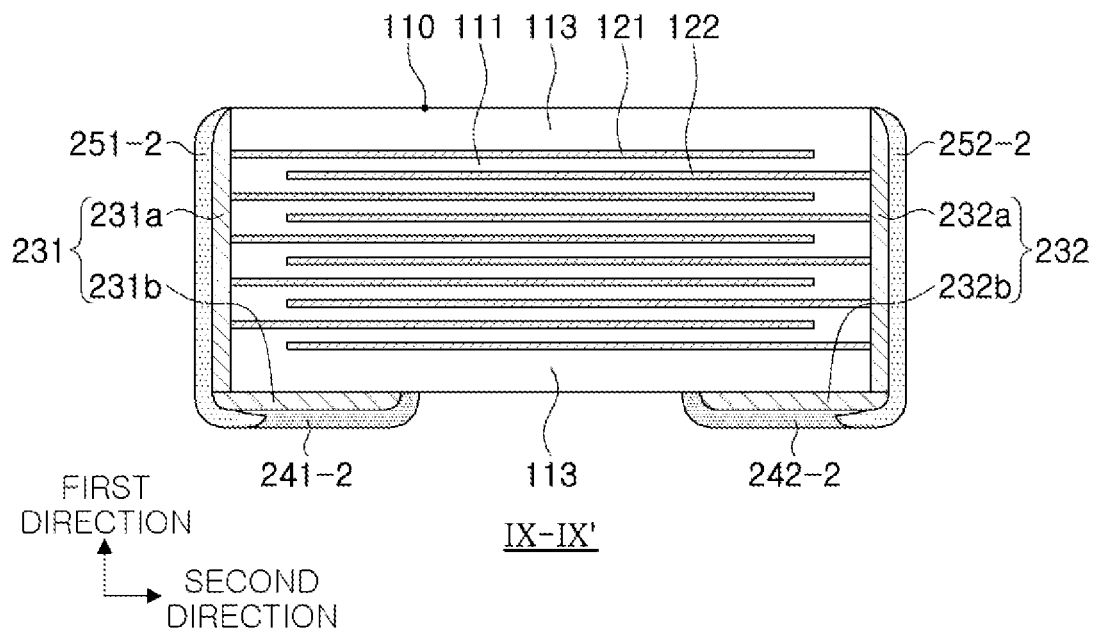
FIG. 25 is a cross-sectional diagram taken along line IX-IX' in FIG. 24.

FIG. 24 is a perspective diagram illustrating a multilayer electronic component 2002 according to an example embodiment. FIG. 25 is a cross-sectional diagram taken along line IX-IX' in FIG. 24. Referring to FIGS. 24 and 25, in the multilayer electronic component 2002 in an example embodiment, the first and second plating layers 241-2 and 242-2 may be disposed to a region below the extension line of the first surface. Accordingly, a height of solder may be reduced during mounting and a mounting space may be reduced.

Also, the first and second insulating layers 251-2 and 252-2 may extend to a region below the extension line of the first surface and may be in contact with the first and second plating layers 241-2 and 242-2.

Here, the configuration in which the first and second insulating layers 251-2 and 252-2 may extend to a region below the extension line of the first surface and may be in contact with the first and second plating layers 241-2 and 242-2 may indicate that the first and second insulating layers may be disposed to be in contact with the first and second plating layers 241-2 and 242-2 and the band electrodes 231b and 232b, but an example embodiment thereof is not limited thereto. Specific positions thereof may be adjusted to reduce the height of solder and space during mounting. In this case, the connected first and second insulating layers 253-3 may be disposed to cover an entirety of the fifth and sixth surfaces 5 and 6.

Figure 26:
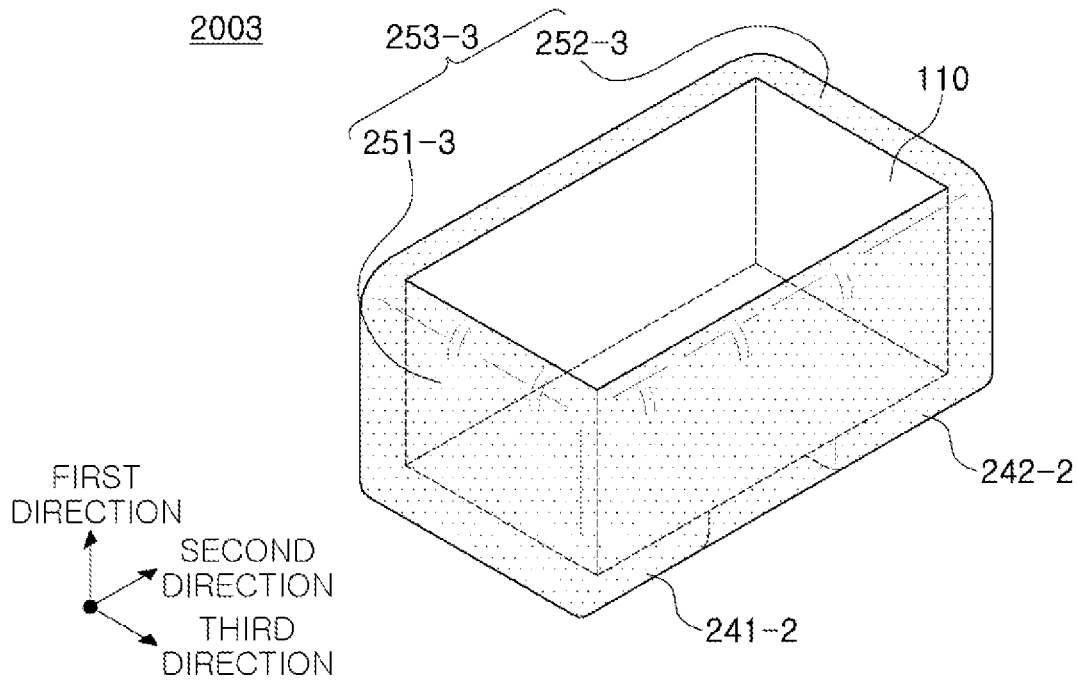
FIG. 26 is a diagram illustrating a modified example of the example in FIG. 24.

FIG. 26 is a diagram illustrating a modified example of the example in FIG. 24. Referring to FIG. 26, in the modified example 2003 of the multilayer electronic component 2002 in an example embodiment, the first and second insulating layers 251-3 and 252-3 may extend to the fifth and sixth surfaces 5 and 6 and may be connected to each other such that the insulating layers may be connected as an integrated insulating layer 253-3.

Figure 27:
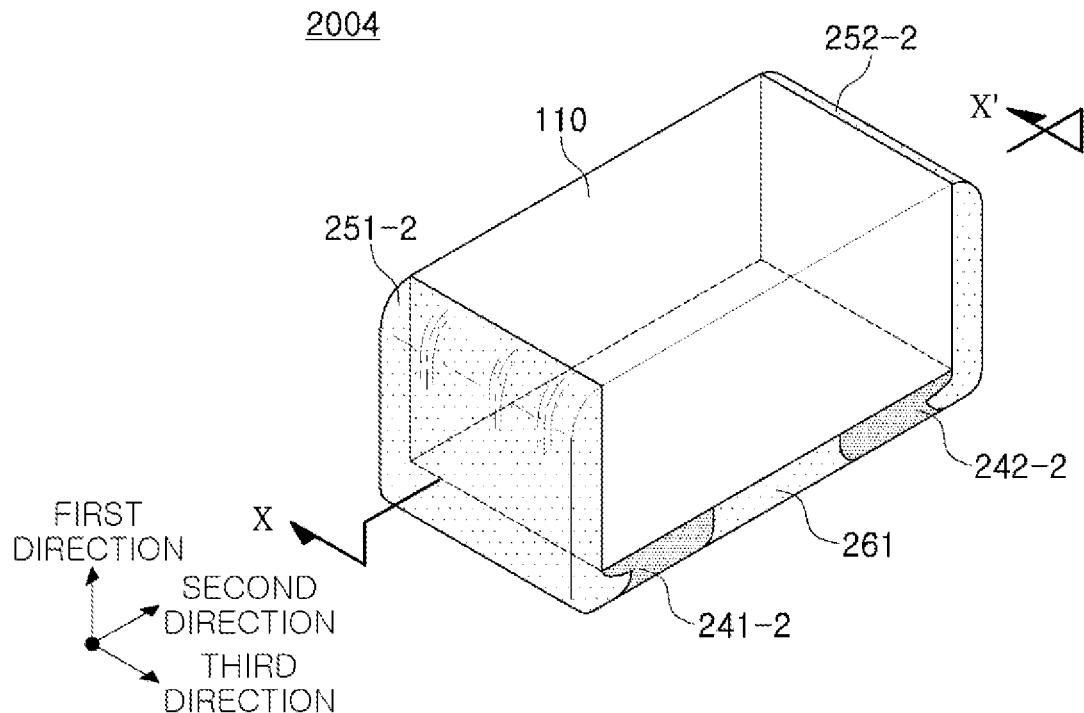
FIG. 27 is a perspective diagram illustrating a multilayer electronic component according to an example embodiment of the present disclosure.
Figure 28:
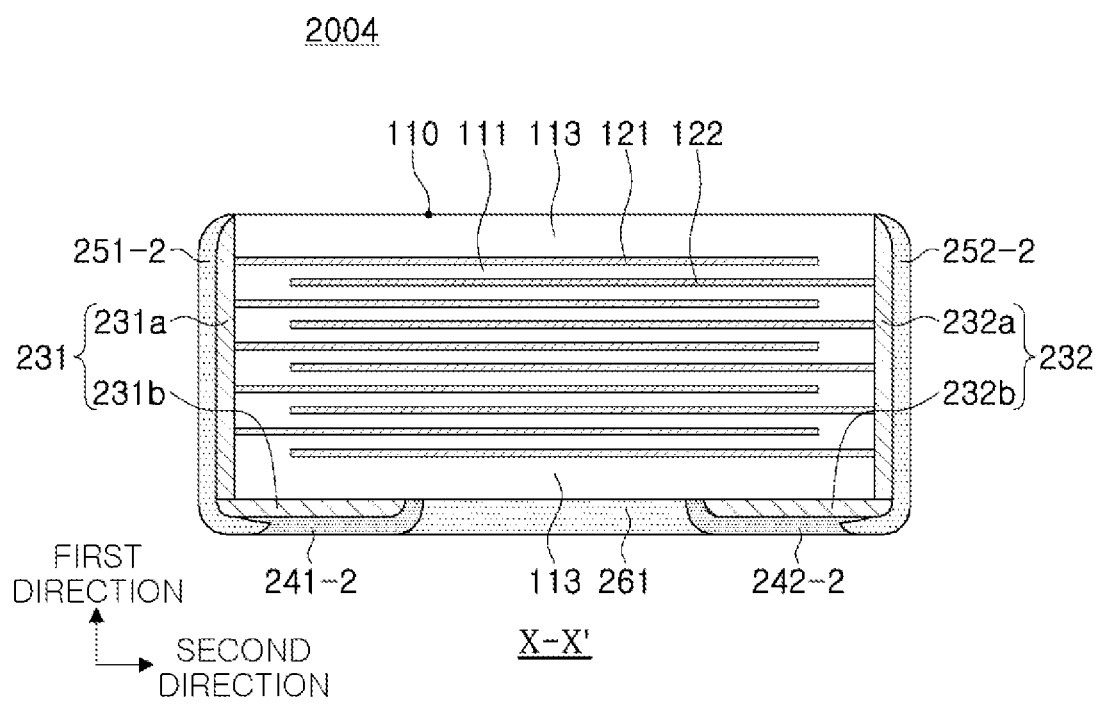
FIG. 28 is a cross-sectional diagram taken along line X-X' in FIG. 27.

FIG. 27 is a perspective diagram illustrating a multilayer electronic component 2004 according to an example embodiment. FIG. 28 is a cross-sectional diagram taken along line X-X' in FIG. 27. Referring to FIGS. 27 and 28, the multilayer electronic component 2004 in an example embodiment may further include an additional insulating layer 261 disposed on the first surface 1 and disposed between the first band electrode 231b and the second band electrode 232b. Accordingly, a leakage current that may occur between the first band electrode 231b and the second band electrode 232b under a high voltage current may be prevented.

The type of the additional insulating layer 261 may not need to be limited to any particular example. For example, the additional insulating layer 261 may include the same components as those of the insulating layers 251-2 and 252-2. The additional insulating layer 261 and the insulating layers 251-2 and 252-2 may not need to be formed of the same material, and may be formed of different materials. For example, the additional insulating layer 261 may include one or more thermosetting resins selected from an epoxy resin, an acrylic resin, and the like. Also, the additional insulating layer 261 may include one or more selected from $TiO_2$, $BaTiO_3$, $Al_2O_3$, $SiO_2$, BaO, or the like as an additive in addition to polymer resin. Accordingly, bonding force with the body or the external electrode may improve.

Figure 29:
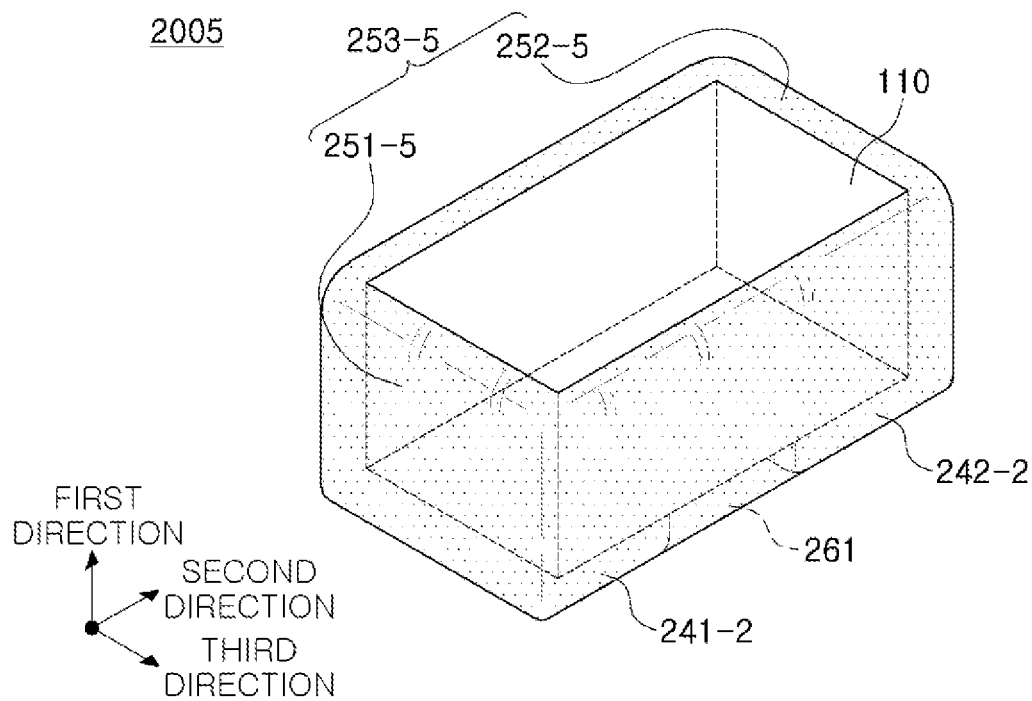
FIG. 29 is a diagram illustrating a modified example of the example in FIG. 29.

FIG. 29 is a diagram illustrating a modified example of the example in FIG. 29. Referring to FIG. 29, in the modified example 2005 of the multilayer electronic component 2004, the first and second insulating layers 251-5 and 252-5 may extend to the fifth and sixth surfaces 5 and 6 and may be connected to each other such that the insulating layers 251-5 and 252-5 may be connected as an integrated insulating layer 253-5.

Figure 30:
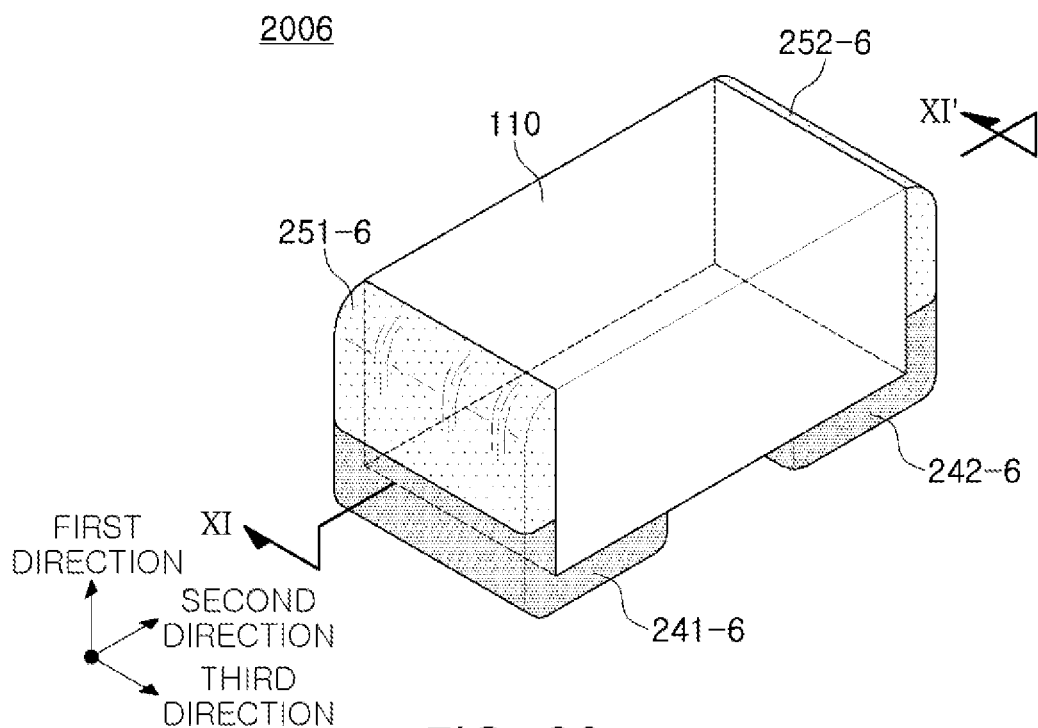
FIG. 30 is a perspective diagram illustrating a multilayer electronic component according to an example embodiment of the present disclosure.
Figure 31:
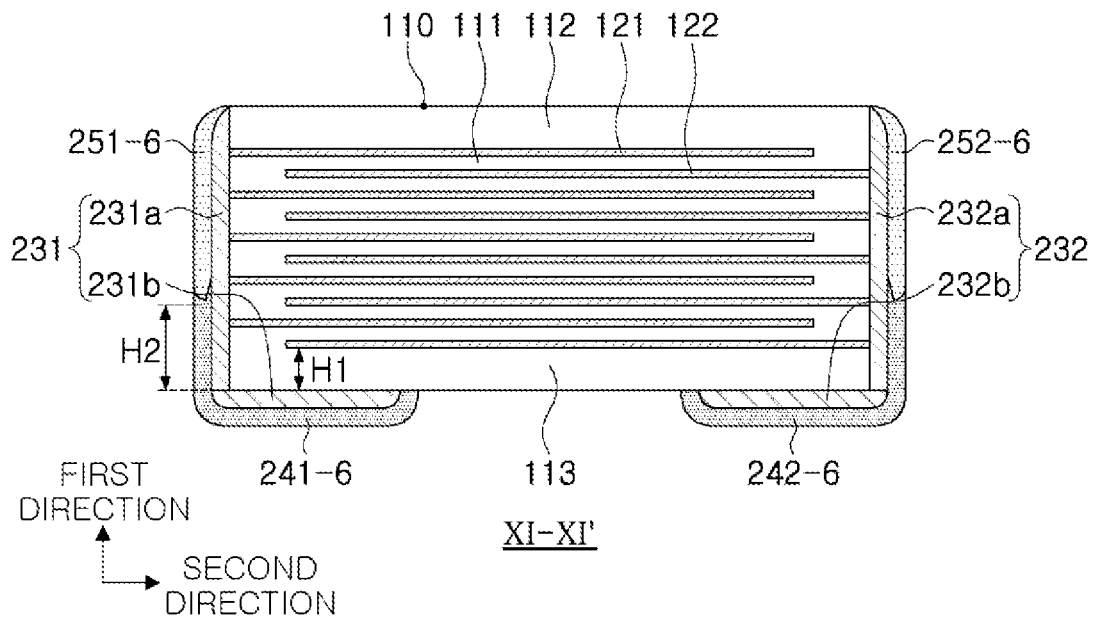
FIG. 31 is a cross-sectional diagram taken along line XI-XI' in FIG. 30.

FIG. 30 is a perspective diagram illustrating a multilayer electronic component 2006 according to an example embodiment. FIG. 31 is a cross-sectional diagram taken along line XI-XI' in FIG. 30. Referring to FIGS. 30 and 31, the multilayer electronic component 2006 according to an example embodiment may include a first insulating layer 251-6 disposed on a first connection electrode 231a and second insulating layer 252-6 disposed on a second connection electrode 232a. When an average distance in the first direction from the first surface 1 to an internal electrode disposed most adjacent to the first surface 1 among the first and second internal electrodes 121 and 122 is defined as H1, and an average distance in the first direction from an extension line of the first surface 1 to ends of the first and second plating layers 241-6 and 242-6 disposed on the first and second connection electrodes 231a and 232a is defined as H2, H1<H2 may be satisfied. Accordingly, the area in contact with the solder during mounting may increase, thereby improving cohesion strength.

More preferably, when the average size of the body 110 in the first direction is defined as T, H2<T/2 may be satisfied. That is, H1<H2<T/2 may be satisfied, which may be because the effect of improving moisture resistance reliability by an insulating layer may degrade when H2 is T/2 or more.

Figure 32:
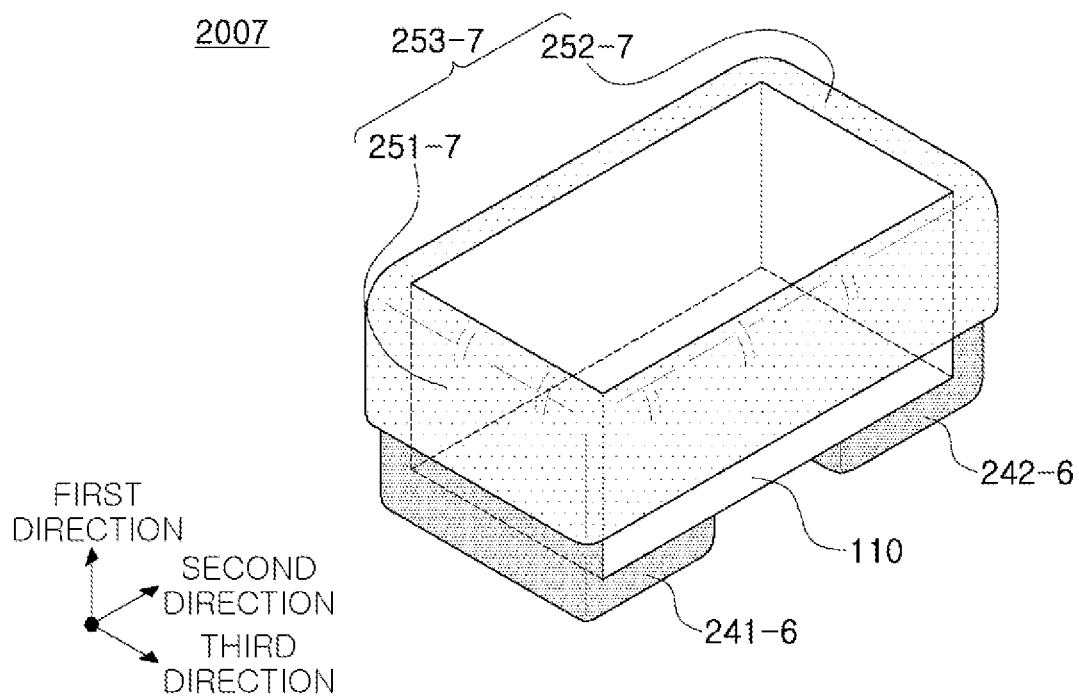
FIG. 32 is a diagram illustrating a modified example of the example in FIG. 30.

FIG. 32 is a diagram illustrating a modified example of the example in FIG. 30. Referring to FIG. 32, in the modified example 2007 of the multilayer electronic component 2006, the first and second insulating layers 251-7 and 252-7 may extend to the fifth and sixth surfaces 5 and 6 and may be connected to each other such that the insulating layers may be connected as an integrated insulating layer 253-7.

Figure 33:
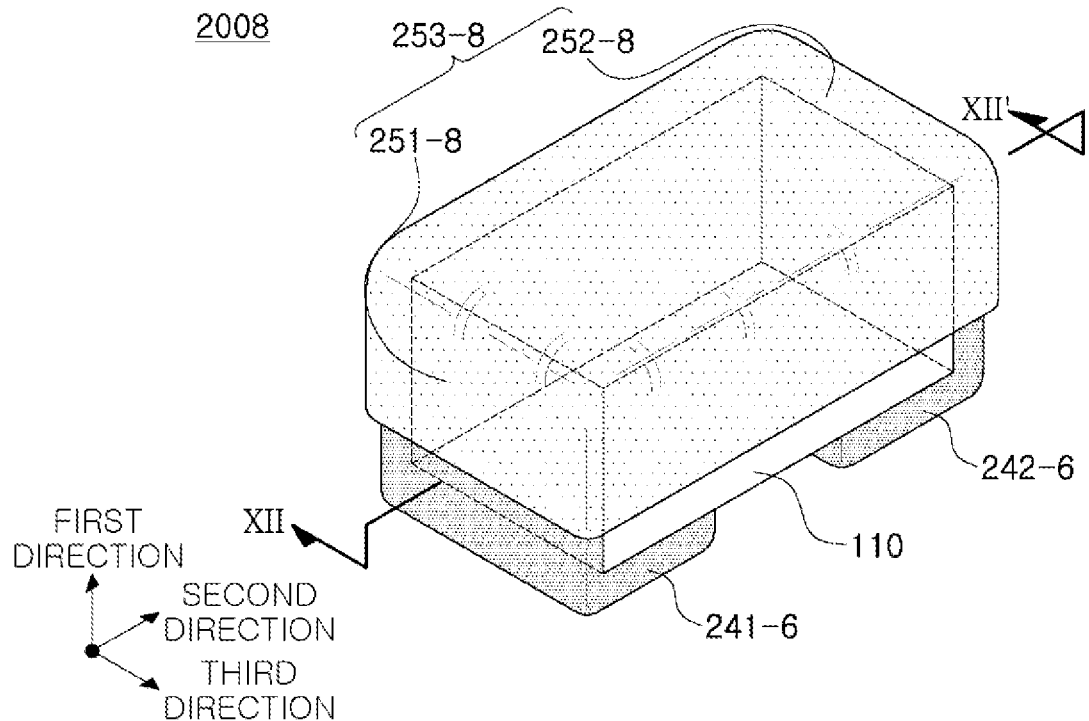
FIG. 33 is a perspective diagram illustrating a multilayer electronic component according to an example embodiment of the present disclosure.
Figure 34:
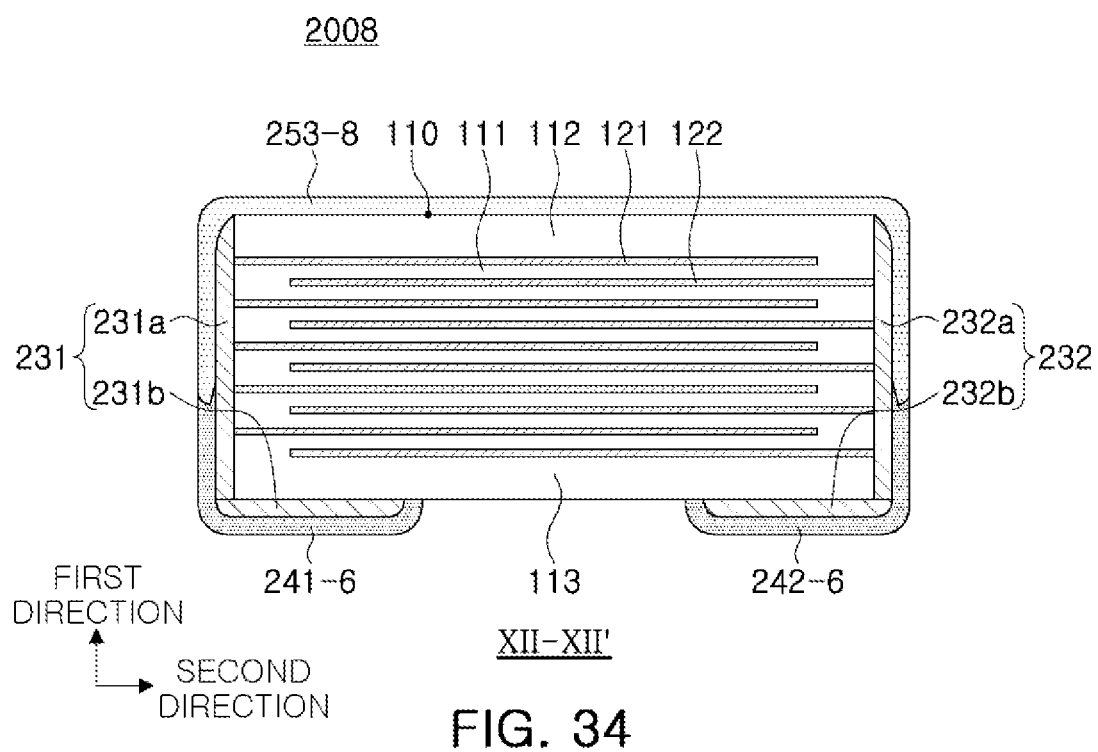
FIG. 34 is a cross-sectional diagram taken along line XII-XII' in FIG. 33.

FIG. 33 is a perspective diagram illustrating a multilayer electronic component 2008 according to an example embodiment. FIG. 34 is a cross-sectional diagram taken along line XII-XII' in FIG. 33. In the multilayer electronic component 2008 in an example embodiment, the first and second insulating layers 251-8 and 252-8 may extend to the second, fifth and sixth surfaces 2, 5 and 6 and may be connected to each other such that the insulating layers 251-8 and 252-8 may be connected as an integrated insulating layer 253-8. As illustrated in FIG. 30, the insulating layer 253-8 may cover an entirety of the second surface, and partially cover the fifth and sixth surfaces.

Figure 35:
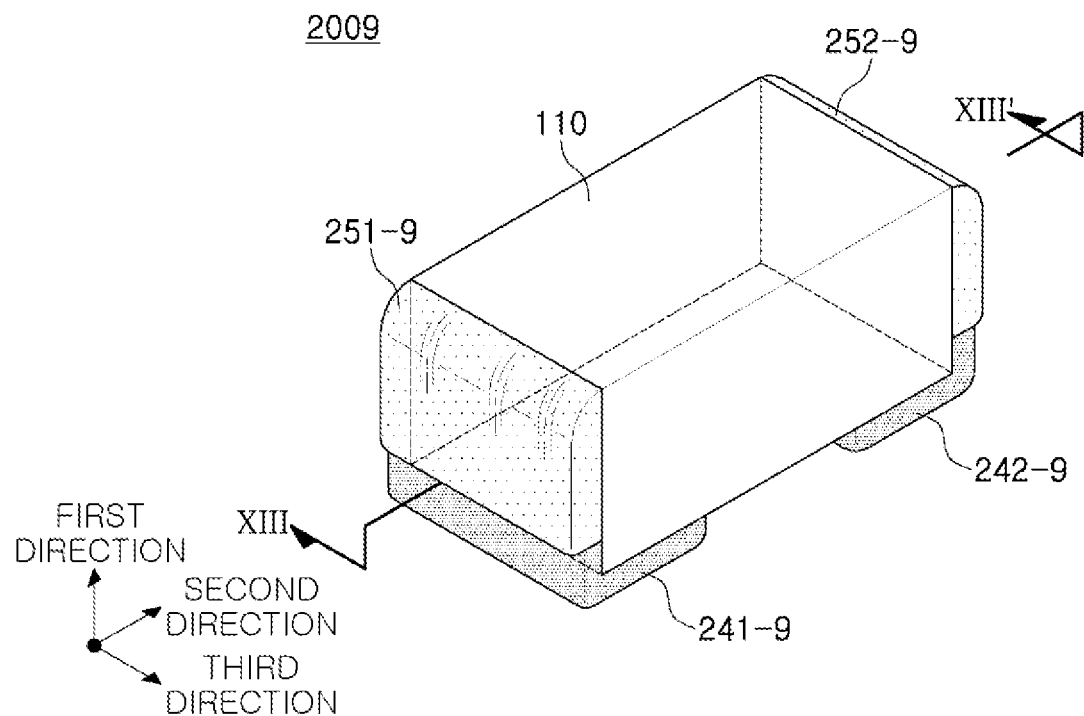
FIG. 35 is a perspective diagram illustrating a multilayer electronic component according to an example embodiment of the present disclosure.
Figure 36:
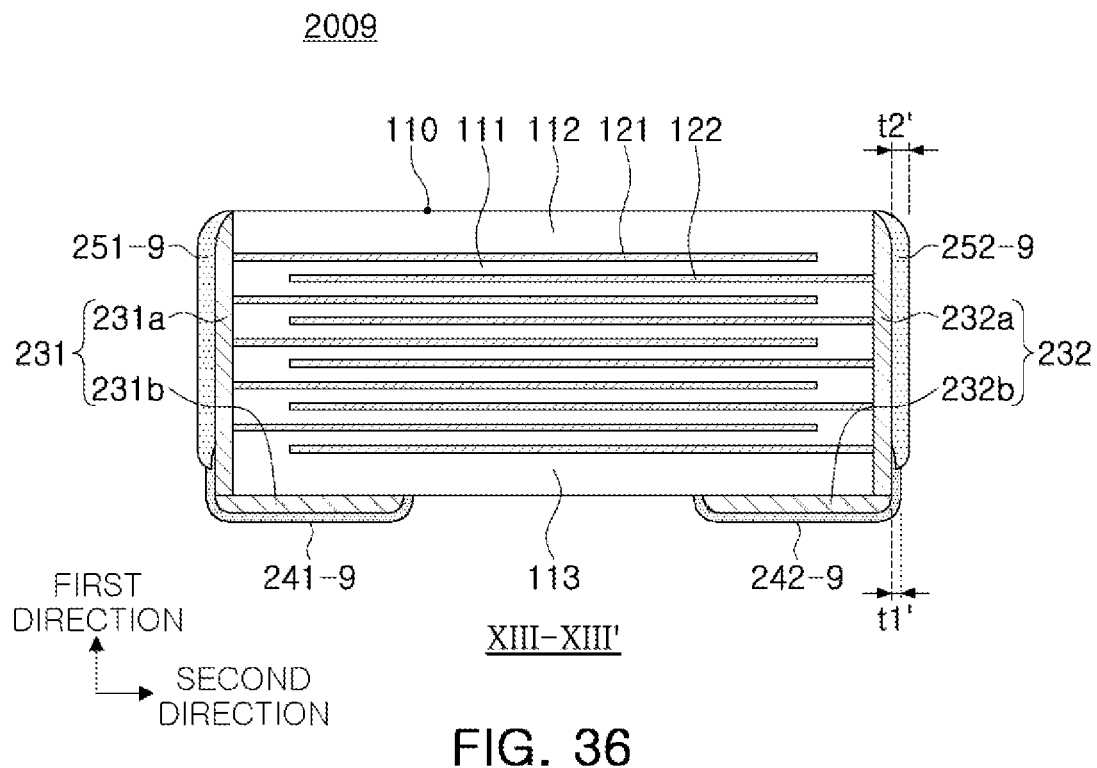
FIG. 36 is a cross-sectional diagram taken along line XIII-XIII' in FIG. 35.

FIG. 35 is a perspective diagram illustrating a multilayer electronic component 2009 according to an example embodiment. FIG. 36 is a cross-sectional diagram taken along line XIII-XIII' in FIG. 35.

Referring to FIGS. 35 and 36, an average thickness t1' of the first and second plating layers 241-9 and 242-9 of the multilayer electronic component 2009 in an example embodiment may be less than an average thickness t2' of the first and second insulating layers 251-9 and 252-9.

In an example embodiment, the average thickness t1' of the first and second plating layers 241-9 and 242-9 may be reduced to be less than the average thickness t2' of the first and second insulating layers 251-9 and 252-9 such that the contact area between the plating layer and the insulating layer may be reduced. Accordingly, delamination may be prevented and cohesion strength of the multilayer electronic component 2009 with the substrate 180 may improve.

The average thickness t1' of the first and second plating layers 241-9 and 242-9 may be an average value of thicknesses measured at five points, spaced apart by an equal distance, on the first and second connection electrodes 231a and 232a or the first and second band electrodes 231b and 232b. The average thickness t2' of the insulating layers 251-9 and 252-9 may be an average value of thicknesses measured at five points, spaced apart by an equal distance, on the first and second connection electrodes 231a and 232a.

Figure 37:
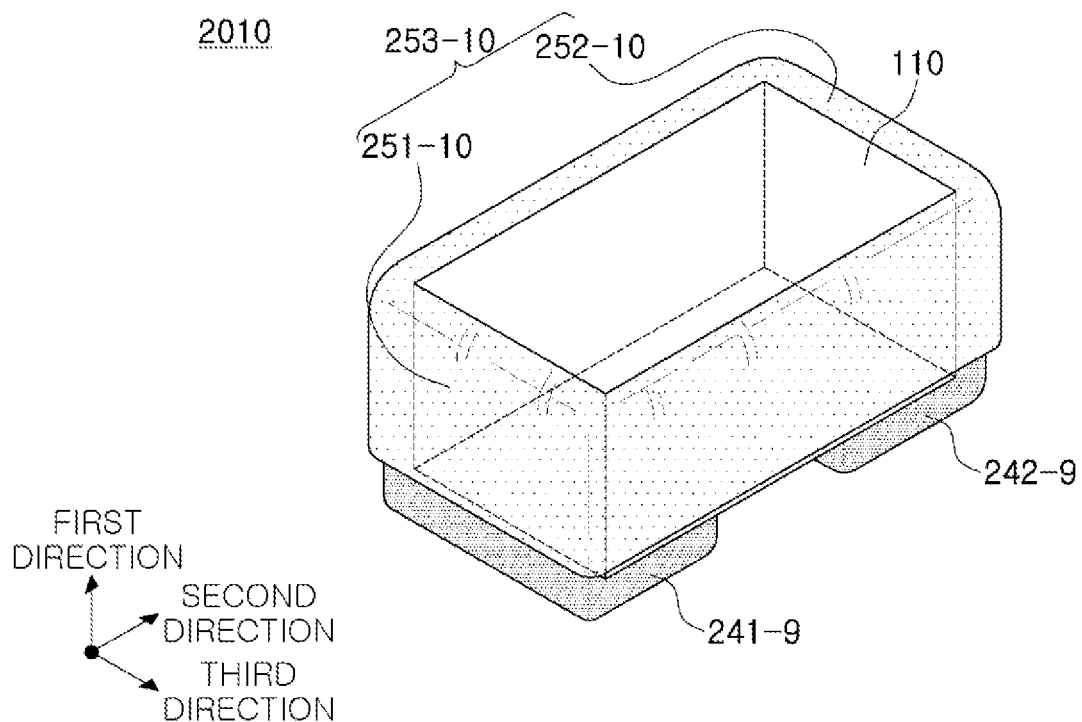
FIG. 37 is a diagram illustrating a modified example of the example in FIG. 30.

FIG. 37 is a diagram illustrating a modified example of the example in FIG. 30. Referring to FIG. 37, in the modified example 2010 of the multilayer electronic component 2009 in an example embodiment, the first and second insulating layers 251-10 and 252-10 may extend to the fifth and sixth surfaces 5 and 6 and may be connected to each other, such that the insulating layers 251-10 and 252-10 may be connected as an integrated insulating layer 253-10.

Figure 38:
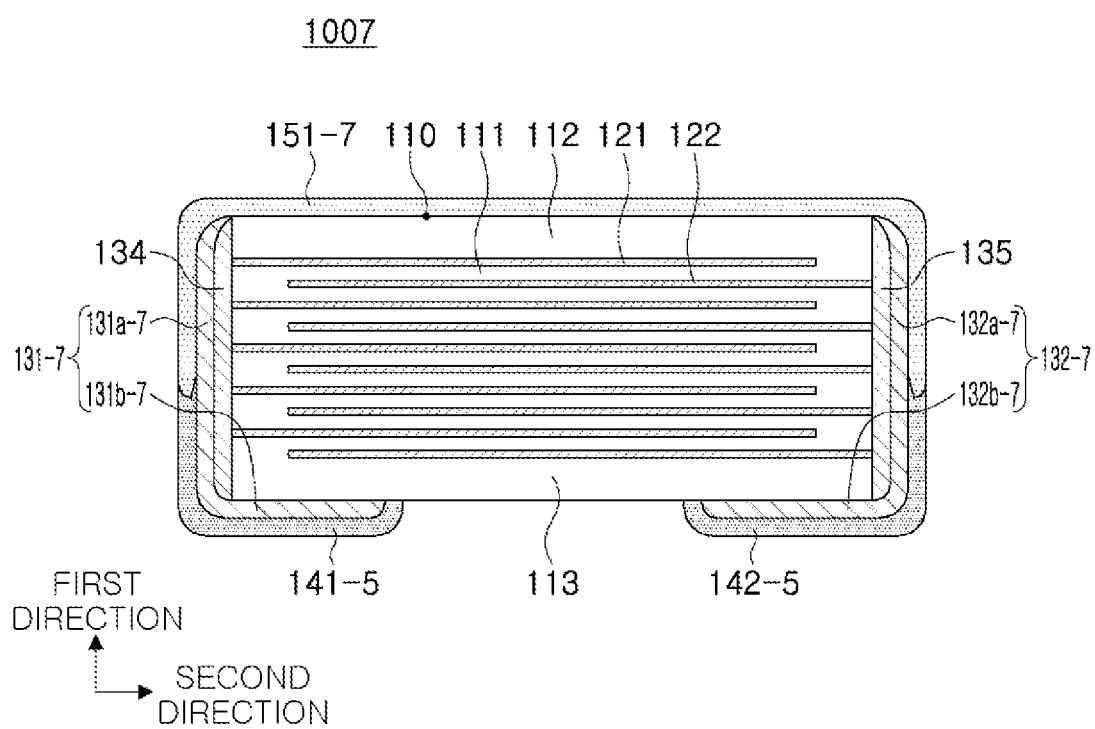
FIG. 38 is a diagram illustrating a modified example of the example in FIG. 17.

FIG. 38 is a diagram illustrating a modified example of the example in FIG. 17. Referring to FIG. 38, in the modified example 1007 of the multilayer electronic component 1005 in an example embodiment, first and second external electrodes 131-7 and 132-7 may have an L-shape in which the first and second external electrodes are not disposed on the second surface.

The first external electrode 131-7 may include a first connection portion 131a-7 disposed on the third surface 3, and a first connection portion 131a-7 extending from the first band portion 131b-7 to a portion of the first surface 1. The second external electrode 132-7 may include a second connection portion 132a-7 disposed on the fourth surface 4 and a second band portion 132b-7 extending from the second connection portion 132a-7 to a portion of the first surface 1. The external electrodes 131-7 and 132-7 may not be disposed on the second surface 2, such that the insulating layer 151-7 may cover the entire second surface 2. In this case, the external electrodes 131-7 and 132-7 may not be disposed even on the fifth and sixth surfaces 5 and 6. That is, the external electrodes 131-7 and 132-7 may be disposed only on the third, fourth, and first surfaces 3, 4, and 1.

A first additional electrode layer 134 may be disposed between the first connection portion 131a-7 and the third surface 3, and a second additional electrode layer 135 may be disposed between the second connection portion 132a-7 and the fourth surface 4. The first connection portion 131a-7 may be disposed within a range not deviated from the third surface 3, and the second connection portion 132a-7 may be disposed within a range not deviated from the fourth surface 4.

Figure 39:
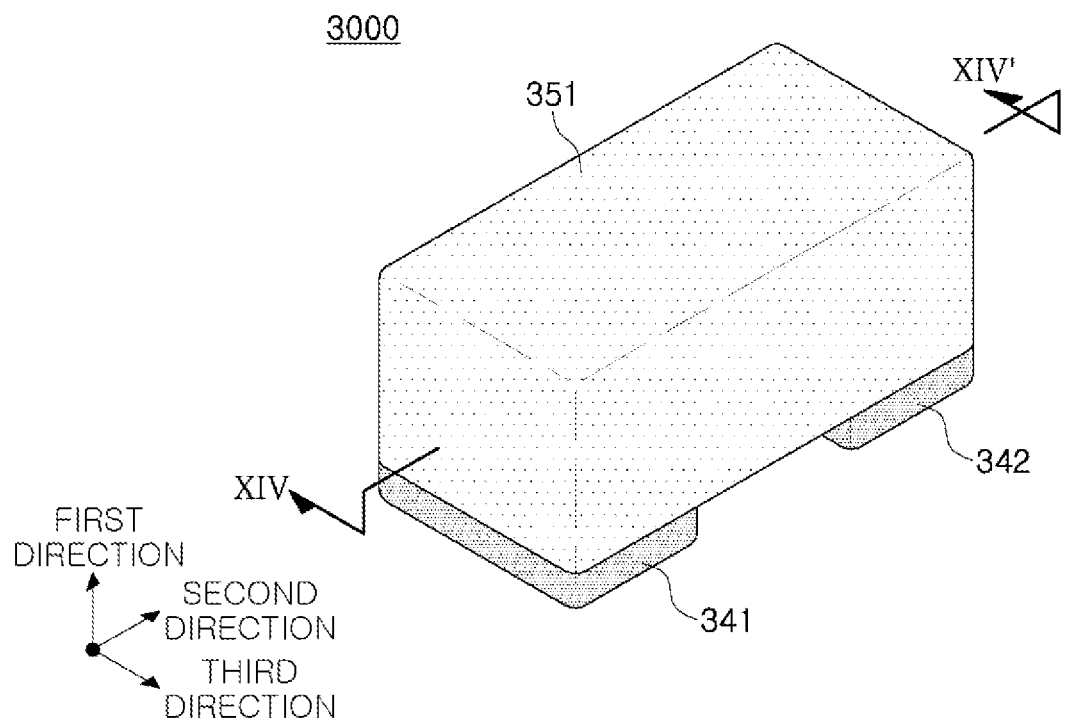
FIG. 39 is a perspective diagram illustrating a multilayer electronic component according to an example embodiment of the present disclosure.
Figure 40:
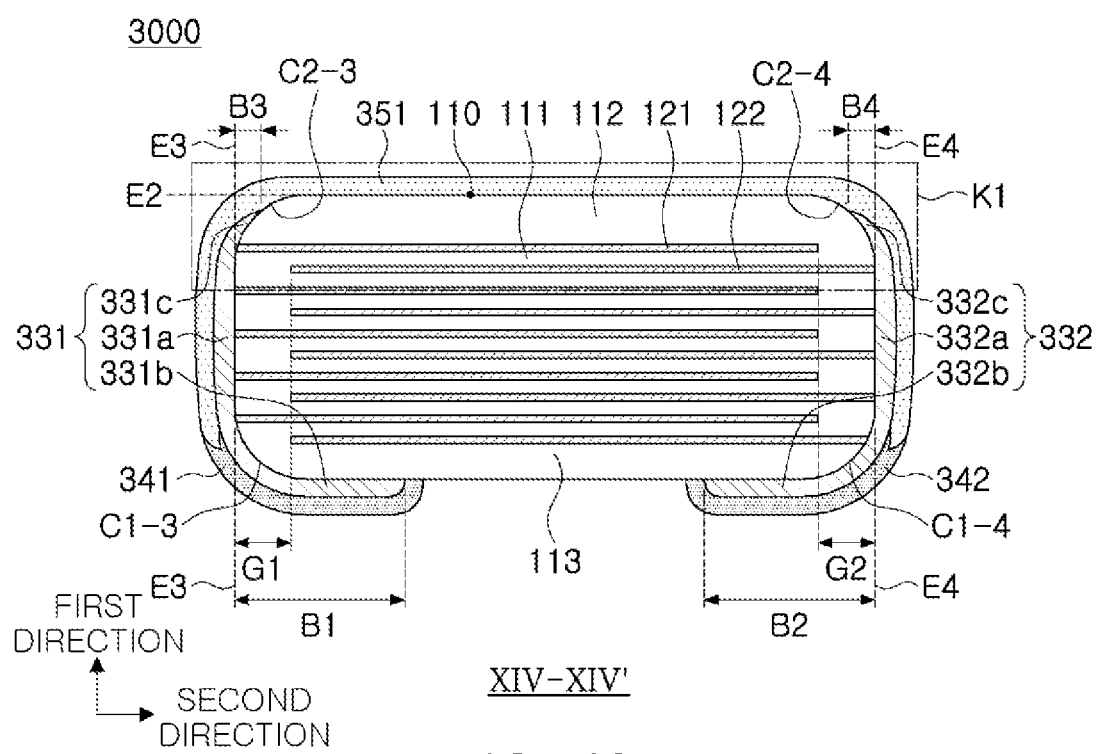
FIG. 40 is a cross-sectional diagram taken along line XIV-XIV' in FIG. 40.
Figure 41:
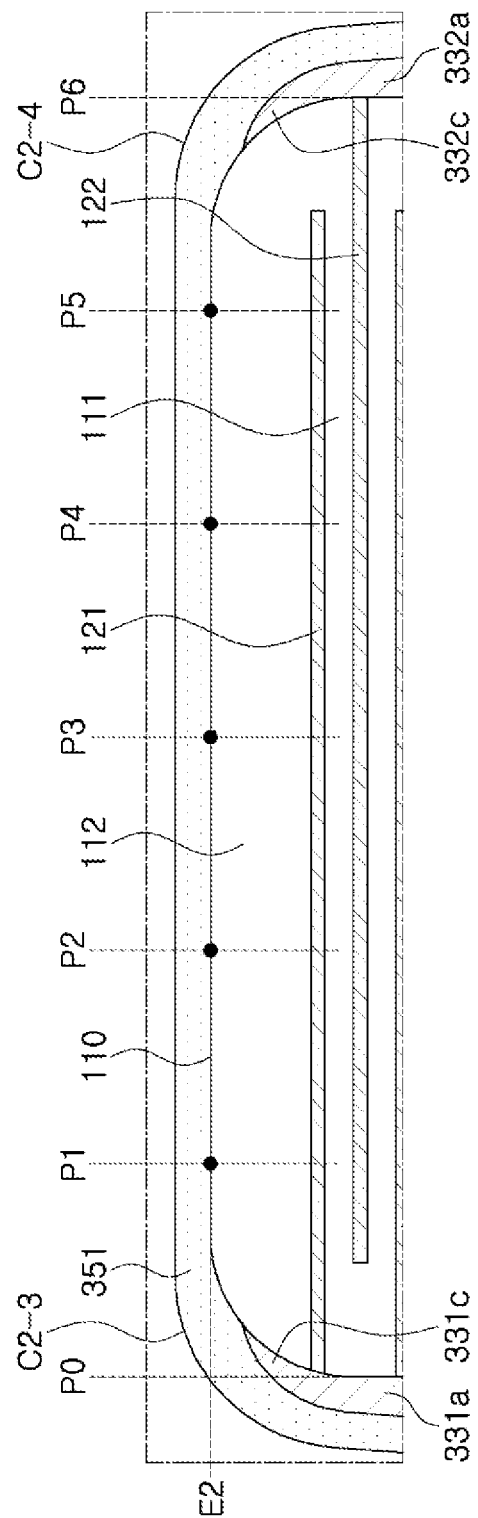
FIG. 41 is an enlarged diagram illustrating region K1 in FIG. 40.

FIG. 39 is a perspective diagram illustrating a multilayer electronic component 3000 according to an example embodiment. FIG. 40 is a cross-sectional diagram taken along line XIV-XIV' in FIG. 40. FIG. 41 is an enlarged diagram illustrating region K1 in FIG. 40.

Referring to FIGS. 39 to 41, in the multilayer electronic component 3000 in an example embodiment may include a dielectric layer 111 and first and second internal electrodes 121 and 122 alternately disposed with the dielectric layer 111 interposed therebetween and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction; a first external electrode 331 including a first connection portion 331a disposed on the third surface 3 of the body, a first band portion 331b extending from the first connection portion 331a to a portion of the first surface 1, and a first corner portion 331c extending from the first connection portion to a corner connecting the second and third surfaces 2 and 3 of the body to each other; a second external electrode 332 including second connection portion 332a disposed on the fourth surface of the body, a second band portion 332b extending from the second connection portion 332a to a portion of the first surface 1, and a second corner portion 332c extending from the second connection portion to a corner connecting the second and fourth surfaces 2 and 4 of the body to each other; an insulating layer 351 disposed on the first and second connection portions 331a and 332a and covering the second surface 2 and the first and second corner portions 331c and 332c; a first plating layer 341 disposed on the first band portion 331b; and a second plating layer 342 disposed on the second band portion 332b. The insulating layer 351 may include a silicone-based resin.

In an example embodiment, when an average distance in the second direction from an extension line of the third surface to an end of the first corner portion 331c is defined as B3, an average distance in the second direction from an extension line of the fourth surface 4 to an end of the second corner portion 332c is defined as B4, the average size of the region in which the third surface 3 and the second internal electrode 122 are spaced apart from each other, taken in the second direction, is defined as G1, and an average size of the region in which the fourth surface 4 and the first internal electrode 121 are spaced apart from each other, taken in the second direction, is defined as G2, B3≤G1 and B4≤G2 may be satisfied. Accordingly, the volume occupied by the external electrodes 331 and 332 may be reduced, such that capacitance per unit volume of the multilayer electronic component 3000 may be increased.

In this case, when the average distance in the second direction from an extension line of the third surface 3 to an end of the first band portion 331b is defined as B1, and the average distance from the extension line of the fourth surface 4 to an end of the second band portion 332b is defined as B2, B1>G1 and B2>G2 may be satisfied. Accordingly, the area in contact with the solder during mounting may increase, such that cohesion strength may improve.

The multilayer electronic component 3000 according to an example embodiment may include a dielectric layer 111 and first and second internal electrodes 121 and 122 alternately disposed with the dielectric layer 111 interposed therebetween, and may further include a body 110 including first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction. The body 110 of the multilayer electronic component 3000 may have the same configuration as that of the body of the multilayer electronic component 1000 other than the configuration in which the ends of the first or second surface of the body has a reduced shape.

The external electrodes 331 and 332 may be disposed on the third surface 3 and the fourth surface 4 of the body 110. The external electrodes 331 and 332 may be disposed on the third and fourth surfaces 3 and 4 of the body 110, respectively, and may include the first and second external electrodes 331 and 332 connected to the first and second internal electrodes 121 and 122, respectively.

The external electrodes 331 and 332 include a first external electrode 331 including a first connection portion 331a disposed on a third surface 3, a first band portion 331b extending from the first connection portion 331a to a portion of the first surface 1, and a first corner portion 331c extending from the first connection portion 331a to a corner connecting the second surface 2 and the third surface 3 to each other, and a second external electrode 132 including a second connection portion 332a disposed on the fourth surface, a second band portion 332b extending from the second connection portion 332a to a portion of the first surface 1, and a second corner portion 332c extending from the second connection portion 332a to a corner connecting the second and fourth surfaces 2 and 4 to each other. The first connection portion 331a may be connected to the first internal electrode 121 on the third surface 3, and the second connection portion 332a may be connected to the second internal electrode 122 on the fourth surface 4.

In an example embodiment, the first and second connection portions 331a and 332a may be spaced apart from the fifth and sixth surfaces 5 and 6. Accordingly, the volume of the external electrodes 331 and 332 may be reduced, thereby reducing the size of the multilayer electronic component 3000.

As the margin region in which the internal electrodes 121 and 122 is not disposed overlaps the dielectric layer 111, a step difference may be formed due to the thickness of the internal electrodes 121 and 122, such that the corner connecting the first surface 1 to the third to fifth surfaces 3 to 5 and/or the corner connecting the second surface 2 to the third to fifth surfaces 3 to 5 may have a reduced shape in a second direction of a center of the body 110 in the first direction with respect to the first surface 1 or the second surface 2. Alternatively, the corner connecting the first surface 1 to the third to sixth surfaces 3, 4, 5, 6 and/or the corner connecting the second surface 2 to the third to sixth surfaces 3, 4, 5, and 6 may have a reduced shape in a direction of a center of the body 110 in the first direction with respect to the first surface 1 or the second surface 2. Alternatively, as a separate process is performed to round the corners connecting the surfaces of the body 110 to prevent chipping defects, the corners connecting the first and third to sixth surfaces and/or the corner connecting the second surface and the third to sixth surfaces may have a rounded shape.

The corner may include a 1-3 corner C1-3 connecting the first surface 1 and the third surface 3, a 1-4 corner C1-4 connecting the first surface 1 and the fourth surface 4, a 2-3 corner C2-3 connecting the second surface 2 and the third surface 3, and a 2-4 corner C2-4 connecting the second surface 2 and the fourth surface 4. Also, the corners may include a 1-5 corner connecting the first and fifth surfaces 1 and 5, a 1-6 corner connecting the first and sixth surfaces 1 and 6, a 2-5 corner connecting the second and fifth surfaces 2 and 5, and a 2-6 corner connecting the second surface and the sixth surface 2 and 6. However, to prevent the step difference due to the internal electrodes 121 and 122, after lamination, when the internal electrodes may be cut to be exposed to the fifth and sixth surfaces 5 and 6 of the body, and a single dielectric layer or two or more dielectric layers may be laminated on both side surfaces of the capacitance formation portion Ac in the third direction (the width direction) to form the margin portions 114 and 115 (shown in FIG. 2), the portion connecting the first surface 1 to the fifth and sixth surfaces 5 and 6 and the portion connecting the second surface 2 to the fifth and sixth surfaces 5 and 6 may not have a reduced shape.

The first to sixth surfaces 1 to 6 of the body 110 may be almost flat surfaces, and non-flat regions may be viewed as corners. Also, a region disposed on a corner among the external electrodes 131 and 132 may be viewed as a corner portion.

In this regard, the first and second corner portions 331c and 332c may be disposed below the extension line E2 of the second surface 2, and the first and second corner portions 331c and 332c may be spaced apart from the second surface 2. That is, since the external electrodes 331 and 332 are not disposed on the second surface 2, the volume occupied by the external electrodes 331 and 332 may be further reduced, thereby increasing capacitance per unit volume of the multilayer electronic component 3000. Also, the first corner portion 331c may be disposed on a portion of a 2-3 corner C2-3 connecting the third surface 3 and the second surface 2, and the second corner portion 332c may be formed on a portion of the 2-4 corner C2-4 connecting the fourth surface 4 and the second surface 2.

The extension line E2 of the second surface 2 may be defined as below.

Seven linear lines P0, P1, P2, P3, P4, P5, P6, and P7 spaced apart by an equal distance in the thickness direction may be drawn in the length direction from the third surface to the fourth surface on the length-thickness cross-section (L-T cross-section) in a center in the width direction, and the line crossing the point at which P2 meets the second surface and the point at which P4 meets the second surface may be defined as the extension line E2 of the second surface.

The external electrodes 331 and 332 may be formed using any having electrical conductivity, such as metal, and a specific material may be determined in consideration of electrical properties and structural stability, and the external electrodes 331 and 332 may have a multilayer structure.

The external electrodes 331 and 332 may be a fired electrode including a conductive metal and glass, or a resin-based electrode including a conductive metal and a resin.

Also, the external electrodes 331 and 332 may have a form in which a plastic electrode and a resin-based electrode may be formed in order on the body. Also, the external electrodes 331 and 332 may be formed by transferring a sheet including the conductive metal to the body or by transferring a sheet including a conductive metal to the fired electrode.

As the conductive metal included in the external electrodes 331 and 332, a material having excellent electrical conductivity may be used, and the material is not limited to any particular example. For example, the conductive metal may be one or more of Cu, Ni, Pd, Ag, Sn, Cr, and alloys thereof. Preferably, the external electrodes 331 and 332 may include at least one of Ni and a Ni alloy, and accordingly, connectivity with the internal electrodes 121 and 122 including Ni may improve.

The insulating layer 351 may be disposed on the first and second connection portions 331a and 332a.

Since the first and second connection portions 331a and 332a may be connected to the internal electrodes 121 and 122, the first and second connection portions 331a and 332a may be paths for permeation of a plating solution in a plating process or moisture permeation during actual use. In the example embodiment, since the insulating layer 351 is disposed on the connection portions 331a and 332a, permeation of external moisture or a plating solution may be prevented.

The insulating layer 351 may be disposed to be in contact with the first and second plating layers 341 and 342. In this case, the insulating layer 351 may be in contact with the ends of the first and second plating layers 341 and 342 by partially covering the ends, or the first and second plating layers 341 and 342 may be in contact with the ends of the insulating layer 351 by partially covering the ends.

The insulating layer 351 may be disposed on the first and second connection portions 331a and 332a, and may be disposed to cover the second surface 2 and the first and second corner portions 331c and 332c. Also, the insulating layer 351 may cover the region in which the ends of the first and second corner portions 331c and 332c are in contact with the body 110 and may block the moisture permeation path, thereby improving moisture resistance reliability.

The insulating layer 351 may be disposed on the second surface and may extend to the first and second connection portions 331a and 332a. Also, when the external electrodes 331 and 332 are not disposed on the second surface, the insulating layer may be disposed to completely cover the second surface 2. The insulating layer 351 may not necessarily have to be disposed on the second surface 2, and the insulating layer 351 may not be disposed on a portion or an entirety of the second surface 2, and the insulating layer 351 may be divided into two regions and the two regions may be disposed on the first and second connection portions 331a and 332a, respectively. However, even in this case, the insulating layer 351 may be disposed to entirely cover the first and second corner portions 331c and 332c. When the insulating layer is not disposed on an entirety of the second surface 2, the insulating layer 351 may be disposed below an extension line E2 of the second surface 2. Also, the insulating layer 351 is not disposed on the second surface 2, and may extend from the first and second connection portions 331a and 332a to the fifth and sixth surfaces 5 and 6 and may form an integrated insulating layer.

In an example embodiment, the insulating layer 351 may be disposed to cover portions of the fifth and sixth surfaces 5 and 6 and may improve reliability. In this case, portions of the fifth and sixth surfaces 5 and 6 not covered by the insulating layer may be exposed.

Further, the insulating layer 351 may be disposed to cover an entirety of the fifth and sixth surfaces 5 and 6, and in this case, the fifth and sixth surfaces 5 and 6 may not be exposed, thereby improving moisture resistance reliability.

The insulating layer 351 may prevent the plating layers 341 and 342 from being formed on the external electrodes 331 and 332 on which the insulating layer 351 is disposed, and may improve sealing properties and may reduce permeation of moisture or a plating solution. The components, composition, average thickness, and effects of the insulating layer 351 may be the same as the insulating layers 151, 251, 252, and 253 included in the multilayer electronic components 1000 and 2000 and various embodiments thereof, and thus, the descriptions thereof will not be provided.

The first and second plating layers 341 and 342 may be disposed on the first and second band portions 331b and 332b, respectively. The plating layers 341 and 342 may improve mounting properties, and as the plating layers 341 and 342 are disposed on the band portions 331b and 332b, the mounting space may be reduced, and permeation of a plating solution into the internal electrode may be reduced, thereby improving reliability. One end of the first and second plating layers 341 and 342 may be in contact with the first surface 1, and the other end may be in contact with the insulating layer 351.

The type of the plating layers 341 and 342 is not limited to any particular example, and may be a plating layer including at least one of Cu, Ni, Sn, Ag, Au, Pd, and alloys thereof, and may include a plurality of layers.

For example, the plating layers 341 and 342 may be a Ni plating layer or a Sn plating layer, and a Ni plating layer and the Sn plating layer and the Ni plating layer may be formed in order on the first and second band portions 331b and 332b.

In an example embodiment, the first plating layer 341 may be disposed to cover the end disposed on the first external electrode 331 of the insulating layer 351, and the second plating layer 342 may be disposed to cover an end disposed on the second external electrode 332 of the insulating layer 351. Accordingly, bonding force between the insulating layer 351 and the plating layers 341 and 342 may be strengthened such that reliability of the multilayer electronic component 3000 may improve. Also, by forming the insulating layer 351 before forming the plating layers 341 and 342 on the external electrodes 331 and 332, permeation of a plating solution in the process of forming a plating layer may be reliably prevented. As the insulating layer is formed before the plating layer, the plating layers 341 and 342 may have a shape covering the ends of the insulating layer 351.

In an example embodiment, the insulating layer 351 may be disposed to cover the end disposed on the first external electrode 331 of the first plating layer 341, and the insulating layer 351 may be disposed to cover an end disposed on the second external electrode 332 of the second plating layer 342. Accordingly, bonding force between the insulating layer 351 and the plating layers 341 and 342 may be strengthened such that reliability of the multilayer electronic component 3000 may improve.

In an example embodiment, the first and second plating layers 341 and 342 may be extended to partially cover the first and second connection portions 331a and 332a, respectively. when an average distance in the first direction from the first surface 1 to an internal electrode disposed most adjacent to the first surface 1 among the internal electrodes 121 and 122 is defined as H1, and an average distance in the first direction from an extension line of the first surface 1 to ends of the plating layers 141 and 142 disposed on the first and second connection portions 131a and 132a is defined as H2, H1≥H2 may be satisfied. Accordingly, permeation of the plating solution into the internal electrode during the plating process may be prevented, thereby improving reliability.

In an example embodiment, when an average distance in the first direction from the first surface 1 to an internal electrode disposed most adjacent to the first surface 1 among the internal electrodes 121 and 122 is defined as H1, and an average distance in the first direction from an extension line of the first surface 1 to ends of the plating layers 341 and 342 disposed on the first and second connection portions 131a and 132a is defined as H2, H1<H2 may be satisfied. Accordingly, the area in contact with the solder during mounting may increase, thereby improving cohesion strength. More preferably, when the average size of the body 110 in the first direction is defined as T, H2<T/2 may be satisfied. That is, H1<H2<T/2 may be satisfied, which may be because, when H2 is T/2 or more, the effect of improving moisture resistance reliability by the insulating layer may degrade.

In an example embodiment, the first and second plating layers 341 and 342 may be disposed below an extension line of the first surface. Accordingly, the height of the solder may be reduced during mounting and the mounting space may be reduced. Also, the insulating layer 351 may extend to a region below the extension line of the first surface and may be in contact with the first and second plating layers 341 and 342.

In an example embodiment, the average size of the body in the second direction is defined as L, the average distance in the second direction from an extension line E3 of the third surface 3 to an end of the first band portion 331b is defined as B1, the average size of the body in the second direction from an extension line E4 of the fourth surface 4 to an end of the second band portion 332b is defined as B2, 0.2≤B1/L≤0.4 and 0.2≤B2/L≤0.4 may be satisfied.

When B1/L and B2/L are less than 0.2, it may be difficult to secure sufficient fixing strength. When B2/L is greater than 0.4, a leakage current may be generated between the first band portion 331b and the second band portion 332b under a high-voltage current, and the first band portion 331b and the second band portion 332b may be electrically connected due to plating spread.

In an example embodiment, an additional insulating layer disposed on the first surface 1 and disposed between the first band portion 331b and the second band portion 332b may be further included. Accordingly, a leakage current which may occur between the first band electrode 331b and the second band electrode 332b under a high voltage current may be prevented.

The type of the additional insulating layer may not need to be limited to any particular example. For example, the additional insulating layer may include the same component as those of the insulating layer 351. The additional insulating layer and the insulating layer 351 may not need to be formed of the same material, but may be formed of different materials. For example, the additional insulating layer may include at least one thermosetting resin selected from an epoxy resin, an acrylic resin, and the like. Also, the additional insulating layer may include at least one selected from $TiO_2$, $BaTiO_3$, $Al_2O_3$, $SiO_2$, BaO, or the like as an additive in addition to polymer resin. Accordingly, the bonding force with the body or the external electrode may improve.

In an example embodiment, when the average distance in the second direction from an extension line E3 of the third surface 3 to an end of the first band portion 331b is defined as B1, and the average distance in the second direction from an extension line E4 of the fourth surface 4 to an end of the second band portion 332b is defined as B2, B3<B1 and B4<B2 may be satisfied. The average length B1 of the first band portion 331b may be longer than the average length B3 of the first corner portion 331c, and the average length of the second band portion 332b may be longer than the average length B4 of the second corner portion 332. Accordingly, the region in contact with the solder during mounting may increase, thereby improving cohesion strength.

In greater detail, when the average distance in the second direction from an extension line E3 of the third surface 3 to an end of the first band portion 331b is defined as B1, the average distance in the second direction from an extension line E4 of the fourth surface 4 to an end of the second band portion 332b is defined as B2, the average distance in the second direction from an extension line E3 of the third surface 3 to an end of the first corner portion 331c is defined as B3, and the average distance in the second direction from an extension line E4 of the fourth surface 4 to an end of the second corner portion 332c is defined as B4, B3<B1 and B4<B2 may be satisfied.

In an example embodiment, an average thickness of the first and second plating layers 341 and 342 may be less than an average thickness of the insulating layer 351.

The insulating layer 351 may prevent permeation of external moisture or the plating solution, but connectivity with the plating layers 341 and 342 may be relatively weak, which may cause delamination of the plating layer. When the plating layer is delaminated, cohesion strength with the substrate may be reduced. Here, the delamination of the plating layer may refer to separation of a portion of the plating layer or physical separation of the plating layer from the external electrodes 331 and 332. Since the connection between the plated layer and the insulating layer is relatively weak, it may be highly likely that a gap between the insulating layer and the plated layer may be widened or foreign substances may enter, and the possibility of delamination may increase due to vulnerability to external impacts.

In an example embodiment, by reducing the average thickness of the plated layer to be less than the average thickness of the insulating layer, the contact area between the plated layer and the insulating layer may be reduced, thereby preventing delamination and improving cohesion strength of the multilayer electronic component 3000 with the components.

The size of the multilayer electronic component 3000 may not need to be limited to any particular example.

However, to obtain both miniaturization and high capacitance, it may be necessary to increase the number of laminated layers by reducing the thicknesses of the dielectric layer and the internal electrode, and accordingly, in the multilayer electronic component 3000 having a size of 1005 (length×width, 1.0 mm×0.5 mm) or less, the effect of improving reliability and capacitance per unit volume in the example embodiment may be distinct.

Accordingly, when manufacturing errors, external electrode sizes, or the like are considered, and when the length of the multilayer electronic component 3000 is 1.1 mm or less and the width is 0.55 mm or less, the effect of improving reliability in the example embodiment may be distinct. Here, the length of the multilayer electronic component 3000 may refer to the maximum size of the multilayer electronic component 3000 in the second direction, and the width of the multilayer electronic component 3000 may refer to the maximum size of the multilayer electronic component 3000 in the third direction.

According to the aforementioned example embodiments, cracks caused by stress due to thermal reduction of solder fillet may be prevented.

Also, the effective volume fraction required for implementing capacitance may increase.

A mounting space for the multilayer electronic component may be reduced.

Permeation of external moisture and a plating solution into the multilayer electronic component may be prevented.

While example embodiments have been illustrated and described above, it will be apparent to those skilled in the art that modifications and variations could be made without departing from the scope in the example embodiment as defined by the appended claims.

What is claimed is:

1. A multilayer electronic component, comprising:
   a body including a dielectric layer and first and second internal electrodes alternately disposed with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other a third direction;
   a first external electrode including a first connection portion disposed on the third surface and a first band portion extending from the first connection portion to a portion of the first surface;
   a second external electrode including a second connection portion disposed on the fourth surface and a second band portion extending from the second connection portion to a portion of the first surface;
   an insulating layer disposed on the second surface and extending to a portion on the first and second connection portions; and
   a plating layer disposed on the first band portion
   wherein the plating layer is in contact with the insulating layer on the first external electrode, and
   wherein an end of the plating layer includes a first area disposed between the insulating layer and the first and second external electrode, and a second area disposed to cover at least a portion of the insulating layer,
   wherein an end of the insulating layer extends from a portion of an inner surface of the insulating layer which contacts the first external electrode to a region between the first area and the second area, and is farther from the body than the portion of the inner surface of the insulating layer which contacts the first external electrode.

2. The multilayer electronic component of claim 1, wherein a thickness of the insulating layer decreases toward an end in a region in which the plating layer is in contact with the insulating layer.

3. The multilayer electronic component of claim 1, wherein the plating layer is in contact with the insulating layer on the first connection portion.

4. The multilayer electronic component of claim 3, wherein the first area of the end of the plating layer refers to an area disposed between the insulating layer and the first connection portion, and the second area of the end of the plating layer refers to an area arranged to cover at least a portion of the insulating layer, and wherein a1>a2 is satisfied, in which a1 is a maximum length of the first area in the first direction, and a2 is a maximum length of the second area in the first direction.

5. The multilayer electronic component of claim 1, wherein the plating layer is in contact with the insulating layer on the first band portion.

6. The multilayer electronic component of claim 5, wherein the first area of the end of the plating layer refers to an area disposed between the insulating layer and the first band portion, and the second area of the end of the plating layer refers to an area arranged to cover at least a portion of the insulating layer, and wherein a3>a4 is satisfied, in which a3 is a maximum length of the first area in the second direction, and a4 is a maximum length of the second area in the second direction.

7. The multilayer electronic component of claim 1, wherein H1>H2 is satisfied, in which H1 is an average distance of an internal electrode most adjacent to the first surface in the first direction among the first and second internal electrodes, and H2 is an average distance in the first direction from an extension line of the first surface to an end of the plating layer disposed on the first or second connection portion.

8. The multilayer electronic component of claim 7, wherein H2<T/2 is satisfied, in which T is an average size of the body in the first direction.

9. The multilayer electronic component of claim 1, wherein the first and second connection portions are spaced apart from the second surface.

10. The multilayer electronic component of claim 1, wherein $0.2 \leq B1/L \leq 0.4$ and $0.2 \leq B2/L \leq 0.4$ are satisfied, in which L is an average size of the body in the second direction, B1 is an average distance in the second direction from an extension line of the third surface to an end of the first band portion, and B2 is an average distance in the second direction from an extension line of the fourth surface to an end of the second band portion.

11. The multilayer electronic component of claim 1, wherein a maximum size of the multilayer electronic component in the second direction is 1.1 mm or less, and a maximum size of the multilayer electronic component in the third direction is 0.55 mm or less.

12. The multilayer electronic component of claim 1, wherein an average thickness of the dielectric layer is 0.35 μm or less.

13. The multilayer electronic component of claim 1, wherein an average thickness of the first and second internal electrodes is 0.35 μm or less.

14. The multilayer electronic component of claim 1, wherein the body comprises:
   a capacitance formation portion including the first and second internal electrodes alternately disposed with the dielectric layer interposed therebetween and a cover portion disposed on both end surfaces of the capacitance formation portion in the first direction, wherein an average size of the cover portion in the first direction is 15 μm or less.

15. The multilayer electronic component of claim 1, wherein the first external electrode further includes a third band portion extending from the first connection portion to a portion of the second surface, and the second external electrode further includes a fourth band portion extending from the second connection portion to a portion of the second surface.

16. The multilayer electronic component of claim 1, the first external electrode further includes a first side band portion extending from the first connection portion to portions of the fifth and sixth surfaces and the second external electrode further includes a second side band portion extending from the second connection portion to portions of the fifth and sixth surfaces.

17. The multilayer electronic component of claim 1, further comprising:
an additional insulating layer disposed on the first surface and disposed between the first band portion and the second band portion.

18. The multilayer electronic component of claim 16, wherein the sizes of the first and second side band portions in the second direction may gradually increase toward the first surface.

19. The multilayer electronic component of claim 16, wherein the insulating layer disposed to cover the portion of the first side band portion, the second side band portion, the fifth surface and the sixth surface.

20. The multilayer electronic component of claim 1, wherein the body includes a 1-3corner connecting the first surface to the third surface, a 1-4 corner connecting the first surface to the fourth surface, a 2-3 corner connecting the second surface to the third surface, and a 2-4 corner connecting the second surface to the fourth surface,
wherein the 1-3 corner and the 2-3 corner have a form reducing in a direction of a center of the body taken in the first direction toward the third surface, and the 1-4 corner and the 2-4 corner have a form reducing in a direction of the center of the body taken in the first direction toward the fourth surface, and
wherein the first external electrode includes a corner portion disposed on the 1-3 corner and a corner portion extending from the first connection portion to the 2-3 corner, and the second external electrode includes a corner portion disposed on the 1-4 corner and a corner portion extending from the second connection portion to the 2-4 corner.

21. The multilayer electronic component of claim 20, wherein $B3 \leq G1$ and $B4 < G2$ are satisfied, in which B3 is an average distance in the second direction from an extension line of the third surface to an end of the first corner portion, B4 is an average distance in the second direction from an extension line of the fourth surface to an end of the second corner portion, G1 is an average size of a region in which the third surface and the second internal electrode are spaced apart from each other, taken in the second direction, and G2 is an average size of a region in which the fourth surface and the first internal electrode are spaced apart from each other, taken in the second direction.

22. The multilayer electronic component of claim 1, wherein $B1 > G1$ and $B2 > G2$ are satisfied, in which B1 is an average distance in the second direction from the extension line of the third surface to an end of the first band portion, B2 is an average distance in the second direction from the extension line of the fourth surface to an end of the second band portion, G1 is an average size of a region in which the third surface and the second internal electrode are apaced apart from each other, taken in the second direction, and G2 is an average size of a region which the fourth surface and the first internal electrode are spaced apart from each other, taken in the second direction.

23. The multilayer electronic component of claim 1, wherein an average thickness of the plating layer is less than an average thickness of the insulating layer.

24. The multilayer electronic component of claim 1, wherein the first and second connection portions are spaced apart from the fifth and sixth surfaces.

25. The multilayer electronic component of claim 1, wherein the insulating layer is disposed on a portion of the fifth and sixth surfaces.

26. The multilayer electronic component of claim 1, wherein the insulating layer is disposed to cover an entirety of the fifth and sixth surfaces.

27. The multilayer electronic component of claim 1, wherein the first external electrode includes a first connection electrode disposed on the third surface and a first band electrode disposed on the first surface and connected to the first connection electrode, and
wherein the second external electrode includes a second connection electrode disposed on the fourth surface and a second band electrode disposed on the first surface and connected to the second connection electrode.

28. The multilayer electronic component of claim 27, wherein the first and second connection electrodes are spaced apart from the fifth and sixth surfaces.

29. The multilayer electronic component of claim 27, wherein the first and second connection electrodes are spaced apart from the second surfaces.

30. The multilayer electronic component of claim 27, wherein the first connection electrode and the second connection electrode include the same metal as a metal included in the first and second internal electrodes.

31. The multilayer electronic component of claim 27, wherein the first connection electrode and the second connection electrode include fired electrodes including a conductive metal and glass.

32. The multilayer electronic component of claim 27, wherein the first band electrode and the second band electrode are fired electrodes including a conductive metal and glass.

33. The multilayer electronic component of claim 27, wherein the first connection electrode and the second connection electrode include plating layers.

34. The multilayer electronic component of claim 27, wherein the first band electrode and the second band electrode include plating layers.

* * * * *